(12) United States Patent
Carter et al.

(10) Patent No.: US 9,098,712 B2
(45) Date of Patent: *Aug. 4, 2015

(54) ENCRYPTING OPERATING SYSTEM

(71) Applicant: Exit-Cube, Inc., San Francisco, CA (US)

(72) Inventors: Ernst B. Carter, Redwood City, CA (US); Vasily Zolotov, San Jose, CA (US)

(73) Assignee: EXIT-CUBE (HONG KONG) LIMITED, Central Hong Kong (HK)

( * ) Notice: Subject to any disclaimer, the term of this patent is extended or adjusted under 35 U.S.C. 154(b) by 197 days.

This patent is subject to a terminal disclaimer.

(21) Appl. No.: 13/776,266

(22) Filed: Feb. 25, 2013

(65) Prior Publication Data

US 2013/0290727 A1 Oct. 31, 2013

Related U.S. Application Data

(63) Continuation of application No. 12/776,337, filed on May 7, 2010, now Pat. No. 8,407,761, which is a continuation of application No. 10/648,630, filed on Aug. 25, 2003, now Pat. No. 7,810,133.

(60) Provisional application No. 60/405,459, filed on Aug. 23, 2002.

(51) Int. Cl.
*G06F 21/00* (2013.01)
*G06F 21/60* (2013.01)
(Continued)

(52) U.S. Cl.
CPC ............ *G06F 21/602* (2013.01); *G06F 21/606* (2013.01); *G06F 21/6218* (2013.01);
(Continued)

(58) Field of Classification Search
CPC .................................. G06F 21/00; G06F 21/60
USPC .............................................. 726/2; 713/164
See application file for complete search history.

(56) References Cited

U.S. PATENT DOCUMENTS

| 4,914,653 A | 4/1990 | Bishop et al. |
| 5,029,206 A | 7/1991 | Marino, Jr. et al. |

(Continued)

FOREIGN PATENT DOCUMENTS

| CN | 101013415 A | 8/2007 |
| EP | 1292067 A1 | 12/2002 |

(Continued)

OTHER PUBLICATIONS

Blaze. Matt, "A Cryptographic File System for Unix", AT&T Bell Laboratories, First ACM Conference on Communications and Computing Security, pp. 9-16, Nov. 1, 1993, mab@research.att.com.
(Continued)

*Primary Examiner* — William Powers
(74) *Attorney, Agent, or Firm* — Haverstock & Owens LLP

(57) ABSTRACT

A method of and system for encrypting and decrypting data on a computer system is disclosed. In one embodiment, the system comprises an encrypting operating system (EOS), which is a modified UNIX operating system. The EOS is configured to use a symmetric encryption algorithm and an encryption key to encrypt data transferred from physical memory to secondary devices, such as disks, swap devices, network file systems, network buffers, pseudo file systems, or any other structures external to the physical memory and on which can data can be stored. The EOS further uses the symmetric encryption algorithm and the encryption key to decrypt data transferred from the secondary devices back to physical memory. In other embodiments, the EOS adds an extra layer of security by also encrypting the directory structure used to locate the encrypted data. In a further embodiment a user or process is authenticated and its credentials checked before a file can be accessed, using a key management facility that controls access to one or more keys for encrypting and decrypting data.

39 Claims, 28 Drawing Sheets

(51) Int. Cl.
*G06F 21/62* (2013.01)
*H04L 9/06* (2006.01)

(52) U.S. Cl.
CPC ...... *H04L9/0618* (2013.01); *G06F 2221/2107* (2013.01); *H04L 2209/12* (2013.01); *H04L 2209/20* (2013.01); *H04L 2209/24* (2013.01)

(56) References Cited

U.S. PATENT DOCUMENTS

| | | | |
|---|---|---|---|
| 5,093,913 | A | 3/1992 | Bishop et al. |
| 5,179,702 | A | 1/1993 | Spix et al. |
| 5,253,342 | A | 10/1993 | Blount et al. |
| 5,454,039 | A * | 9/1995 | Coppersmith et al. ......... 380/28 |
| 5,491,808 | A | 2/1996 | Geist, Jr. |
| 5,513,328 | A | 4/1996 | Christofferson |
| 5,584,023 | A | 12/1996 | Hsu |
| 5,666,486 | A | 9/1997 | Alfieri et al. |
| 5,721,777 | A * | 2/1998 | Blaze ............................ 380/286 |
| 5,727,206 | A * | 3/1998 | Fish et al. ...................... 714/4.2 |
| 5,729,710 | A | 3/1998 | Magee et al. |
| 5,765,153 | A * | 6/1998 | Benantar et al. ....................... 1/1 |
| 5,774,525 | A | 6/1998 | Kanevsky et al. |
| 5,787,169 | A | 7/1998 | Eldridge et al. |
| 5,841,976 | A | 11/1998 | Tai et al. |
| 5,903,881 | A * | 5/1999 | Schrader et al. ................. 705/42 |
| 5,991,399 | A | 11/1999 | Graunke et al. |
| 5,991,414 | A | 11/1999 | Garay et al. |
| 6,023,506 | A * | 2/2000 | Ote et al. ...................... 713/165 |
| 6,065,037 | A | 5/2000 | Hitz et al. |
| 6,075,938 | A | 6/2000 | Bugnion et al. |
| 6,105,053 | A | 8/2000 | Kimmel et al. |
| 6,185,681 | B1 | 2/2001 | Zizzi |
| 6,195,676 | B1 | 2/2001 | Spix et al. |
| 6,205,417 | B1 | 3/2001 | Butts et al. |
| 6,249,866 | B1 | 6/2001 | Brundrett et al. |
| 6,338,112 | B1 | 1/2002 | Wipfel et al. |
| 6,351,813 | B1 | 2/2002 | Mooney et al. |
| 6,477,545 | B1 | 11/2002 | LaRue |
| 6,594,698 | B1 | 7/2003 | Chow et al. |
| 6,681,305 | B1 | 1/2004 | Franke et al. |
| 6,754,820 | B1 | 6/2004 | Scheidt et al. |
| 6,836,888 | B1 | 12/2004 | Basu et al. |
| 6,886,081 | B2 | 4/2005 | Harres |
| 6,938,166 | B1 * | 8/2005 | Sarfati et al. ................... 382/116 |
| 6,957,330 | B1 * | 10/2005 | Hughes .......................... 713/163 |
| 7,047,337 | B2 | 5/2006 | Armstrong et al. |
| 7,051,209 | B1 | 5/2006 | Brickell |
| 7,185,192 | B1 | 2/2007 | Kahn |
| 7,231,657 | B2 | 6/2007 | Honarvar et al. |
| 7,243,370 | B2 * | 7/2007 | Bobde et al. ...................... 726/10 |
| 7,313,694 | B2 * | 12/2007 | Riedel et al. .................. 713/165 |
| 7,316,019 | B2 | 1/2008 | Abbey et al. |
| 7,353,535 | B2 * | 4/2008 | Kaler et al. ......................... 726/5 |
| 7,389,415 | B1 | 6/2008 | Kumar |
| 7,805,726 | B1 | 9/2010 | Leonard et al. |
| 7,814,023 | B1 | 10/2010 | Rao et al. |
| 2002/0065876 | A1 | 5/2002 | Chien et al. |
| 2002/0091863 | A1 | 7/2002 | Schug |
| 2002/0099759 | A1 | 7/2002 | Gootherts |
| 2002/0129085 | A1 | 9/2002 | Kubala et al. |
| 2002/0161596 | A1 | 10/2002 | Johnson et al. |
| 2002/0194496 | A1 | 12/2002 | Griffin et al. |
| 2003/0005300 | A1 * | 1/2003 | Noble et al. ................... 713/172 |
| 2003/0126092 | A1 | 7/2003 | Chihara |
| 2003/0140179 | A1 | 7/2003 | Wilt et al. |
| 2003/0187784 | A1 | 10/2003 | Maritzen et al. |
| 2003/0236745 | A1 | 12/2003 | Hartsell et al. |
| 2004/0093455 | A1 | 5/2004 | Duncan et al. |
| 2004/0123162 | A1 | 6/2004 | Antell et al. |
| 2004/0205755 | A1 | 10/2004 | Lescouet et al. |
| 2004/0215837 | A1 | 10/2004 | Abbey et al. |
| 2004/0221290 | A1 | 11/2004 | Casey et al. |
| 2005/0039057 | A1 | 2/2005 | Bagga et al. |
| 2005/0060710 | A1 | 3/2005 | Kush |
| 2005/0120160 | A1 | 6/2005 | Plouffe et al. |
| 2005/0191609 | A1 | 9/2005 | Fadel et al. |
| 2005/0289648 | A1 | 12/2005 | Grobman et al. |
| 2006/0005181 | A1 | 1/2006 | Fellenstein et al. |
| 2006/0010489 | A1 | 1/2006 | Nastou et al. |
| 2006/0095779 | A9 * | 5/2006 | Bhat et al. ..................... 713/182 |
| 2006/0143350 | A1 | 6/2006 | Miloushev et al. |
| 2006/0168381 | A1 | 7/2006 | Armstrong et al. |
| 2006/0200821 | A1 | 9/2006 | Cherkasova et al. |
| 2007/0038996 | A1 | 2/2007 | Ben-Yehuda et al. |
| 2007/0050763 | A1 | 3/2007 | Kagan et al. |
| 2007/0061492 | A1 | 3/2007 | van Riel |
| 2007/0113229 | A1 | 5/2007 | Serghi et al. |
| 2007/0136579 | A1 | 6/2007 | Levy et al. |
| 2007/0180493 | A1 | 8/2007 | Croft et al. |
| 2007/0288941 | A1 | 12/2007 | Dunshea et al. |
| 2008/0028411 | A1 | 1/2008 | Cherkasova et al. |
| 2008/0155537 | A1 | 6/2008 | Dinda et al. |
| 2008/0189715 | A1 | 8/2008 | Armstrong et al. |

FOREIGN PATENT DOCUMENTS

| | | |
|---|---|---|
| EP | 1507357 A1 | 2/2005 |
| JP | 2214887 A | 8/1990 |
| JP | 04060843 | 2/1992 |
| JP | 05204678 | 8/1993 |
| JP | 9251426 A | 9/1997 |
| JP | 10027109 | 1/1998 |
| JP | 11249916 | 9/1999 |
| JP | 2001092718 A | 4/2001 |
| JP | 2001516913 A | 10/2001 |
| JP | 2002123427 A | 4/2002 |
| JP | 2008097356 | 4/2008 |
| JP | 2008262419 | 10/2008 |
| WO | 91/20033 A1 | 12/1991 |
| WO | 99/14652 A1 | 3/1999 |
| WO | 0067130 A1 | 11/2000 |
| WO | 02/19592 A2 | 3/2002 |

OTHER PUBLICATIONS

Campbell et al., "uChoices: An Object-Oriented Multimedia Operating System", Jan. 1, 1995 IEE, pp. 90-94, University of Illinois at Urban-Champaign.

Crampton et al., "On key assignment for hierarchical access control", Computer Security Foundations Workshop, 2006, 19th IEEE.

Kayem, A. "On replacing cryptographic keys in hierarchical key management systems", Journal of Computer Security, 2008, vol. 16, Issue 3, pp. 289-309.

Ludwig et al., "File System Encryption With Integrated User Management", ACM SIGOPS Operating System Review Archive, vol. 35, Issue 4, pp. 88-93, Oct. 1, 2001.

Mazieres, "A toolkit for user-level file systems", Jan. 2001, pp: 1-14, Department of Computer Science, NYU.

Provos, Niels, "Encrypting Virtual Memory", Center for Information Technology Integration, University of Michigan, Apr. 25, 2000, pp. 1-10.

Raadt et al., "Cryptography in Oped BSD: An Overview", The open SBD Project, Jun. 10, 1999, pp. 1-9.

Scheier, Robert L., "Trusted Operating Systems: The Ultimate Defense", Nov. 6, 2000, pp. 70-72, Computerworld.

Yu et al., "A Cryptographic File System Supporting Multi-Level Security", Dec. 2002, pp. 1-8, Electronics and Telecommunications Research Institute, Daejeon, Korea.

Zakok et al., "Cryptfs: A Stackable Vnode Level Encryption File System", pp. 1-14, Computer Science Department, Columbia University, Jan. 1, 1998, www.cs.columbia.edu/ezk/research/cryptfs/.

Aki et al., "Cryptographic solution to a problem of access control in a hierarchy", Aug. 1983, vol. 1, Issue 3, pp. 239-248, ISSN: 0734-2071.

* cited by examiner

ENCRYPTING OPERATING SYSTEM

RELATED APPLICATIONS

This application is a continuation of the co-pending U.S. patent application Ser. No. 12/776,337, filed May 7, 2010, and titled "ENCRYPTING OPERATING SYSTEM," which is a continuation of U.S. patent application Ser. No. 10/648,630, filed Aug. 25, 2003, and titled "ENCRYPTING OPERATING SYSTEM," which claims priority from U.S. provisional patent application Ser. No. 60/405,459, filed Aug. 23, 2002, and titled "ENCRYPTING OPERATING SYSTEM," all of which are hereby incorporated by reference.

FIELD OF THE INVENTION

This invention relates to the field of computer operating systems. More specifically, this invention relates to operating systems used to automatically encrypt and decrypt data transferred between computer memory and secondary devices.

BACKGROUND OF THE INVENTION

Information technology, in the form of computer systems, is a pervasive and critically important aspect of modern society. The appropriate and correct operations of these systems is just as essential for the smallest of individual efforts as it is for the greatest enterprises and governments. Data security is one of the paramount issues that impacts the acceptability of a computer system's operations. Keeping data secure includes both being able to selectively restrict access to and the use of data, as well as maintain and protect data from unauthorized modification or destruction. Beyond solely safeguarding the use and integrity of the data stored, data security also affects the overall security of the computer system as a whole. For example, compromised permissions data can facilitate unauthorized use of computer system resources, and even malicious damage to its operations. Additionally, virtually all large scale endeavors are implemented in concert with computer systems, and the endeavors themselves can be hampered or worse by degraded data security. The ascendance to prominence of the Internet, and other large-scale computer networks, has further magnified the consequences of data security flaws.

Approaches to the security of computer data have generally taken two paths, controlling the access to data and encrypting the data to prevent its reading by an unauthorized entity. Among the tactics for controlling access are passwords or other information based restrictions, and firewalls or other hardware based portal restrictions. Encryption based security methods endeavor to prohibit data from being comprehended if accessed without proper authorization. For the ever-increasing benefits of large scale public and private networks to be realized, substantial volumes of communication both within and between these networks is vital. The speed and ease of these communications directly correlates with the benefits garnered from them, and is inversely related to the security of the communicating systems' data. The value being realized from communications between computer systems is too great for the institution of substantial hardware-based restrictions to become a viable alternative for protecting data. A popular alternative is information-based access controls, such as passwords. The vulnerabilities of information-based access controls to security lapses are evident from the billions of dollars in damages caused by computer viruses that are spread over the Internet and malicious attacks on Web sites.

The first step towards more substantially protecting a computer system requires ensuring the security of the system's data. The ability to comprehend the data can be selectively controlled with encryption. Encryption methods generally utilize a mathematical algorithm to transform the legible data (plaintext) into an encrypted form (ciphertext), that can not be comprehended without the knowledge and use of a key to decrypt the encrypted form. The quality of the data protection relies on the complexity of the algorithm, plus the size and the safekeeping of the key. In 1972 the National Bureau of Standards, now the National Institute of Standards and Technology (NIST), issued the first public request for an encryption standard. The result was the Data Encryption Standard (DES). This 30-year old symmetric algorithm standard uses a 64-bit block cipher to encrypt data with a 56-bit private key. Recent advances in distributed key search techniques have demonstrated that the DES' 56-bit key, which is the source of security when using the DES, is too short for today's security applications.

An improvement on DES was accomplished with the use of Triple-DES. Triple-DES uses a 168-bit key which is broken into three different 56-bit keys that are used to successively encrypt, then decrypt, and finally re-encrypt 64-bit blocks with the DES algorithm. While an improvement on DES, Triple-DES shares the characteristic limitation of DES' 64-bit block length, which is exposed to attacks when large amounts of data are encrypted under the same key. Due to the shortness of the 56-bit key, and the significant number of repeated encryptions necessary to handle large amounts of data with relatively small 64-bit blocks, patterns of encryption can repeat themselves, can become apparent and thus enable the key to be solved and the data compromised.

In response to the need for an improvement on DES, NIST announced the Advance Encryption Standard (AES) program in 1997. The AES program requested a larger block cipher. Block ciphers can be used to design stream ciphers with a variety of synchronization and error extension properties, one-way hash functions, message authentication codes, and pseudo-random number generators. Because of this flexibility, block ciphers have become the workhorses of modern cryptography. Other design criteria specified by the NIST included a larger key length, a larger block size, faster execution speed, and greater flexibility. The NIST's intent was for the AES to become the standard symmetric block cipher algorithm of the next decade. In October, 2001, the NIST announced the approval of the Rijndael cipher, designed by Vincent Rijmen and Joan Daemen, as the Federal Information Processing Standard (PIPS) for the Advanced Encryption Standard, FIPS-197. Rijndael was chosen based primarily on its efficiency and low memory requirements.

Rijndael is a 128-bit symmetric block cipher that accepts a variable-length key of 128-, 192-, or 256-bits. The cipher is a 16-round Feistel network with a bijective F function made up of four key-dependent 8-by-8-bit S-boxes, a fixed 4 by 4 maximum distance separable matrix over GE, a pseudo-Hadamard transform, bitwise rotations, and a carefully designed key schedule. The design of both the round function and the key schedule permits a wide variety of tradeoffs between speed, data size, key setup time, and memory. Rijndael is a cryptoanalyzed algorithm which is intended to be difficult to either reverse the engineering process to find the keys or guess the code to break the system from the limited amounts of data available. The Rijndael algorithm is a now a well-known technology in the field of encryption, and is explicated in depth at the publicly accessible NIST website "AES home page" at the world wide web URL http://csrc.nist.gov/encryption/aes/.

Today's computers can store and process data at ever increasing rates. This processing power makes them attractive to individuals and businesses, which use them to store and process personal data, hospital records such as patient histories, confidential business data, and other vital information. To ensure that the data is accessed by only authorized users, the data can be protected in a variety of ways. For example, most computer systems require that a user enter a password or pass phrase before she can access the data. Additionally, the computer system can require that the user belong to a specific group that has been granted permission to access the data.

These systems have several drawbacks. First, if the storage device is removed from the computer system, an unauthorized user can access the data on secondary computer storage (e.g., a hard disk), bypassing the security mechanism that relies on a password or pass phrase. Second, because passwords and pass phrases are often limited in length, computer programs can be used to quickly try combinations of symbols to guess user-generated passwords and pass phrases to gain access to the storage device and thus the confidential data.

Several computer systems have offered various solutions. Some versions of the UNIX operating system, for example, support the "crypt" program, an application program that requires the user to enter a password each time she wishes to store data on or retrieve data from a storage device. Other computer systems provide application programs that allow a user to enter a password each time she wishes to store or retrieve data. Still other application-based encryption systems encrypt whole file partitions and do allow encryption of individual files.

These application programs are inefficient for several reasons. First, the application programs require the user to execute it when transferring data between computer memory and secondary memory, a time-consuming process. Second, the application program is inefficient, requiring a context switch each time it traps to the kernel, which contains lower-level, hardware specific code for storing and retrieving data. The extra overhead of a context switch can slow the execution of the program that calls the encryption application program. Furthermore, these application programs can be pre-empted by kernel routines or by other applications having a higher priority. Third, these application programs are not always portable. They may not execute properly on platforms that do not support the application program.

What is needed is a method of and a system for encryption that is fast, seamless to the user, portable, and efficient.

SUMMARY OF THE INVENTION

The present invention is directed to a system for and method of encrypting and decrypting data transferred between a computer's physical memory and a secondary device, such as secondary storage. The system comprises an operating system having a kernel configured to encrypt and decrypt the data. Performing the encrypting and decrypting steps in a kernel provides a more efficient means of encrypting and decrypting data in a protected mode. The kernel is further configured to encrypt path names to the data, thus providing an additional level of security.

In a first aspect of the present invention, a computer operating system comprises a kernel that is configured to encrypt and decrypt data transferred between a computer memory and a secondary device. Preferably, the computer operating system is based on the UNIX operating system. In one embodiment, the kernel comprises an encryption engine. The encryption engine is configured to encrypt clear data to generate cipher data, and to decrypt the cipher data to generate the clear data. In another embodiment, the computer operating system further comprises a memory portion coupled to the encryption engine and configured to store the cipher data. In another embodiment, the encryption engine is configured to encrypt clear data and decrypt cipher data according to a symmetric encryption algorithm, such as the Rijndael algorithm.

In a second aspect of the present invention, a computer system comprises a first device and a second device. The first device has an operating system kernel configured to encrypt clear data using an encryption key to generate cipher data. The second device is coupled to the first device and configured to receive the cipher data from the first device and decrypt the cipher data to generate the clear data. Preferably, the operating system kernel is based on the UNIX operating system. In one embodiment, the operating system kernel is configured to encrypt the clear data using a symmetric algorithm. Preferably, the symmetric algorithm comprises a block cipher, such as a Rijndael algorithm. In another embodiment, the encryption key comprises at least 2048 bits. In another embodiment, the computer system further comprises a communications channel coupling the first device to the second device. The communications channel can comprise a network, such as a local area network (LAN) or the Internet.

In a third aspect of the present invention, a method of encrypting data comprises receiving clear data and executing kernel code in an operating system using a symmetric key to encrypt the clear data to generate cipher data. In one embodiment, the symmetric key encrypts the clear data to generate cipher data according to a block cipher. Preferably, the block cipher comprises a Rijndael algorithm.

In a fourth aspect of the present invention, a computer system comprises a processor, a memory device for storing data, and an operating system comprising a kernel. The kernel is configured to encrypt and decrypt data transferred between a physical memory and the memory device. In one embodiment, the kernel is configured to encrypt and decrypt data using an key management system that uses an encrypting algorithm such as the Rijndael algorithm.

In a fifth aspect of the present invention, a method of accessing a file comprises authenticating a user, checking the user's permission to access the file, and encrypting the file using an encryption key. In one embodiment, encrypting the file comprises dividing the file into a plurality of file segments, each file segment having an associated file segment number, dividing each file segment into a plurality of corresponding file blocks, dividing the encryption key into a plurality of corresponding encryption key segments, permutating the corresponding encryption key segments using the associated file segment number and a first permutation function to produce a corresponding intermediate key, encrypting the corresponding file blocks using an encryption algorithm and the corresponding intermediate key to generate a corresponding first encrypted data, and permutating the corresponding first encrypted data using a second permutation function and the associated file number to generate corresponding final encrypted data. Reversing the steps can be used to decrypt data. In one embodiment, the encryption algorithm comprises the Rijndael algorithm. In another embodiment, the first permutation function differs from the second permutation function. Preferably, each file segment is at least 1024-bits long and the encryption key is at least 2048-bits long.

DETAILED DESCRIPTION OF THE INVENTION

Figure 1:
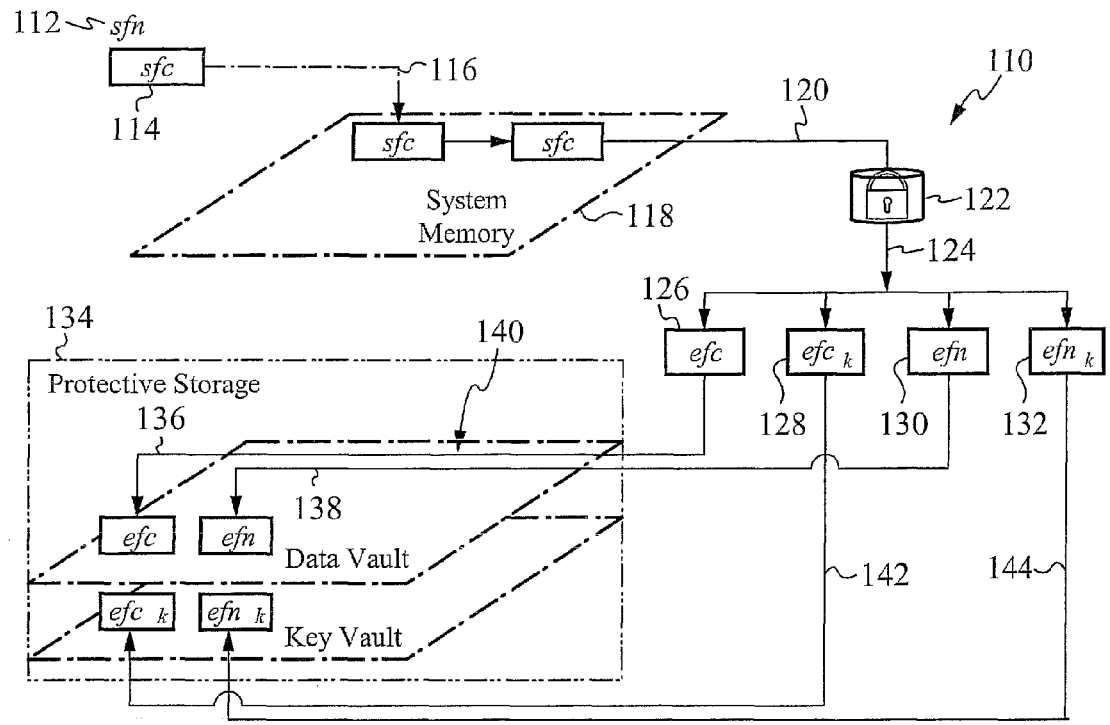
FIG. 1 shows an encrypting operating system and computer memory, in accordance with the present invention.

In the following description, identical numbers indicate identical elements. Where an element has been described in one Figure, and is unaltered in detail or relation in any other Figure, said element description applies to all Figures.

The present invention, termed an Encrypting Operating System (EOS), is a modified UNIX operating system. The EOS is not restricted in operation to a particular UNIX operating system, although its preferred embodiment is based on the architecture of the AT&T UNIX SVR3.4, SVR4, SVR4.2, and SVR5 operating system kernel. For purposes of clarity and consistency, the following description will be restricted to the description of an EOS that is a modified AT&T UNIX SVR4 operating system kernel, but it should be understood that it is within the scope of the present invention to produce the EOS by modifying other UNIX operating systems.

Preferably, the EOS is part of a micro-kernel, such as those found in UNIX System V configurations, including Sun Microsystems Solaris (SVR4.0), Silicon Graphics, Inc., IRIX (SVR4.0), IBM's AIX (SVR3.4), Hewlett Packard's HP-UX (SVR3.4), and Santa Cruz Operations' UNIXWare 7 (SVR5), and later version of each, to name a few. It will be appreciated, however, that embodiments of the present invention can also be used with monolithic kernels, such as Linux and BSD.

The EOS's modifications enable it to encrypt and decrypt both the contents and the names of any data it is managing or storing. The EOS can selectively encrypt data it stores in primary, secondary, or virtual memory. Not only is the EOS able to encrypt the contents of the data it manages, it also is able to encrypt the location (or name) of the file containing the data contents, so that the EOS is required just to locate where the desired data is stored. While some of the examples below discuss using the EOS to automatically encrypt and decrypt data transferred between physical memory and secondary storage, it will be appreciated that in accordance with embodiments of the present invention, the EOS can be configured to encrypt and decrypt data transferred between physical memory and swap space, network buffers, peripheral devices, psuedo files, network files, special files, or any other files or partitions.

The EOS controls access to the encrypted data by managing and authenticating the authorization of any request for access to the data it controls. Once the EOS authenticates that access is authorized, it decrypts the encrypted data prior to furnishing it to the authorized requester. The EOS can operate on both protected and unprotected data. Access to protected data is controlled by the EOS as mentioned above, while unprotected data is governed by the same rules and protections provided by traditional UNIX system kernels. The EOS can be configured to either run as the primary operating system for a computer system or computer systems on a network that connects conventional operating systems, or to run on an add-on system, which is in turn connected to a separate computer system or computer systems on a network that is run by conventional operating systems. When running on an add-on system, the EOS would be monitoring and managing the storage of protected data furnished by conventional operating systems connected by conventional networks.

Protected storage is protected because it cannot be accessed by user processes or users, and thus the data stored there is protected. The data vault and key vault can be protected in many ways. For example, in the UNIX operating system, the data vault and the key vault can be stored within the kernel address space. Under UNIX, as in most operating systems, the kernel address space can only be accessed by the kernel not by other processes or users.

The components added to a traditional UNIX operating system to form an EOS in accordance with the present invention include, but are not limited to, (1) an Expert Management System, (2) Administrative Access Controls, (3) a Data Vault Management, (4) an Expert Data Control System, (5) a Data Vault, (6) an Encrypted File Control System, (7) a Key Vault Management System, (8) a Data Audit System, and (9) a Key Vault.

The EOS kernel differs from, for example, a V3 UNIX Kernel in the following areas: The EOS file system is an essential component of the EOS UNIX kernel environments and it provides a secured mechanism for the safe storage and retrieval of all file data without disturbing the hierarchical directory structure for which the functions for naming of multiple files exist. The EOS UNIX kernel treats each file as an abstract data type, and addresses the securing of data through pointers within structures accessible by the kernel. Therefore, a file or a directory is treated as an abstract of the same structure with a pointer to the data. In the case of the directory, the data is a file, and in the case of the file, the data is the sequence of bits that make up the character set used to define a set for the user.

Under UNIX, a file system enables the operating system to perform the following tasks:
1. Create and delete files;
2. Open files for reading and writing;
3. Seek within a file;
4. Close files;
5. Create directories to hold groups of files;
6. List the contents of a directory; and
7. Remove files from a directory.

The file system is a universal form of keeping and accessing data from application programs. In their modern design, file systems were created while developing the first versions of the UNIX Systems. The file systems became a universal form of data exchange between various application programs. With the coming of the Internet and network added business transactions, this universal feature became a source of possible violations. The UNIX design includes strong enough mechanisms for specifying user/process rights to read or write the file data. This mechanism, known as file permissions, has the strongest extension in the form of credentials. Unfortunately, these mechanisms are not used fully or are not working as, for example, when moving storage devices from one computer to another.

In accordance with one embodiment of the present invention, a file system is protected by combining the protections of (1) a key-management system (KMS), (2) credentials, and (3) encryption. Preferably, the authorization structure corresponds to the structure of an enterprise that uses an EOS.

In accordance with the embodiments of the present invention, under the EOS, the file system is able to perform the following tasks:
1. Create secured files by encrypting data and prevent mass removal of such files without authenticated authorizations for such removal;
2. Provide authenticated authorized access to secured files for the opening of files for reading and writing to such files;
3. Provide authenticated authorization to perform seek with a file;
4. Closing secured files by first encrypting the data before closing the file;
5. The creation of secured directories under the EOS provides protection to files within a directory by encrypting the contents of directories (names of files);
6. Prevents unauthorized listing of the contents of a directory by controlling the decryption of the contents; and
7. Prevents the unauthenticated and unauthorized removal of encrypted files by controlling access to the encrypted file names which are contents of the directories.

The EOS kernel uses a file as an abstraction to address a linear range of bytes, which are to be stored on some form of input/output medium, typically a storage device such as a SCSI disk. To access a file, the EOS kernel provides facilities to seek with each file to allow random access to the encrypted data.

A computer's resources for managing memory functions and servicing data files are directed by the operating system. A conventional Unix system has two entities, files and processes, and is organized into three levels: User processes, Kernel processes, and Hardware. The main control system is the Kernel level which controls the entire file system, the virtual memory, the loader, the block driver switch and the character driver switch. The modifications that comprise the EOS are primarily at the kernel level, while interacting intimately with other components at other levels.

Among the EOS's principal UNIX modifications are the addition of mutually reinforcing encrypting and access controlling systems that provide enhanced data security both separately and in combination. When the EOS stores data, both the contents and the name of the data file are encrypted and stored in an Encrypted File System. The file contents are encrypted with a symmetric block cipher, in block sizes ranging up to 1024-bits, using a symmetric encryption key of up to 2048-bits. This enables the EOS to provide security with four modes of controlled access encryption. The file is first separated into two data blocks, one containing the file's contents and the other containing the file's name. The contents of the file are encrypted and a symmetric encrypted file contents key is generated, and separately, the name of the file is encrypted and a distinct symmetric encrypted file name key is generated. The contents of the file cannot be deciphered without the correct encrypted file contents key, and the file desired cannot be located without the correct encrypted file name key to decipher the file's name. The four modes of securing data are then:
1. Encrypting the contents of a data file;
2. Securing the encrypted file contents encryption key;
3. Encrypting the name of a data file; and
4. Securing the encrypted file name encryption key.

The EOS, like UNIX, treats files as abstractions. This framework provides a single set of well-defined interfaces that are file-system independent; the implementation details of each file system are hidden behind these interfaces. Two key objects represent these interfaces: the virtual file, or vnode, and the virtual file system, or vfs objects. The vnode interfaces implement file-related functions, and the vfs interfaces implement file system management functions. The vnode and vfs interfaces call appropriate file system functions depending on the type of file system being operated on. File-related functions are initiated through a system call or from another kernel subsystem and are directed to the appropriate file system via the vnode/vfs layer. It will be appreciated that in accordance with the present invention, UNIX file systems (e.g., s5fs and ufs) and non-UNIX file systems (e.g., DOS and A/UX) can be used to store encrypted data on and retrieve data from, for example, a secondary device.

In one embodiment of the present invention, the encryption and decryption functions are contained within wrapper functions, vnode methods. For example, when writing a file to a swap device, the vnode method can be altered to contain a first system call or kernel trap to encrypt the data and a second call or kernel trap to write the encrypted data, both calls contained within a single wrapper function or method. Similarly, the when reading a file from a swap device, the wrapper function or method and contain a call or kernel trap to read the encrypted data and another call or kernel trap to decrypt the encrypted data. It will be appreciated that the present invention can be implemented in other ways.

In a preferred embodiment, a UNIX operating system kernel is modified to produce the EOS. It will be appreciated, however, that a UNIX operating system can be modified at other levels to achieve the present invention. Preferably, changes to the kernel to implement the EOS are made to the vnode/vfs interface. An Encryption File System connects to the vfs interface in a manner similar to any of the conventional files systems for example, the UFS file system, but are performed to the particular file system and implemented as a sub-system to the EOS kernel.

The EOS takes advantage of the fact that UNIX treats peripheral devices as files. Thus, the EOS sends encrypted data to a peripheral device simply by encrypting the data, as described above, and writing to the peripheral device, just as it writes to a file; similarly, the EOS reads encrypted data from the peripheral device, just as it reads from a file, decrypts the data, and sends the data to a buffer from which it can be accessed by, for example, a process waiting to read the data.

Thus, as described below, data can be encrypted and decrypted when exchanged between a terminal device, a secured terminal device, a stream input device, a block device, a tape storage unit, a SCSI device, or any other type of device.

Thus, for example, when using a terminal, data is manually entered into a terminal device connected to a terminal server which connects to a character device driver for delivery to the EOS kernel. All data entered into such a device shall be transported to the EOS via a buffer. The buffer shall be a secured data structure and read from by a secured process within the kernel. During the transfer of the data from the terminal device to the kernel, the process performing the transfer, shall be secured through the kernel protective mode. During the transfer, no other processes shall be scheduled to preempt the processes writing to the buffer or reading from the buffer.

The EOS can also be used to transfer data from secured terminal devices, which are tty files that have been altered or modified to ensure the safe transfer of data into secured portions of the encryption file system. A secured terminal uses a secured character driver that encrypts the data during the transfer by first encrypting the file name at the time the file is opened. All data when saved using a secured terminal device is encrypted by the character device driver that has been modified to encrypt the contents of the buffer before transferring the data to the disk. Secured terminals are special devices that allow manual inputs of secured information. When data is saved before closing a file, the contents of the file are taken from the storage, decrypted, new data is appended to the decrypted data, and the data is again encrypted and stored once again until the file is complete and stored for the final time.

Data can also be entered into the EOS through the deployment of STREAMS, a software construct affiliated with SVR4 and which uses software drivers such as STREAM HEADs and STREAMS Bodies as well as other constructs used under the SVR4 kernel to ensure the secured delivery of data into the EOS kernel. A STREAM input is considered to be a character input and therefore uses character drivers to transfer data between STREAM devices and the EOS kernel. STREAMs are used when data is being transferred locally between unsecured portions of the EOS file systems and those areas considered to be secured portions of the EOS. User accounts on the EOS managed under the standard UNIX file systems local to the EOS may elect the use of STREAMs to purport secured data across file systems into secured file systems within the EOS. STREAMs are discussed in more detail below.

Block devices, such as hard disks, floppy drives, tape units (such as digital audio tapes), and CD-ROM drives, can also use the EOS to store encrypted data in accordance with the present invention. As used herein, the term "Secured Blocked Device drivers" are used to store encrypted data. When writing data to a block device in accordance with the present invention, the EOS first encrypts the data and then calls the appropriate device driver. When reading encrypted data, the EOS calls the device driver, decrypts the data, and transfers it to a buffer from which the calling process can read it.

Because data stored in the devices of a computer system are not always encrypted, it will be appreciated that the EOS can be configured to support regular block devices and secured block devices, which stores encrypted data in accordance with the present invention. Therefore, for every device driver under a conventional operating system, there exists two such device drivers under the EOS. One for conventional file systems and one for secured file systems such as the encrypting file system.

When the block device is a tape storage unit, it will be appreciated that the tape storage unit must first be formatted under the particular EOS under which it is going to store encrypted file systems.

In one embodiment, when the device is formatted, the EOS shall store in the super block of the device an alphanumeric value, the encrypted key for the device. Similar to the disk storage unit, the super block on the tape shall contain other types of information that will allow the blocks to be accessed by the particular EOS under which it was formatted.

Every tape storage system stores data at the beginning of each tape (in its super block), pertaining to the format of the tape and how to map out the blocks on the remainder of the tape. The secured super block on a secured tape which handles an encrypted file system, contains information that prevents the tape from being mounted by a conventional operating system or by other EOS's that do not possess the encrypted key embedded in the super block. If that tape is mounted on an EOS without permission, even if the encryption algorithm is the same, without the appropriate key to read the secured tape, the format on the tape cannot be read. Components used to generate the unique encrypted key stored in the super blocks of each tape storage unit are contained in the secured blocked device drivers which are by design, local to the environment or a particular site and therefore may contain unique site and environment variables (such as company name, system ID, department, and other UNIX credential components) as well as segments of the ownership keys. All this data is encrypted and stored both in the secured block device drivers as well as contained in the super blocks of the secured blocked devices themselves. The secured blocked device driver is designed to handle the reading and writing operations for storage and retrieval of encrypted data from tape storage units as well as disk storage units.

In accordance with the present invention and in addition to those functions provided by the core operating system, the EOS provides the following additional functions: (1) it creates secured files by encrypting data; (2) it prevents the mass removal of files; (3) it provides authenticated authorized access to secured files, for opening, reading, and writing; (3) it provides authenticated authorization for seeking within a file; (5) it ensures that when files are closed, and thus written back to disk, the files are encrypted; (6) it encrypts secured directories, thus securing them; (7) it prevents the unauthorized listing of directories; and (8) it controls access to the encrypted file names (i.e., the contents of the directories), thus preventing the unauthenticated and unauthorized removal of the encrypted files.

The Expert Management System controls the processes that break up the data blocks and execute the encryption and storage functions. The Expert Management System controls the encryption of a file's contents and name with an Encryption Function Machine. Once the file has been encrypted, there are four elements of encrypted data for every block of the original file: the encrypted file contents, the encrypted file contents encryption key, the encrypted file name, and the encrypted file name encryption key. The Expert Management System controls the associations of the four encrypted data elements with the original file.

Additional security is provided through the organization of and controlled access to the fifteen (15) storage areas that are under security. The Encrypted File System stores the encrypted data in two main storage areas: a data vault (D-Vault) for storage, separately, of the encrypted file contents and the encrypted file name, and a key vault (K-Vault) for storage, separately, of the encrypted file contents key and the encrypted file name key. The vaults are designed and constructed using data base primitives and controls which allow files and directories to be accessed randomly, from any position in the storage medium. An Expert File Control System is another subsystem of the EOS, and includes a Data Vault Management Subsystem and a Key Vault Management Sub-System which control access to the D-Vault and the K-Vault, respectively.

The preferred embodiment of the present invention is directed to a method of and a system for encrypting file and directory data. In accordance with one embodiment of the present invention, data can be encrypted whenever it is transferred from computer memory. For example, data can be encrypted when a file is closed and a processor's buffers are flushed, when it is written to secondary storage, when it is swapped out to secondary storage to make room for other processes executing on the computer system, when it is sent to a network interface card for transmission over a network, or any other appropriate time.

The preferred embodiment of the present invention comprises an EOS comprising a kernel that uses a combination of means to encrypt and decrypt data at the kernel level. First, the EOS requires a user to enter a password or pass phrase before he can access data on the computer system. Without the password or pass phrase, the user cannot access the data. Second, the user must belong to a group that has been granted access privileges to the data on the computer system. Without the access privileges, the user cannot access the data. Third, the user must access the data on the computer system that stored the data. Thus, for example, if a user detaches the computer storage device from a first computer system used to store the data and attaches the storage device to a second computer system, the user would be unable to access the data in any usable form. Thus, a user could not avoid the protection mechanisms merely by detaching a storage device and re-attaching it to another computer system.

As described in detail below, the encrypted portion of a file system contains a directory, with encrypted directory entries. Furthermore, the file data associated with the i-nodes contain encrypted data. Thus, before an unauthorized user can read the contents of a file, he would have to undertake a two-step process. First, the unauthorized user would have to encrypt the encrypted file name to find the correct entry into the directory. This step is impracticable when the file name is encrypted using a long key, such as a 2048-bit symmetric key. If the unauthorized user finds the correct directory entry and the location of the file data (whose addresses are contained in the direct, single-, double-, and triple-indirect pointers), he would then have to decrypt the file data. This step is also impracticable when the data is encrypted using a long key, such as a 2048-bit symmetric encryption key that is only accessible by the lower-level kernel encrypting functions and is not accessible by the user.

As an added level of security, preferably the encryption keys are also encrypted.

Embodiments of the present invention include an EOS that is preferably based on micro-kernel based Unix operating systems such as Unix System 5 Releases 3 through 5. The present invention can also be based on monolithic kernels such as versions of Linux and BSD including, but not limited to, NetBSD and FreeBSD.

Encrypted File System

The encrypted file system is a subsystem of the operating system that stores the file's encrypted data contents in a data structure also termed a data vault. The encrypted file system stores in separate entries in the D-Vault both the encrypted contents of the file and the encrypted name of the file. The contents of the file are encrypted with a symmetric encryption operation that generates the encrypted file contents key. The file contents are encrypted in symmetric block ciphers of up to 1024-bits, with a symmetric key of up to 2048-bits. Similarly, the file name is encrypted with a symmetric encryption operation that generates the symmetric encrypted file name key of up to 2048-bits.

In FIG. 1, a schematic representation 110 of steps the present invention performs in encrypting and protectively storing files is depicted. A user or process provided system file has an initial name sfn 112 and initial data content sfc 114. Upon entry 116 into the system protected by the present invention, the user or process provided system file is initially stored by the kernel in a system memory 118. From the system memory 118, the user provided file is input 120 to an EOS 122 according to the present invention. In an encrypting step 124, the EOS 122 produces four encrypted results: an encrypted file contents efc 126, an encrypted file contents key $efc_k$ 128, an encrypted file name efn 130, and an encrypted file name key $efn_k$ 132. The EOS then places the four encrypted results in protective storage 134. In protecting steps 136 and 138 the efc- and the efn, respectively, are stored in a data vault portion 140 of the protective storage 134. In protecting steps 142 and 144 the $efc_k$ and the $efn_k$, respectively, are stored in the key vault portion 146 of the protective storage 134.

Figure 12:
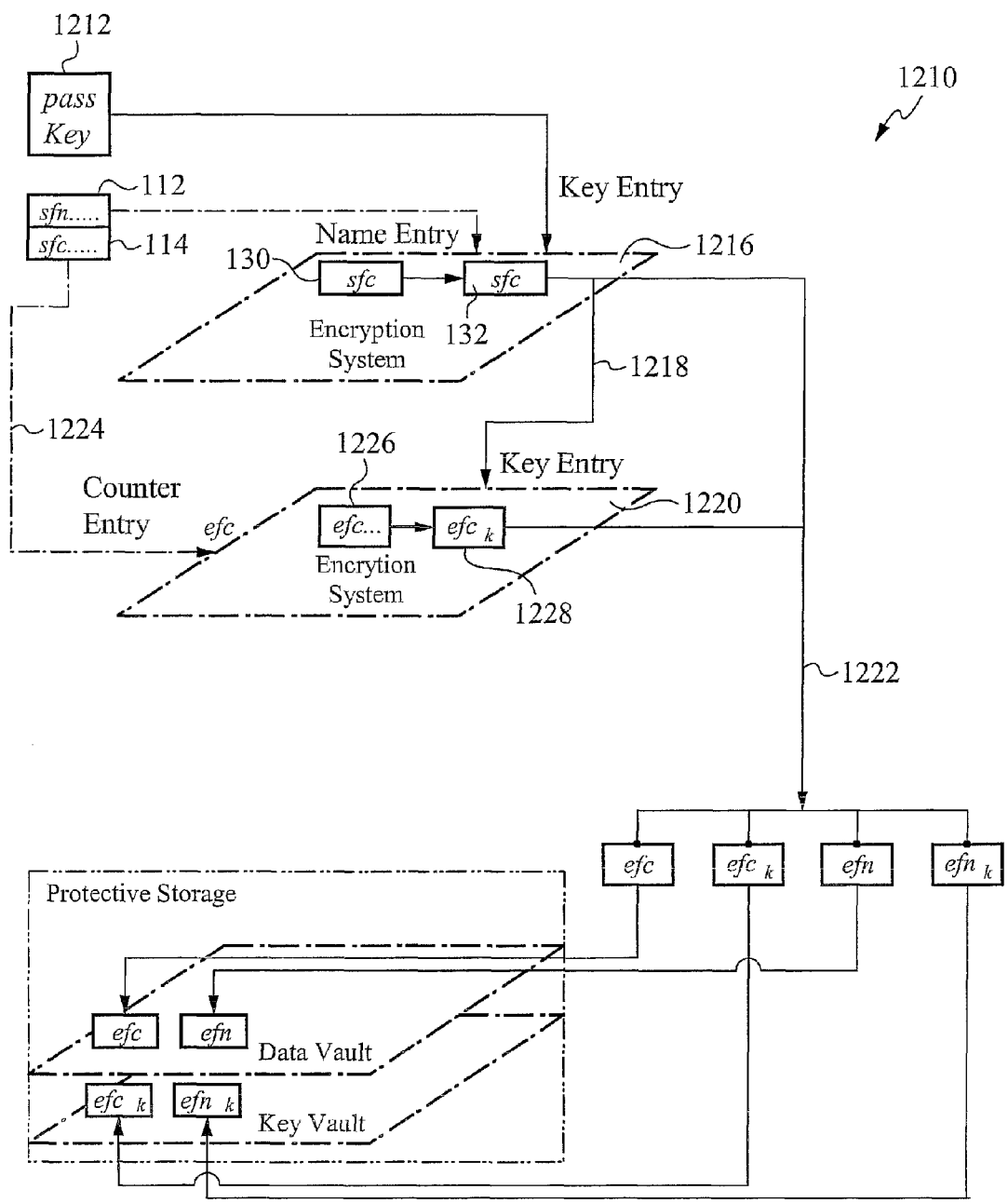
FIG. 12 is a more detailed schematic of the steps shown in FIG. 1.

FIG. 12 depicts a more extensively detailed schematic representation 1210 of the manner in which the EOS 122 performs the encrypting step 124 of FIG. 1. Along with the user or process provided system file initial name sfn 112 and initial data content sfc 114, the user or process also provides an initial passkey 1212. The sfn 112 and the passkey 1212 are entered into a first encryption process 1216 in which the EOS 122 produces the efn 130 and the $efn_k$ 132. The $efn_k$ 132 is then entered 1218 into a second encryption process 1220. The $efn_k$ 132 is also entered 1222, as is the efn 130, into the protecting steps 144 and 138, respectively. The sfc 114 is entered 1224 into the second encryption process 1220 along with the efnk 132. The second encryption process 1220 utilizes both the sfc 114 and the $efn_k$ 132 to produce both the efc 1226 and the $efc_k$ 1228. The efc 1226 and the $efc_k$ 1228 are then entered 1222 into the protecting steps 136 and 142, respectively.

Figure 2:
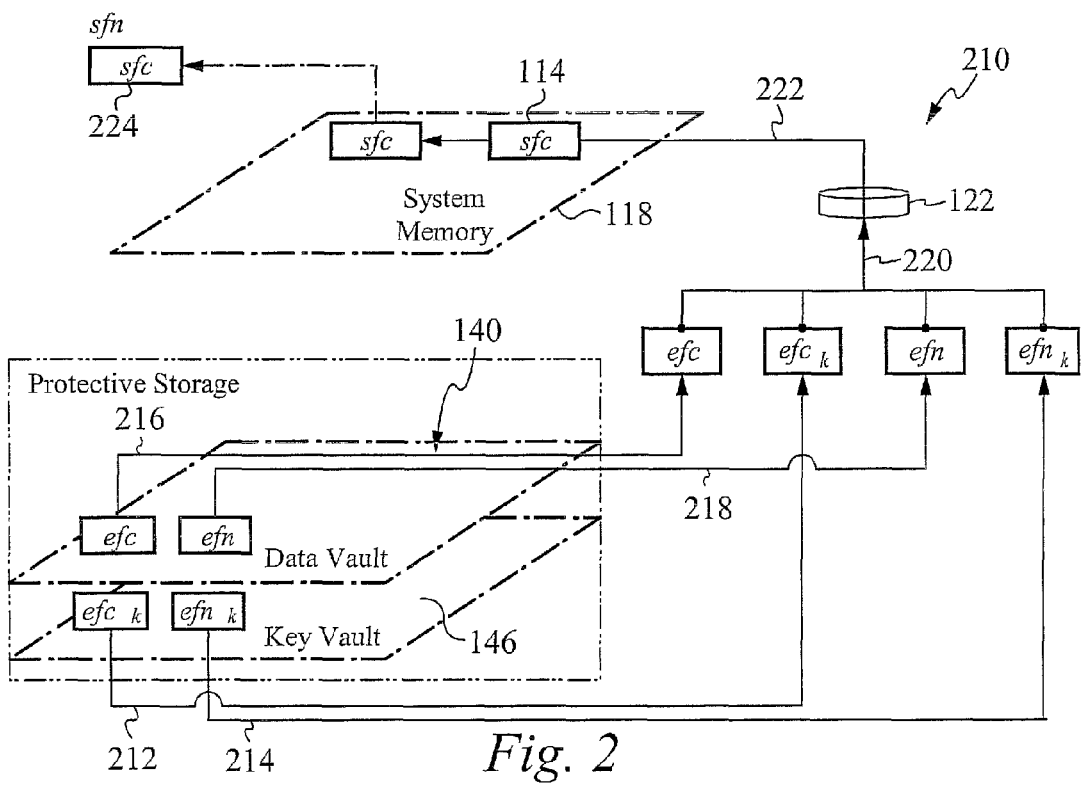
FIG. 2 shows an encrypting operating system and computer memory, in accordance with the present invention.

In FIG. 2, a schematic representation 210 of steps the present invention performs in retrieving from protective storage and then decrypting files is depicted. The $efc_k$ and the $efn_k$ are retrieved by the EOS 122 from the Key Vault 146 in retrieval steps 212 and 214, respectively. The efc and the efn are retrieved from the Data Vault 140 by the EOS 122 in retrieval steps 216 and 218, respectively. The EOS 122 integrates and decrypts these data components in step 220, and enters the newly reconstituted original data file contents sfc 114 in the System Memory 118. The reconstituted file is then accessed by the user from the System Memory 118 in step 224.

Figure 3:
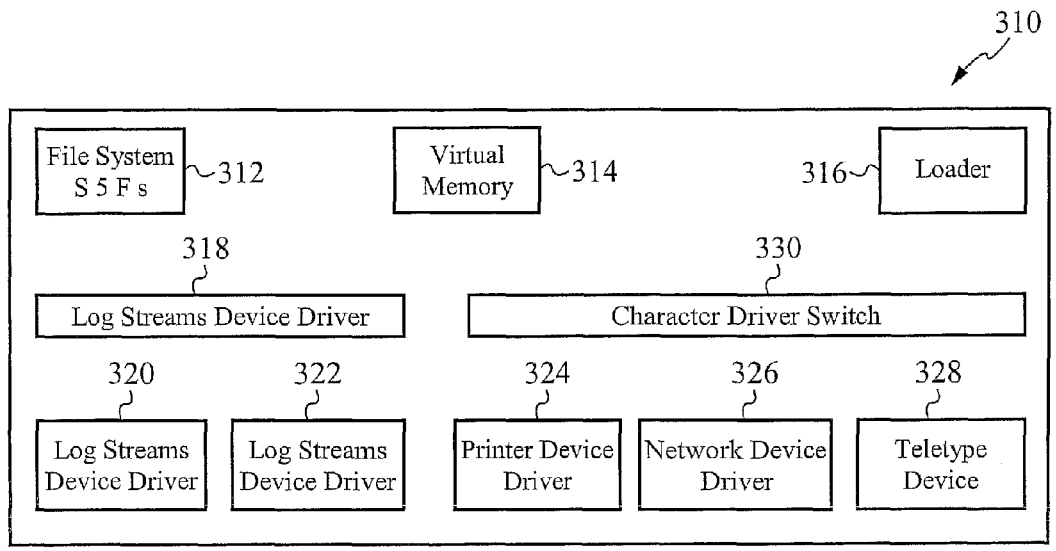
FIG. 3 shows the software components that form a traditional UNIX kernel.

In FIG. 3, a schematic representation of the sub-system components of a traditional UNIX kernel 310 is depicted in order to illuminate the modifications to the traditional UNIX operating system which comprise the EOS. Among the common sub-system components of a traditional UNIX operating system are a File System 312; a virtual memory 314; a loader 316; log streams device drivers 318, 320, and 322; printer device driver 324; a network device driver 326; a teletype device driver 328; and a character device driver 330.

Figure 4:
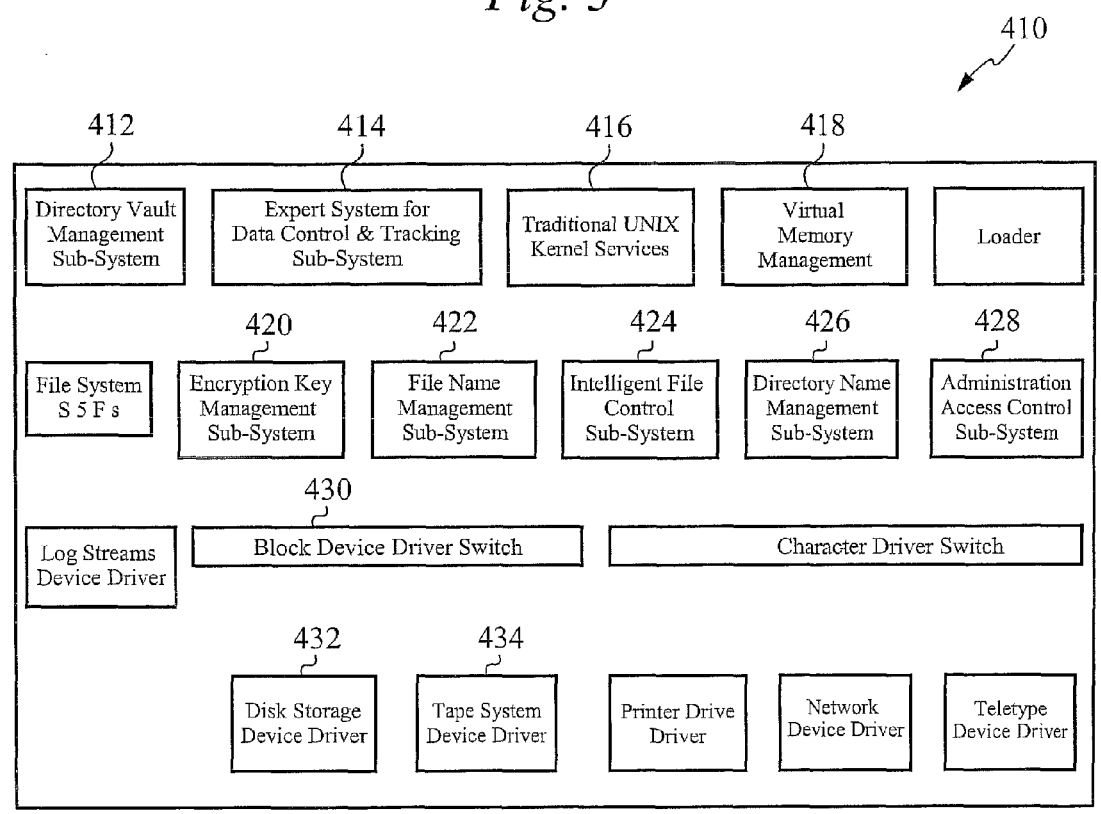
FIG. 4 shows the software components that form an encrypting operating system in accordance with the present invention.

In FIG. 4, a schematic representation 410 of the components of the EOS is depicted. In addition to the traditional UNIX operating system components depicted in FIG. 3, the schematic representation 410 also portrays the additional components of the EOS that comprise this embodiment's modifications to the traditional UNIX operating system. Among these modifications are the inclusion of a data vault management sub-system 412, an expert data control and tracking sub-system 414, a supplementary traditional UNIX kernel services sub-system 416, a virtual memory management sub-system 418, an encryption key management subsystem 420, a file name management sub system 422, an intelligent file control sub-system 424, a directory name management subsystem 426, and an administration access control sub-system 428. Additional components depicted include a block device driver switch 430, a disk storage device driver 432, and a tape system device driver 434, all of which represent conventional UNIX components that could also be included within the traditional UNIX kernel 310. The supplementary traditional UNIX kernel services sub-system 416 has been added to the traditional UNIX kernel design to provide the necessary facilities for encrypting and controlling data, as well as tracking access authorizations to data throughout the life of the data in the computer system or network being protected by the EOS 122.

Expert Data Control System

The Expert Data Control System provides intelligent control of the Data Vault Management System and its sub-systems. The Expert Data Control System controls all data movements, interprets and authenticates all requests for data, and authenticates authorization for access and administration of all directory names, directory contents, and encrypted file contents. The Expert Data Control System is able to perform its functions without human intervention and uses various aspects of artificial intelligence including reasoning, learning, inferences, and assertions. The Expert Data Control System preferably implements its artificial intelligence capabilities with rule-based heuristics, genetic programming, and neural network approaches combined with Kalman Filtering Theory applied to stochastic predictions.

Figure 5:
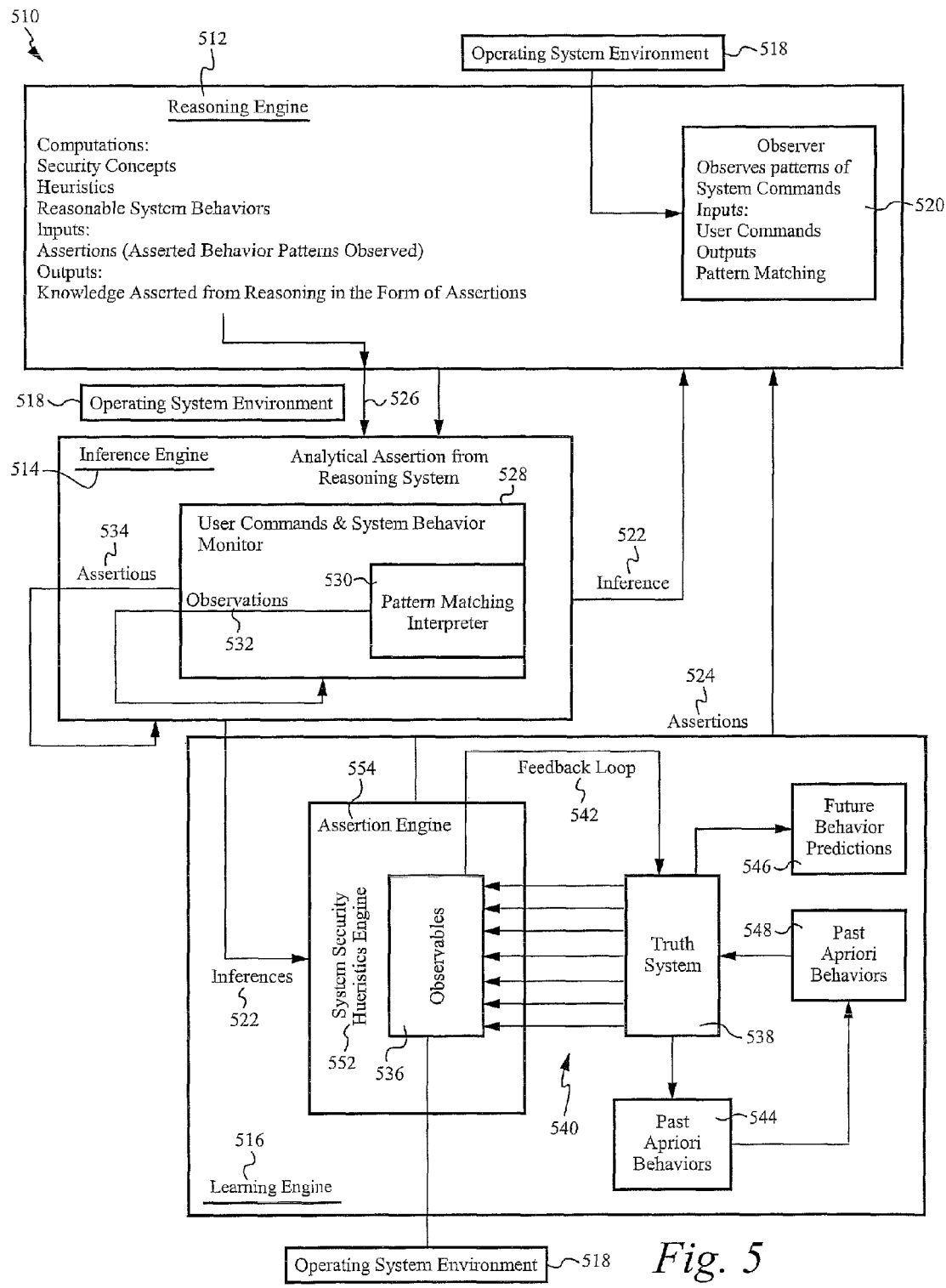
FIG. 5 is a block diagram showing the functions performed by an Expert Data Control System, in accordance with the present invention.

FIG. 5 depicts an abstract representation of the operations of the Expert Data Control System 510. The Expert Data Control System 510 includes three important subsystems: a reasoning engine 512, an inference engine 514, and a learning engine 516. Each of these three subsystems receives input from the operating system environment 518. The operating system environment 518 input is received by an observer 520 component of the reasoning engine. The reasoning observer 520 receives user commands among other inputs and conducts observations of patterns of system commands. Among the outputs of the observer 520 are matches with previously observed patterns. Inputs to the reasoning engine 512 also include inferences 522 that are outputs from the inference engine 514, and assertions 524 that are outputs from the learning engine 516. The outputs of the reasoning observer 520, in combination with the inferences 522 and the assertions 524, are processed by the reasoning engine's 512 reasoning algorithm.

The reasoning algorithm utilizes security concepts, heuristics, and definitions of reasonable system behavior patterns to formulate reasoned assertions about the new observations of the operating system environment 518. These reasonable system behavior patterns are sets of rules based on commands for conducting general system operations. Acceptably reasonable behaviors consist of command patterns that can be recognized by a reasoning command interpreter which has been pre-programmed to interpret certain command patterns and translate them into recognizable explanations and predictions about security. The reasoning algorithm then formulates assertions based on past command patterns, as well as what was previously asserted in response to those past command patterns, which either led up to an event that threatened security, or lead up to an event where the system's security was not threatened at the termination of a session. Among the reasoning engine's observations are commands and command patterns, both singly and in combinations; past commands and their expected responses; attempts to understand user expectations about the system's responses; and reactions by the user to the system's responses. Reasoned assertions 526 produced by the reasoning algorithm, and that are output from the reasoning engine 512 and input to the inference engine 514, include reasoned assertions determined to be plausible enough to be inferred as truths about a given observed situation.

The reasoned assertions 526 generated by the reasoning engine are statements that relate to observations of commands from a given user. The reasoning engine 512 is based on rules that interpret what a particular command means to the operating system, the ramifications of that command when issued in concert with other commands, and develops assertions about the effects of such a command on the security of the system. The command sensitivities towards security threats of the reasoning engine 512 are able to be self-modifying in response to adjustments indicated by the output assertions 524 from the learning engine 516.

A user commands and system behavior monitor 528 component of the inference engine 514 receives inputs from the operating system environment 518. The user commands and system behavior monitor 528 monitors and filters ongoing user commands and actions, generates an interpretation of what the user expects the system's responses to be, and compares the generated interpretation to further commands that the user may issue. A pattern matching interpreter 530 component of the user commands and system behavior monitor 528 produces inferred pattern observations 532 about the monitored user commands and system behavior. The inferred pattern observations 532 are also input for the user commands and system behavior monitor 528. Assertions 534 produced by the user commands system behavior monitor 528 are judgments about and responses to any attempt on the part of the user that might threaten the security of the system or its files. An inference algorithm processes information from the user commands and system behavior monitor 528 about the security of the system, the assertions 534, and the reasoned assertions 526 to produce the inferences 522 about the security of the operating system.

Observations of the operating system environment 518 are received by an observables component 536 of the learning engine 516. A truth system 538 represents a compilation of what the learning engine 516 has determined to be true, and how the learning engine 516 evaluates the truth of propositions. The truth system 538 provides the compilation of truths as input 540 to the observables component 536 for comparison to input from the operating system environment 518. These comparisons are feedback 540 to the truth system 536 to facilitate ongoing truth evaluations. The truth system 538 is continuously updated through re-evaluations of its knowledge of past behaviors 544 and future behavior predictions 546 by a gains and adjustments component 548. The gains and adjustments component 548 utilizes applied Kalman filtering, depicted in FIG. 6, to develop new knowledge and reassess current knowledge for incorporation in the true system 538. A system security heuristics engine 552 processes information from the observables 536, truth system 538, and operating system environment 518 with a learning algorithm that also takes into account the inferences 522 and the associated assertions 526. The results of the learning algorithm are the basis of the assertions 524 produced by a learning assertion engine 554. The assertions 524 are based on knowledge that the expert system thinks it knows about a certain set of actions being taken by a particular user. Adjustments to this knowledge from the gains and adjustments component 548 are gains in a knowledge base model, including gains in knowledge about particular users and their intentions when using the operating system.

Application of Kalman Filtering Theory

Figure 6:
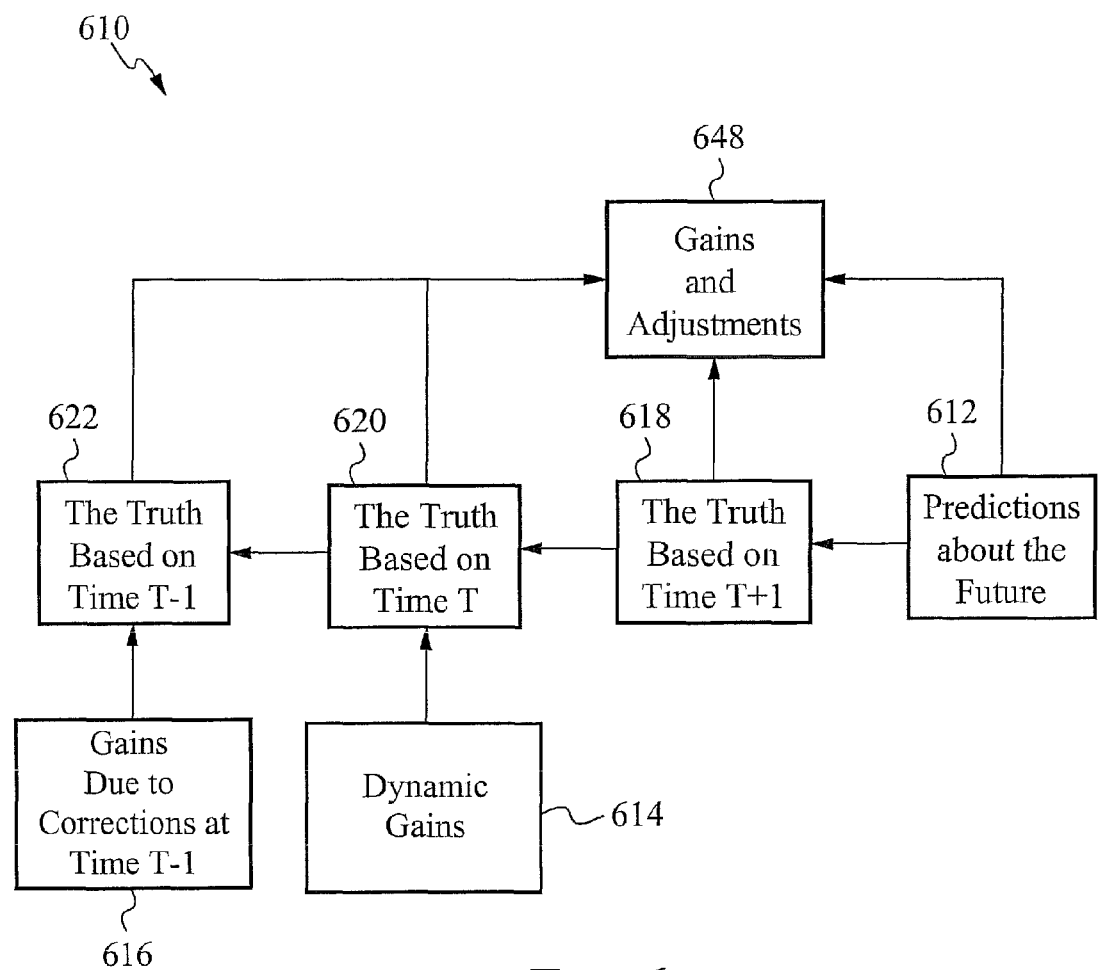
FIG. 6 is a block diagram showing the steps of a gains algorithm, in accordance with the present invention.

FIG. 6 depicts an abstract schematic representation of a gains algorithm 610 of the application of applied Kalman filtering by the gains and adjustments component 548. Kalman Filtering is employed to generate predictions, and is utilized by the EOS in various ways, the gains algorithm can be the one example of such a utilization. The Kalman Filter generates a prediction about a file's state of security, both presently and in the future. The prediction incorporates previous assessments of risks to that file's state of security when last opened or modified, and takes into account commands used against the file when it was previously opened or modified. The prediction model is updated by the gains algorithm's 610 dynamic modifications to the prediction model's security assessments. Among the elements that are taken into account by the gains algorithm 610 are predictions about the future 612 such as those supplied by the future behavior predictions 546, dynamic gains 614 from the system's ongoing operations, and gains due to corrections at time T−1 616.

The gains algorithm works on a time step principle. A given point in time is indicated by the variable T. The previous point in time is indicated by the variable T−1, and the next point time is indicated by the variable T+1. The predictions about the future 612 enter into both an assessment of the truth based on time T+1 618 and the overall gains and adjustments 548. The assessment of the truth based on time T+1 618 enters into both an assessment of the truth based on time T 620 and the overall gains and adjustments 548. The dynamic gains 614 from the system's ongoing operations also enters into the assessment of the truth based on time T 620. Both the assessment of the truth based on time T 620 and the gains due to corrections at time T−1 616 enter into an assessment of the truth based on time T−1 622. Lastly, both the assessment of the truth based on time T 620 and the assessment of truth based on time T−1 622 also enter into the overall gains and adjustments 548.

Key Management System

The key management system manages the keys generated when encrypting a file's contents and name. The key management system is also employed to manage the encrypted file contents and name keys when decrypting an encrypted file's contents and name. The key management system contributes to controlling access to the contents of files by controlling access to the names of the files and the names of the directories and assists the kernel in controlling where the file names and the file contents are being stored. An encrypted file's name and contents can only be decrypted with their correct, respective keys. Only once the file's encrypted name is decrypted, can an encrypted file's contents be located. Even if encrypted file names are exposed, the encrypted name of one encrypted file cannot be distinguished from another encrypted name. The encrypting of the files' path or its name enhances the protection of the encrypted files integrity and the safeguarding of their contents.

The encrypted file names and the encrypted file contents reside within a protected area of the storage medium termed a data vault. The data vault is a data structure that is an encrypted directory, with the difference that all the file names within the data vault are encrypted. The EOS's addition of a key vault data structure is a further distinction from the standard file directory system of organizing storage. The key vault is a protected area of the storage medium (a directory) that contains the encryption keys. The key vault and the data vault are separate data structures.

It will be appreciated that in accordance with one embodiment of the present invention, symmetrical encryption algorithms are used, thus the same key is used to both encrypt and decrypt data; thus, the term "encryption key" shall refer to a key used to both encrypt and decrypt data. It will be appreciated that in accordance with the present invention, a symmetric key is preferable because (1) a single key can be used to encrypt and decrypt data, simplifying key management; (2) keys are relatively easy to generate since a number does not have to be factored into prime numbers as required when using public-key encryption schemes; and thus (3) a larger number of possible keys can be quickly generated. Nevertheless, in an alternative embodiment, public keys can also be used in accordance with the present invention.

The Key Management System is a secure extension to the Unix file system. System and file credentials is combined with a secure passphrase (user or system input character string) to generate and manage the secure encryption keys. It will be appreciated that file credentials can be inherited. For example, when a user invokes a process or application program, the process or application program inherits the user's credentials. Similarly, if a first application or process invokes a second application or process (such as a child process), the second application or process inherits the credentials of the first application or process.

In a traditional UNIX file system, a file has several components including: a file name, file contents, and administrative credentials information such as permissions and modification times and dates. The administrative information is stored in an i-node along with essential system data such as file size, file creation information, file owner and where on the disk the contents of the file are stored. There are also three times recorded in the i-node: the time that the contents of the file were last modified; the time that the file was last used; and the time that the i-node itself was last altered.

For the EOS of the present invention, an e-node structure fulfills the role of the traditional i-nodes. The e-node structure contributes to the processes of encrypting and protectively storing data, as well as facilitates intelligent evaluations of user actions. The kernel uses the e-node to read the e-node contents into an in-core e-node to manipulate the encrypted data. A number of fields comprise an e-node, including an e-file (encrypted file) owner identifier field. File ownership is divided between an individual owner of the encrypted file, and a "group" owner and defines the set of users who have access rights of a file. The owner of the computer system has access to all encrypted file contents, while a superuser only has access to file contents they are specifically authorized for. Other fields included within the e-nodes are spelled out in the immediately following descriptions of FIGS. 7 and 8.

Figure 7:
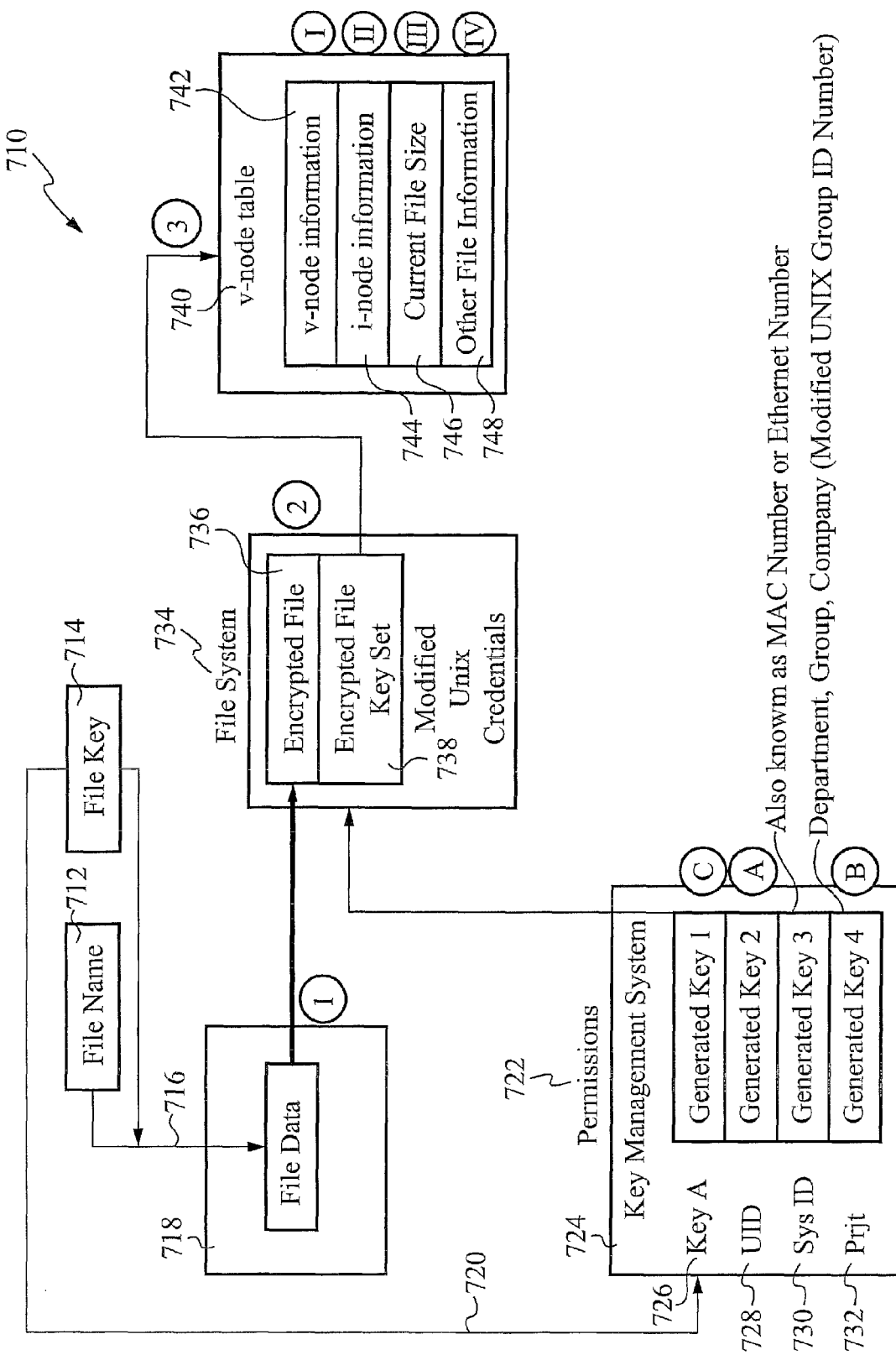
FIG. 7 is a block diagram showing the steps performed by a Key Management System, in accordance with the present invention.

FIG. 7 is a schematic representation of a key management procedure 710 according to one embodiment of the present invention. A user provided file name 712 and file key 714 are entered 716 into the system's file data 718. The user provided file key 714 is also entered 720 into a permissions subsystem 722. A permissions key management system 724 controls the encryption keys used to accomplish the functions of the permissions subsystem 722. The permissions key management system 724 generates and manages keys associated with permissions functions. These may include a generated key 1 726 in response to the key A from the user provided file key 714, a generated key 2 728 in response to the user ID, a generated key 730 in response to the system ID (such as a media access controller (MAC) or an Ethernet card number), and a generated key 4 732 in response to project information (such as a department, group, company, in any combination forming a modified UNIX group ID). The generated keys 726-732 from the key management system 724 and the file data 718 are entered into an encrypted file system 734. The file system 734 produces an encrypted file 736 and an encrypted file key set 738 (e.g., modified UNIX credentials). The encrypted file 736 and the encrypted file key set 738 are entered into a v-node table 740. The v-node table 740 contains information, including modification times and dates, about data in the virtual memory of the system. Included among the information in the v-node table 740 are v-node information 742, i-node information 744, current file size 746, and other file information 748. The additional information elements included in the e-node structures can include the various information elements contained within the permissions subsystem 722, the encrypted file system 734, and the v-node table 740.

Among the components used by the EOS to authenticate a user are: the file name, the file contents, and administrative information. Using system-dependent information (such as a MAC address) to verify a user, has the advantage of ensuring the data can only be decrypted on the machine that it was encrypted on. This added level of security ensures that an unauthorized user cannot remove a storage medium from one computer system and read data on the storage medium on a second device. Preferably, data can only be decrypted and thus read from the computer system on which it was encrypted and stored.

Among the permissions used by the EOS are: owner rights to encrypted file information, group rights to encrypted file information, and other rights to encrypted file information. The file modification times and dates tracked by the EOS are: the time that the contents of a file were last encrypted or modified, the time that the file contents were last used while unencrypted, and the time that the i-node itself was last changed. Also, it will be appreciated that in accordance with the present invention, access rights to a file can be extended to include rights to those other than owner, group, and other, such as for example a company, a particular subdivision, and a particular department. Furthermore, the access permissions can be extended from read, write, and execute, to include, for example, decrypts, delete, and move.

Access to all files and directories in a traditional UNIX operating system is controlled by permissions. With the EOS extension of UNIX, access to files and directories is controlled by a number of factors including a file's permissions to be viewed, authentications of both the request and the user making the request, authorizations for the user to request particular data, processes or programs, and individual authorizations for particular requests. Permissions are checked whether file access is called through a command entered at the shell level, or through a program. Permissions are separately defined for read, write, execute, encrypt, and decrypt access. Permissions are granted at three levels, owner, group, and other. Permissions are checked internally in the system on the basis of the effective user id and also for setting it to another number.

E-Nodes and File Identification

Each file has an e-node structure that is identified by an i-number. The e-node contains information required to access the file that includes:

The File type and mode (ordinary, directory, special, etc.)
Number of links to the file
Owner's user ID
Owner's group ID (department, corporation, etc.)
File access permissions
File size in bytes
3-byte address of up to 13 disk blocks
Time and date of last access
Time and date of last creation
Creation time and date Every file in use also has two other structures associated with it: a file structure and an "in-core" e-node. The file structure, and entry in the file table, is set up for every open or creation of a new file. A file may have more than one file structure associated with it. The in-core e-node contains all information located in the disk e-node, and in addition also contains:

e-node access status flags
e-node is locked (modification in progress)
If a process is waiting for e-node to become unlocked
The file information in the in-core e-node is modified
File contents changed, in-core e-node modified
Credentials
The file is a mountable device
Reference count acquired from the table entries
Device ID where disk e-node resides.
Disk address for file pointer
Last logical block read (file position).

The e-node lock is used to prevent two processes with the correct credentials from attempting to modify a file or its e-node at the same time. The process waiting flag is the equivalent of a 'call back' so that when the e-node is unlocked, the process is informed that the file is available.

Figure 8:
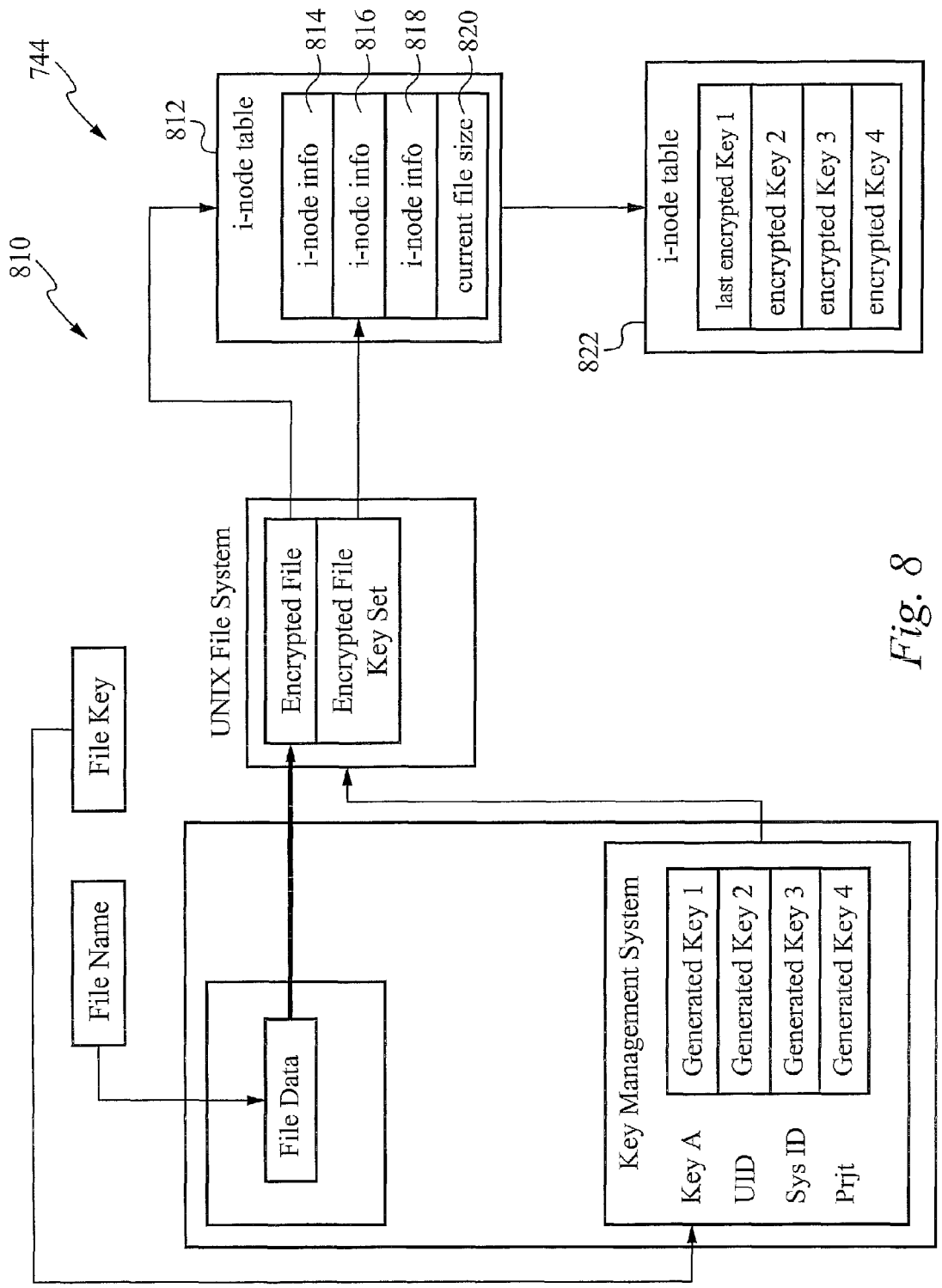
FIG. 8 is a block diagram showing the steps performed by a Key Management System, additionally showing an i-node table, in accordance with the present invention.

FIG. 8 depicts a representation of additional i-node structure data flags 810 added to the data structures depicted in the key management procedure 710. The elements depicted in the center and left of FIG. 8 correspond to the same elements in the key management procedure 710. The elements depicted on the right of FIG. 8 are elements of the i-node information 744 depicted in FIG. 7. Among additions to an i-node table 812 are multiple entries of i-node information 814, 816, and 818. Three such entries are depicted for illustrative purposes only, and are not intended to be limiting either in number or type. A current file size 820 is among the other additional information that may be included in the i-node table 812. Further additional entries in the i-node structure data flags 810 can include a last encrypted key roster 822, which is depicted as including the last four encrypted keys for illustrative purposes only, but should be understood to not be limited either in the number or variety of encryption keys that can be included. The additional information elements included in the e-node structures can also further include the various information elements contained within the i-node table 812, and the last encrypted key roster 822. The actual indexing in the EOS is executed with the e-node structure, which subsumes the i-node functions of a traditional operating system, as well as contains information of encryption functions; permissions; modification times and dates; usage patterns, knowledge, and judgements; and is how the EOS points to the actual storage locations of the encrypted blocks of data.

Administrative Audit System

The Administrative Audit System records all administrative commands executed by the operating system on all files within the protective custody of the Data Vault. The Administrative Audit System also tracks and records both the responsibilities for as well as the performance of tasks implemented against files within the Data Vault. Each System Administrator has a unique set of keys for managing and maintaining at least some of the encrypted files within the Data Vault. Generally, a particular System Administrator has authorization to execute a limited set of commands on the encrypted files, and is authorized to perform a limited set of tasks or operations on files within the Data Vault. Every action by a System Administrator on a file within the Data Vault is traced and recorded by the Administrative Audit System so that all actions can be tracked and all parties are made accountable for the actions they execute. A Root Administrator's responsibilities include administrator privileges for the Root password. The root password administrator privileges are limited by the key management system's control over the encrypted file names and their protected contents.

Command Audit Trace

All commands on file contents and names that were once encrypted are recorded for future audits and traces by the Command Audit Trace system. The Command Audit Trace system records all commands acting on such files when they are in an unencrypted state, and collects this information to provide as input to a Kalman Filtering program that performs assessments of the state of the security of the files. Tracing the method used to delete part or all of a file's contents and determining the integrity of a file's content data are among the other functions for which the Command Audit Trace system records the unencrypted file commands. The information collected by the Command Audit Trace system about an encrypted file is usually stored along with the contents of that encrypted file in the Data Vault for access by various programs as needed. The Command Audit Trace system is thereby able to provide a recorded history of all activities of the System Administrator with respect to a given file under protective custody. The Command Audit Trace system can thus provide a secondary means for detecting and correcting judgment errors in entrusting security to administrators that prove untrustworthy. Each trace history is locked with encryption and stored under the Key Management System, to prevent tampering, with keys that are only accessible by the master key under the control of the Root Administrator.

File Security Management System

The File Security Management System manages and controls information stored about encryptions and decryptions of the name or contents of a file. The File Security Management System stores the original name of the file in a secured space under its control and replaces the original name associated with the original contents of the file with an encrypted name associated with the encrypted contents of the file.

Intelligent File Control System

The Intelligent File Control System acts as a key index for the File Security Management System database by storing and securing a file's original name and mapping it onto that file's encrypted name. The Intelligent File Control System controls the associations between the encrypted names of files and the original names of those files. Both administration and authorization functions for file names, file contents, and their respective encryption keys are provided by the Intelligent File Control System. How files are accessed and obtained from secured memory, and how the contents of files are altered are controlled by the Intelligent File Control System. Files are accessed through a secured procedure that utilizes the system file name, given the file by the user, and the key that the user has chosen to provide for a particular file or files being secured. The Intelligent File Control System is able to create new files, manage user access to currently secured files, and remove an existing file.

A. Creating New Files

When a user or process attempts to create a new file the Intelligent File Control System checks all stored file names by obtaining the user chosen system file and secured key. The Intelligent File Control System performs an encryption operation and performs an access examination to determine whether or not the file name exists in a secured user space. If the file exists, the file system returns an error without disturbing the contents of the original stored secured file. If the error is not corrected, the Intelligent File Control System reports this action as an attempt against the security of the user's file sovereignty and sets a threat assessment of level 1. If the error is repeated, the Intelligent File Control System raises the security threat to level 2 and reports this action as an attempt against the security of that user's file sovereignty. Before the action can be repeated once again, a threat level assessment is made to determine whether or not such an action can be allowed to continue without increasing the overall system threat level.

B. Managing User or Process Access to Currently Secured Files

The Intelligent File Control System encrypts the file name and its key to obtain the secured name, termed the efn (for encrypted file name), of the stored file. After the secured name has been retrieved from storage, the user or process provided secured name is compared with the stored secured name as a final check before allowing the user to obtain access to the secured, encrypted contents of the file. If the newly generated efn and the original efn match, the secured file name is used to access the encrypted contents of the associated file. If the access match is not made, access is denied and an alarm is established for that particular user. That user's alarm may only be reset if a repeat of the operation is successful within a prescribed time period.

C. Removing an Existing File

In order to remove a file from secured memory, a user must first carry out the procedures for obtaining access to an existing file, plus gain rights for file content removal. The right to remove a file's contents is granted only to the owner of that file or to members of a group (e.g., a department, company, etc.) who have been granted the right to remove contents from the file owner's private vault section. If the file contents and the encrypted file name reside in a shared vault section, the removal of the encrypted file and its contents are only given to those members of the group who have been granted file removal rights for at least some of the files that reside within that shared vault section. If an attempt to remove a file is made by any user that does not have those rights, such an attempt is reported as a security threatening attempt against the sovereignty of that file's owner, as well as against the sovereignty of any group that possesses removal rights for that file. Such a failed attempt to remove a file follows the same procedure for setting alarms, assessing threat levels, and making reports as for failed attempts to create files, except that the security threat is raised to level 4. A failed removal attempt is a significantly more serious threat than a failed attempt to gain access, and the threat level is correspondingly set at a higher level. Repeated attempts that result in failure will result in that user being locked out from access to files. The access lock out will apply to all files belonging to any owner of a file that a failed attempt was made on, as well as to all files whose removal rights are possessed by the group that also possessed removal rights to any file that a failed attempt was made on. Resetting of a user's lock out can only be accomplished by a system administrator.

File Name Management Sub-System

The file name management sub-system contains a secured system for encrypting and storing the names of each of the files that are stored within the Data Vault. The File Name Management Sub System is an expert system which uses knowledge-based learning and reasoning to learn who has properly authenticated authorization for access to the actual file names, and to perform administration on the contents of the files. The File Name Management Sub-System also learns who has authentic authorization only for access to the contents of a file, but not to the name of that file.

Internal Representation Of Files

In a UNIX-based operating system, an i-node is a computer-stored description of an individual file in a UNIX file system. Among the file information included in i-node descriptions are:

File Owner Identification: File ownership is divided between an individual owner and a group owner and defines the set of users who have access rights to a file.

File Type: Files types can be regular (not encrypted), directory (not encrypted), encrypted files, encrypted directory, character or block special, and FIFO (pipes).

File Access: With an i-node in a regular unencrypted file system, the superuser has access to all files. For the encrypted file system, the superuser is replaced by the system owner who has access to all the encrypted files. The superuser is second to the owner in access rights. Superuser access includes monitoring of the processes which the files undergo and management of results from the file system. Superuser access does not include rights to remove, modify, or copy contents of the encrypted file system. A system owner can grant these rights by providing express consent keys which are generally of limited validity, such as being valid only at certain times. During these times all operations are monitored and reports are generated to provide an audit trail of all operations performed by the superuser.

Expert Data Control System

The Expert Data Control System provides intelligent control of the Data Vault Management System and its sub-systems. The Expert Data Control System controls all data movements, interprets and authenticates all requests for data, and authenticates authorization for access and administration of all directory names, directory contents, and encrypted file contents. The Expert Data Control System is able to perform its functions without human intervention and uses various aspects of artificial intelligence including reasoning, learning, inferences, and assertions. The Expert Data Control System implements its artificial intelligence capabilities with rule-based heuristics, genetic programming, and neural network approaches combined with Kalman Filtering Theory applied to stochastic predictions.

Merchant/Banking/Clearing House Exemplary Scenario

A merchant site/banking site/clearing house site application of the present invention provides an exemplary description of the operation of an EOS in accordance with the present invention. This example illustrates how an EOS can secure a hypothetical clearing house relationship between banks and merchants A merchant and the merchant's bank both run their systems under the control of an EOS and only store their data in encrypted form. Optionally, an even greater degree of protection is achievable when the merchant and the merchant's bank each transmits data in encrypted form. If both only transmit data in encrypted form, then data never needs to be stored on a disk in its raw (unencrypted) form. The data can then also be transmitted in the encrypted form in which it is stored on disk, provided it is accompanied with a standard transmission key, to a receiver that also runs an EOS to be able to decrypt the data.

Every week the Merchant sends the Member Bank a separate encrypted key (key1, for example) for that week's data. Key1 is defined by the Merchant's security policies. All data from that week can be encrypted and decrypted with key1. A typical scenario would involve the following steps:

Step 1. The Merchant sends key1 to the EOS to be encrypted.

Step 2. The encrypted key1 is sent to the Member Bank.

Step 3. The Member Bank decrypts and stores key1.

Step 4. The Merchant sends the encrypted data at the end of the day.

Step 5. The Member Bank receives the encrypted data and decrypts it with key1.

Figure 9:
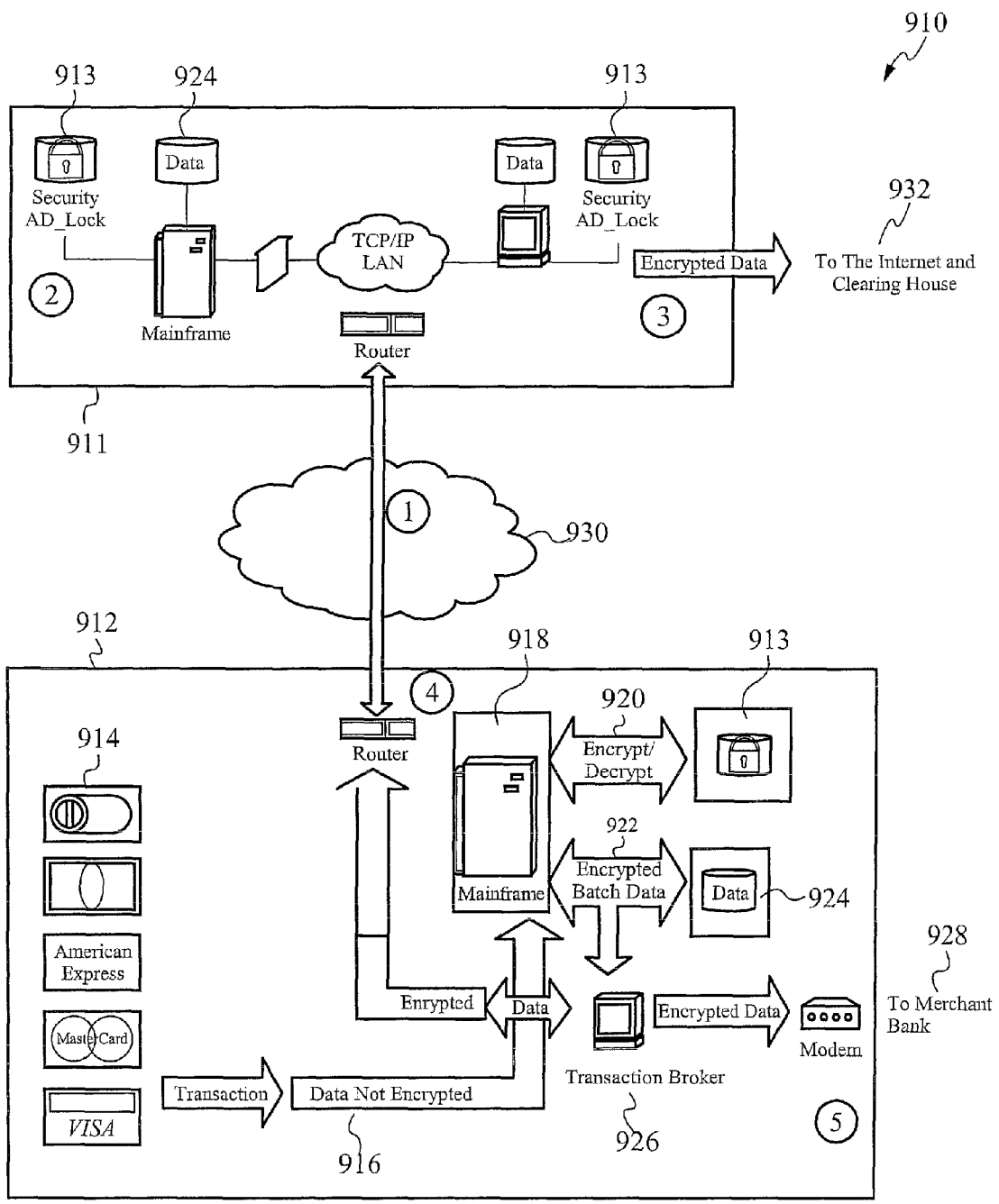
FIG. 9 is a schematic diagram showing a banking site and a merchant site configured to exchange encrypted data in accordance with the present invention.

FIG. 9 is a schematic representation 910 of a merchant site 911/banking site 912 that utilize an EOS 913. The EOS 913 is used for both storing data in an encrypted form and transmitting the encrypted data between merchants and their banks using an agreed upon key for each transmission. The merchant site 912 receives transactions in the form of credit card payments 914. Unencrypted data 916 of the credit card transactions is transmitted to the merchant site mainframe 918. The transaction data on the merchant site mainframe 918 undergoes encrypting/decrypting operations under the direction of the EOS 913. The encrypted data 922 is placed in storage 924 and routed to transaction broker 926. The transaction broker 926 directs the appropriate encrypted data to the merchant's bank 928 which also operates under the EOS 913. The transaction broker 926 also transmits the appropriate encrypted data over a network connection 930, such as the Internet, to the banking site 911. The banking site 911 stores and processes the encrypted data 922 received over the network connection 930 analogously to the operations of the merchant's site 912. The banking site 911 also transmits encrypted data to a clearing house 932.

Figure 10:
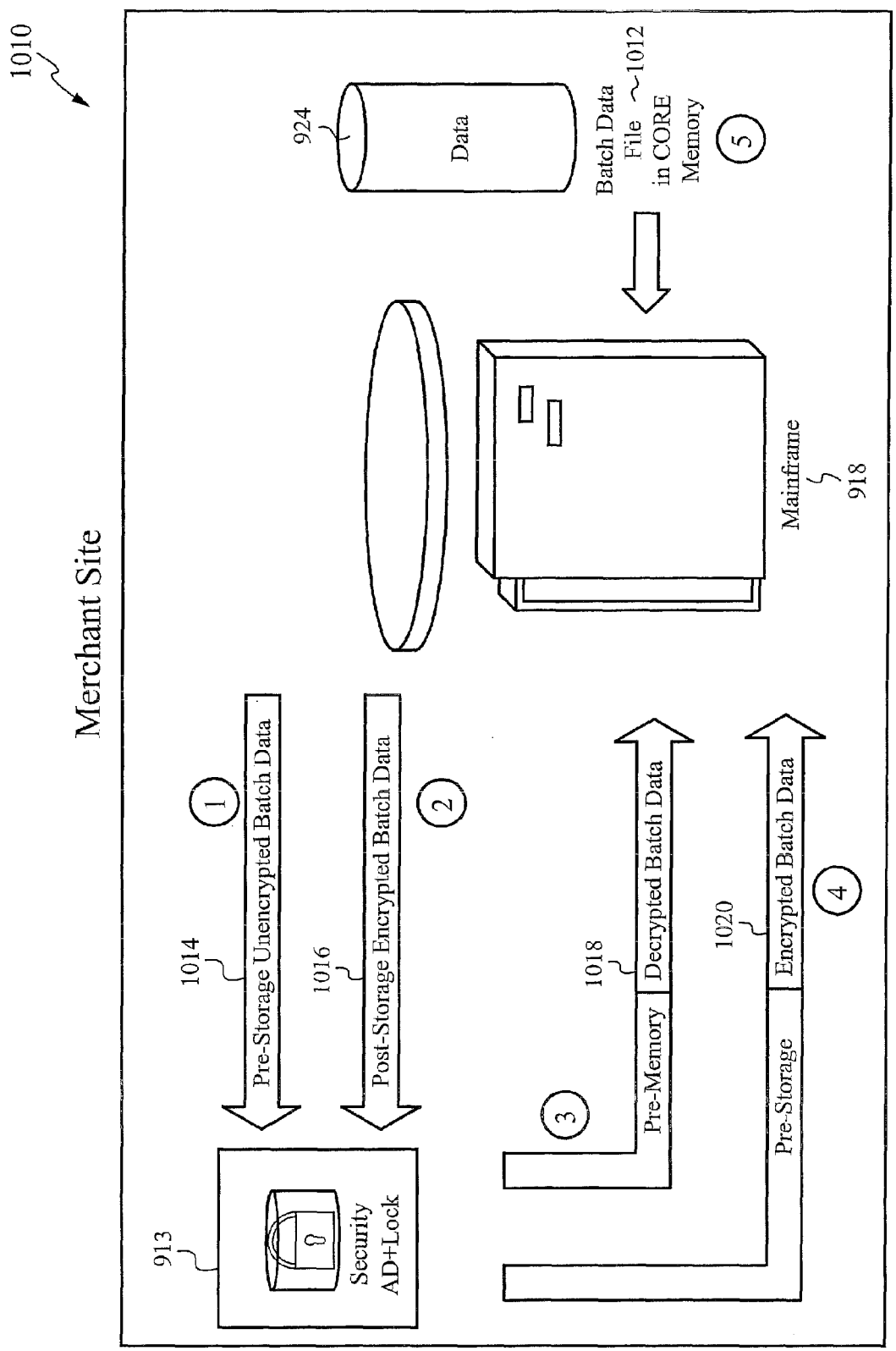
FIG. 10 is a more detailed schematic diagram of the merchant site shown in FIG. 9.

The merchant bank site components include the mainframe computer 918, the secondary storage array 924, and the EOS 913. The mainframe 918 processes transactional data in its core memory, builds a batch file of these transactions and sends this data to the EOS 913 to be encrypted before storing it to disk. When transactions 916 are to be added to the encrypted batch file, the mainframe 918 processes the transactions 916 for addition to the already encrypted batch. The mainframe 918 and EOS 913 retrieves the encrypted batch file from disk, decrypts it, adds the new transactions, encrypts the new batch file, and stores the new encrypted batch file to disk. FIG. 10 demonstrates the method whereby the transactional data is always stored in encrypted form. The method of FIG. 10 provides data protection more secure than a firewall. If data is compromised by intruders due to inadequate firewall protection, the encrypted data stored on disk will be of little use to even the most advanced intruder.

FIG. 10 is a detailed view 1010 of the mainframe 918 and EOS System 913 batch data encrypting and decrypting operations. When data comes in as a transaction, it is accumulated in the core memory 1012 to create a batch file 1014. The batch file 1014 is sent to the EOS 913 to be encrypted prior to storing it on disk. Already encrypted batch data 1016 must first be decrypted to add new transactions to it, and is accordingly taken from disk and decrypted by the EOS 913. Once the batch data 1016 has been decrypted, new transaction data is added to form a revised batch file 1018. Once the revised batch file 1018 has been created, the EOS 913 is used to encrypt the revised batch file 1020 before storing it once again on disk. Both the first encrypted batch data 1016 and the revised encrypted batch data 1020 are returned to core memory. All batch data is processed in core memory, encrypted by the EOS 913, and then stored on disk.

FIG. 9 illustrates the flow of credit card transaction data through a banking site 911 to a credit card clearing house 932. The credit card transactions can be transmitted over public networks such as the Internet since all of the data is encrypted by the EOS 913. The transaction data only exists unencrypted in memory during processing. Individual merchant transaction files are decrypted using that merchant's personal key. The information is processed and then consolidated with other transactions at the member bank. The consolidated data is encrypted with the bank's key by the EOS before it is saved to disk. The credit card clearing house 932 receives encrypted transaction files from the member bank 911. Each member bank 911 uses a separate key. The credit card clearing house 932 also utilizes the EOS 913 to decrypt the encrypted transaction files at its access point and perform any additional processing required, then encrypt the data again and transfer the file to the credit card processing center. Each merchant 912 can receive encrypted transaction data back from the member bank 911 over the Internet. The bank will have encrypted the data with a unique key known only by the member bank 911 and the merchant 912. The merchant stores this information on disk in encrypted form. Optionally, the encrypted data can be transmitted, as needed, over a switched network through a modem (not depicted).

Figure 11:
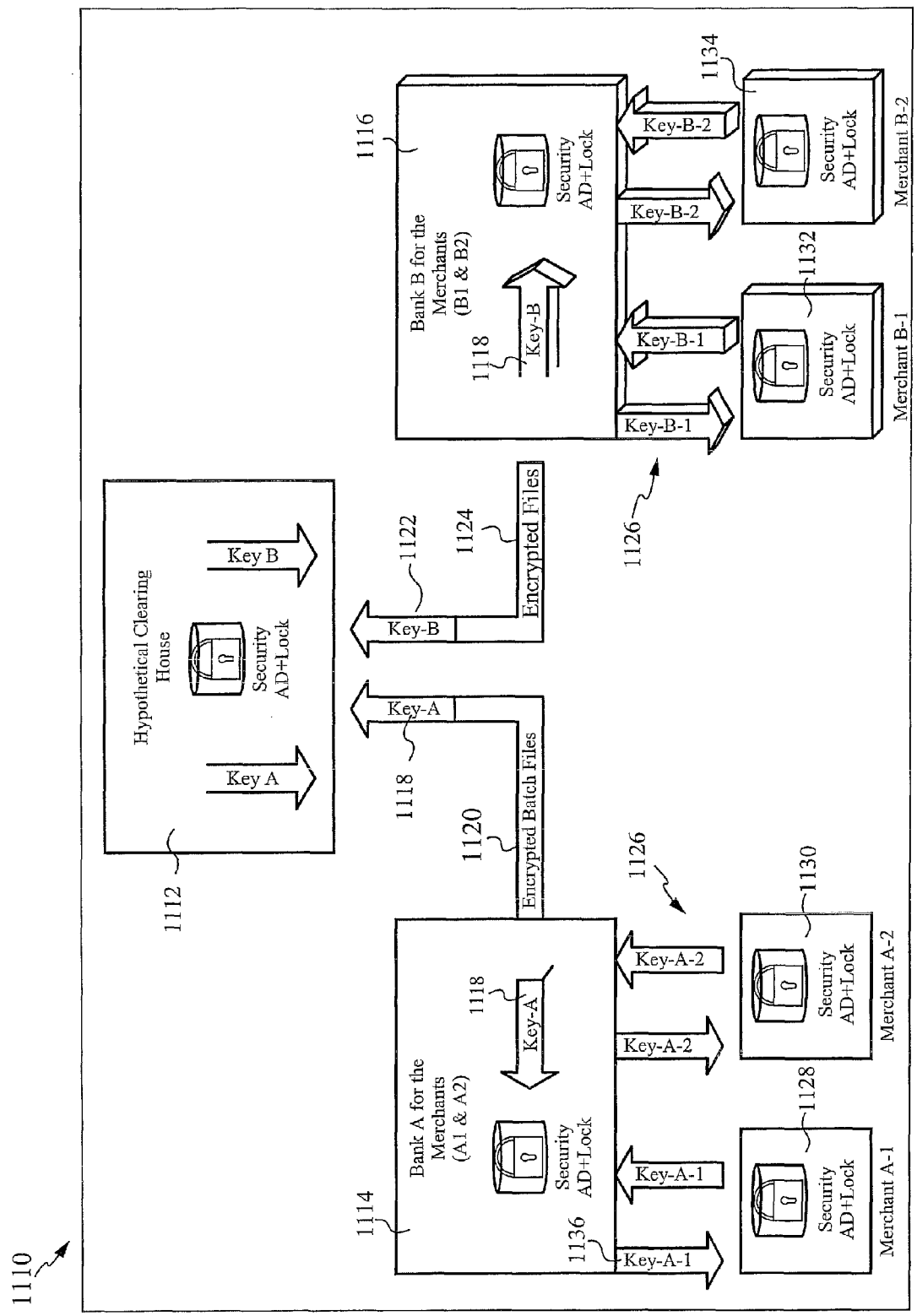
FIG. 11 is a schematic diagram showing how a clearing house communicates with two banks and their corresponding merchants, in accordance with the present invention.

FIG. 11 depicts merchant/bank/clearing house communication relationships 1110. These relationships 1110 demonstrate how using the EOS of the present invention ensures that data does not need to be stored in raw, unencrypted form on a secondary storage system, whether a RAID system or Hard Disk Storage system. A clearing house 1112 holds the keys for merchant banks A 1114 and B 1116. The clearing house 1112 transmits all data communications with the merchant banks using their respective keys. For example, merchant bank A 1114 transmits data to the clearing house 1112 in encrypted form. The clearing house 1112 already has key A 1118 to decrypt the merchant bank A 1114 data 1120, so that further transmission of a key is not necessary. Similarly, the clearing house 1112 also already has key B 1122 to decrypt the merchant bank B 1116 data 1124, so that further transmission of a key is also not necessary. Merchant banks A 1114 and B 1116 transmit and receive batch data transactions to their merchants A-1 1128, A-2 1130 and B-1 1132, B-2 1134, respectively, using their respective keys. For example, batch data in its encrypted form is transmitted to merchant bank A 1114 from merchant A-1 1128. To receive and process the merchant A-I batch data, merchant bank A 1114 uses the merchant key A-1 1136. The merchant/bank/clearing house communication relationships 1110 allow data to be processed while in core memory and stored on disk in encrypted form, and allows batch data to be transmitted in the same encrypted form in which it is stored on disk.

In view of the above, it will be seen that the various objects and features of the invention are achieved and other advantageous results obtained. The examples contained herein are merely illustrative and are not intended in a limiting sense.

The functioning of the EOS is dependent on the file systems that the EOS uses. One embodiment of the present invention uses a modified file system based on the UNIX operating system, such as the UNIX System 5, Releases 3 through 5 (e.g., SVR3.4, SVR4, and SVR5). It will be appreciated that the present invention can also be used with other variants of UNIX, such as BSD and Linux, and other operating systems.

Figure 13:
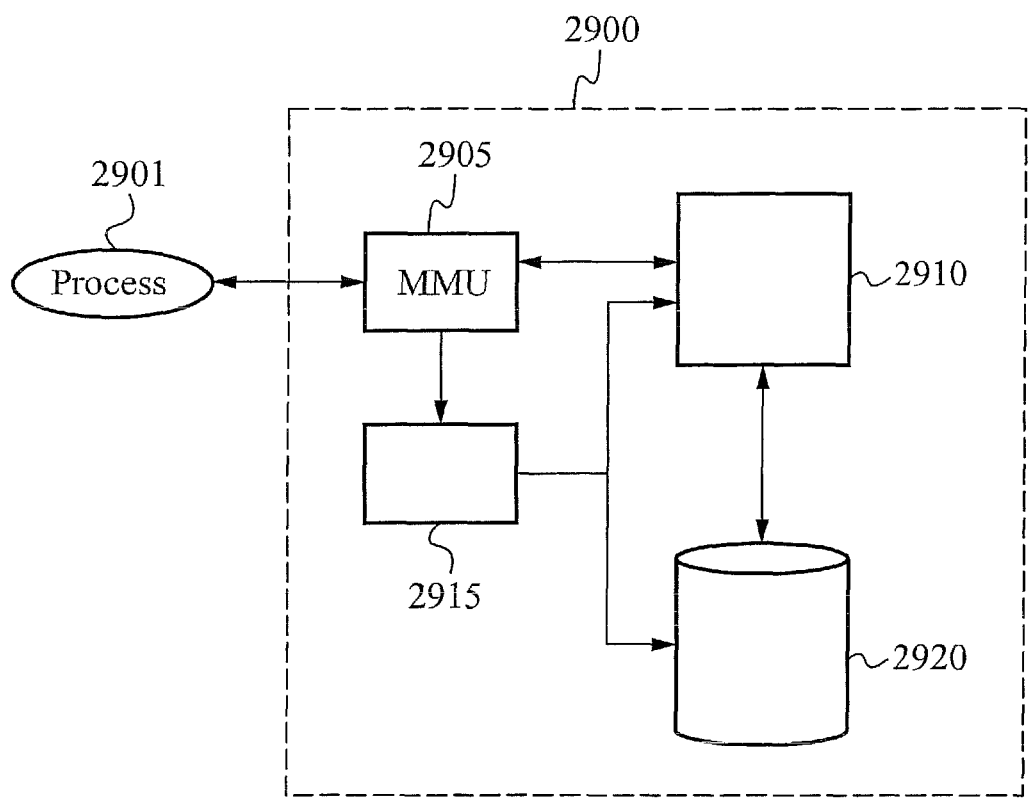
FIG. 13 is a high-level schematic diagram of a process and a virtual memory system.

One embodiment of the EOS, based on a modified UNIX operating system, uses virtual memory to extend the memory available to processes running in physical memory on a computer system. The EOS thus maps virtual memory addresses to physical memory addresses, as illustrated in FIG. 13. As described in more detail below, virtual memory uses abstractions that hide the complexities of virtual memory from processes and users. FIG. 13 is a high-level schematic of a process 2910 and a memory system 2900 that satisfies memory requests for the process 2910. The memory system 2900 comprises a memory management unit (MMU) 2905, a microprocessor 2915, physical memory 2910 (e.g., RAM), and a secondary memory or backing store 2920. As an example, in operation the process 2910 invokes the MMU 2905 to access a block of memory using a virtual address. The MMU 2905 maps the virtual address to a physical address. If the physical address corresponds to a location in the physical memory 2910, the MMU 2905 retrieves the data from physical memory 2910 and returns it to the process 2901. If the data is not in the physical memory 2910, the MMU 2905 generates a page fault to the microprocessor 2915, which reads the data from the secondary storage 2920 into the physical memory 2910. From there, the data is passed to the process 2901.

As described below, in accordance with the present invention, data stored in the secondary storage 2920 can be encrypted and thus must be decrypted before being passed to the process 2901. The tables within the MMU 2905 are updated to reflect the relationship between the new physical address of the retrieved data and its virtual address, which is used to locate it in the physical memory 2910. It will be appreciated by those skilled in the art that by using virtual memory and its related mapping, both discussed in more detail below, processes within a computer system can access more memory than is available in the physical memory 2910.

As described in more detail below, the EOS encrypts and decrypts data transferred between physical memory and various locations, such as secondary storage (backing store), swap devices, network buffers, and other locations. Data can also be encrypted when swapped to memory as a result of a memory dump, which may occur when the computer system encounters an error. This protects against an unauthorized user from introducing an error into the computer system in the hope that the operating system will dump a memory image to a swap or other space for debugging. Thus, the key management system described above is used to encrypt and decrypt data accessed by the file management functions described in more detail below to secure data in accordance with the present invention.

It will be appreciated that data can be encrypted using one encryption key or multiple encryption keys, using one or more encryption algorithms. For example, data can be broken into a series of blocks. A first block of data can be encrypted using a first encryption key according to the Rijndael algorithm. A second block of data can be encrypted using a second encryption key using the Rijndael algorithm; alternatively, the second block of data can be encrypted using another symmetric algorithm, such as DES. The process then continues until all of the data is encrypted. The process can be reversed to decrypt the encrypted data. It will be appreciated that references below to encryption keys can include the use of multiple encryption keys used to encrypt and decrypt data using one or more encryption algorithms.

It will be also be appreciated that the term "files" used herein refers to any kind of files including, but not limited to text, machine readable files (such as executable files), image files (such as JPEG, TIFF, PDF, MPEG), audio files, compressed files, device files, pseudo files (e.g., /proc and /nfs), network files, or any other structures that UNIX accesses using a file structure.

As described below, the EOS can be used to encrypt and decrypt data transmitted between physical memory and other locations, such as secondary storage, network file systems, etc. Table 1 lists file systems that can be encrypted and decrypted according to embodiments of the present invention. Thus, for example, referring to line 8 of Table 1, data transmitted to the sockfs file system, and thus over a socket connection, is encrypted before it is transmitted from the physical memory of a computer system over the socket connection. Similarly, encrypted data is transmitted over the socket connection to a process executing on the computer system. The EOS will decrypt this data before passing it along to the receiving process. As described in more detail below, the EOS treats many devices as files and can thus use file commands to access these devices.

Figure 14:
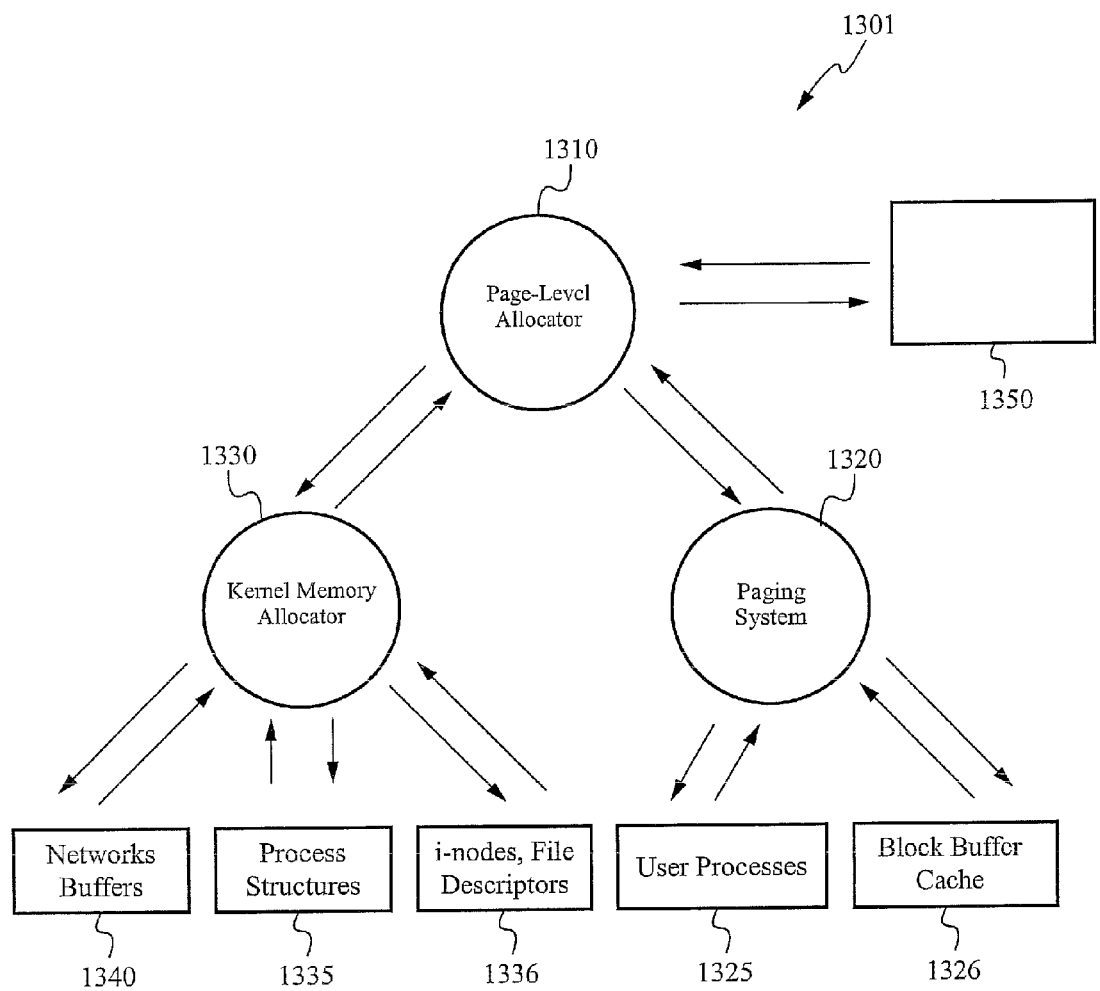
FIG. 14 is a block diagram of a memory allocation system.

FIG. 14 depicts a memory allocation system 1301 for an EOS in accordance with the present invention, under a virtual memory interface. The memory allocation system 1301 comprises a page-level allocator 1310 coupled to physical memory 1350, a kernel memory allocator 1330, and a paging system 1320, which is part of a virtual memory system. The page-level allocator 1310 acts as a server for the two clients, the kernel memory allocator 1330 and the paging system 1320. The kernel memory allocator 1330 is coupled to network buffers 1340, process structures 1335, and i-nodes and file descriptors 1336, described in more detail below. The paging system 1320 is coupled to user processes 1325 and block buffer caches 1326.

TABLE 1

| | File System | Type | Device | Description |
|---|---|---|---|---|
| 1 | ufs | regular | Disk | UNIX Fast File System |
| 2 | tmpfs | regular | Memory | Uses Memory and Swap |
| 3 | nfs | pseudo | Network | Network File System |
| 4 | cachefs | pseudo | File System | Uses a local disk as a cache for other NFS |

TABLE 1-continued

| | File System | Type | Device | Description |
|---|---|---|---|---|
| 5 | autofs | pseudo | File System | Uses a dynamic layout to mount other file systems |
| 6 | specfs | pseudo | Device Drives | File System for the/dev devices |
| 7 | procfs | pseudo | Kernel | /proc file system representing processes |
| 8 | sockfs | pseudo | Network | File system for socket connections |
| 9 | fifofs | pseudo | Files | FIFO file system |

In operation, for example, a user process 1325 invokes the paging system 1320 to read data. The paging system 1320 can check the block buffer cache 1326 to see whether the data resides there, and if it does, the paging system 1320 returns the data to the user process 1325. If the data is not in the block buffer cache 1326, the paging system 1320 can invoke the page-level allocator 1310, which can access physical memory 1350 to retrieve the data. Because the paging system 1320 is part of the virtual memory sub-system, it may also page the data in from a secondary device (not shown).

Similarly, a kernel command can invoke the kernel memory allocator 1330 for memory blocks used by kernel sub-systems. For example, as shown in FIG. 14, the kernel memory allocator 1330 can handle requests to allocate small, variable-size buffers for network buffers 1340, process structures 1335, i-nodes and file descriptors 1336. The kernel memory allocator 1330 can also invoke the page-level allocator 1310 for larger-size memory blocks.

It will be appreciated that an EOS kernel in accordance with the present invention can be configured in many ways, depending on the intended application of the computer system. One such configurable parameter is the virtual page size. For example, the virtual page size can be configured to minimize the number of times a page must be swapped out of physical memory. The EOS kernel uses a parameter that determines the size of any virtual page used in loading data from permanent storage into main memory. The virtual page size parameter shall vary from kernel to kernel depending on the size of physical memory. This parameter is set at the time the EOS kernel is configured for the platform upon which the operating system shall execute. For a given virtual page size of 4096 bytes, each subsequent page shall be 4096 bytes; therefore the kernel shall access each permanent storage medium at 4096 virtual page sizes. The virtual page parameter "x" denotes the size of each virtual page and upon loading each file, the number of virtual pages per file may vary across each file which are most likely to vary in size across each directory, will constitute the encryption partitions to vary across each permanent storage medium.

The theoretical virtual page parameter x shall separate how each EOS kernel shall select its page size to load and unload data from the secondary physical storage medium ("the hard disk"). The parameter "x" shall denote the size of each page partition, where each partition shall be based upon the size of the physical limitations of the computer platform's random access memory (RAM, DRAM, etc.). For example, if the parameter "x" varies across each EOS kernel, then a particular EOS kernel storing its data on a secondary storage medium will not be able to read data storage on a different secondary storage medium which was stored by another EOS kernel with the parameter "x" configured with different physical memory limitation parameters.

Figure 15:
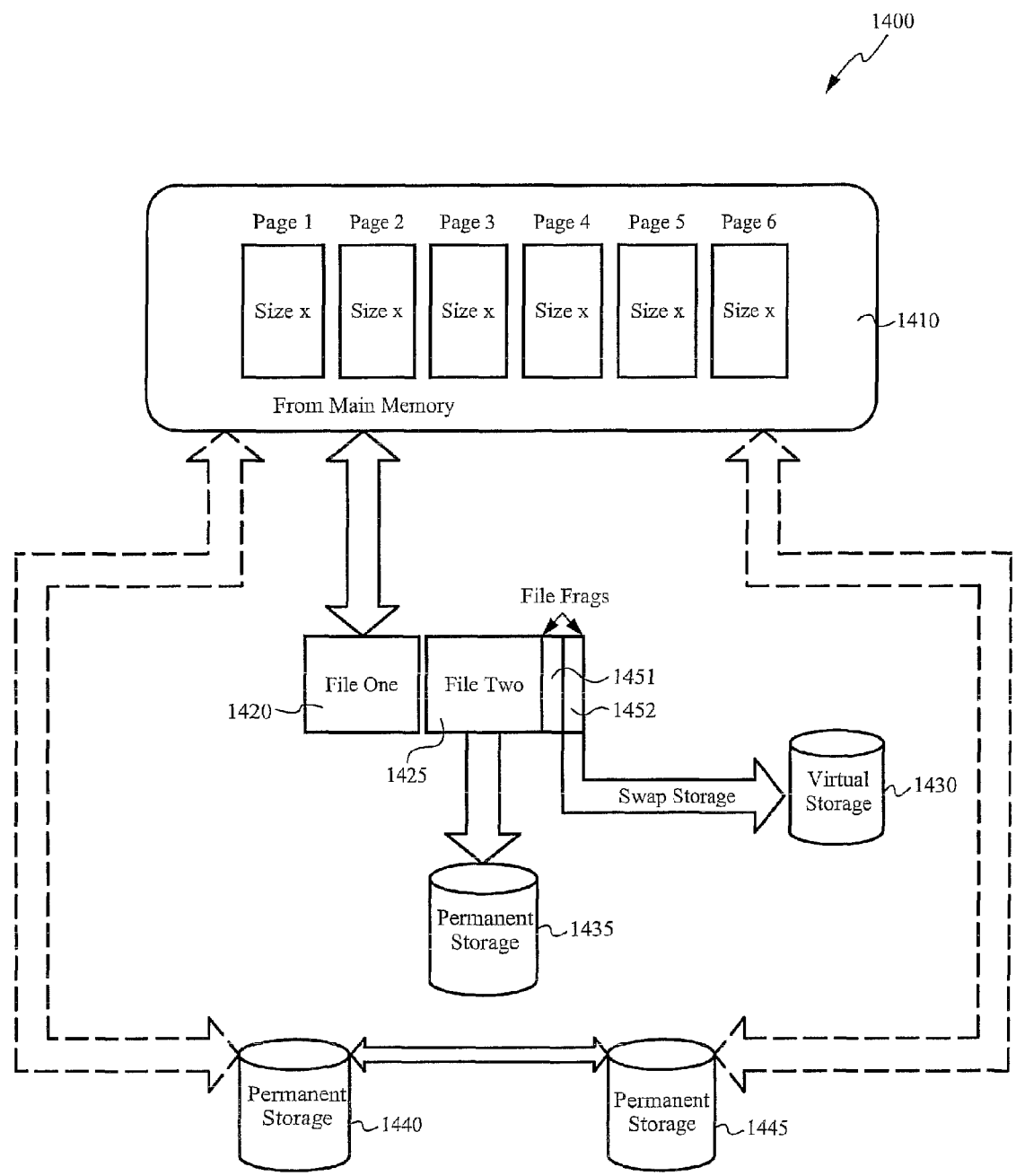
FIG. 15 is a schematic diagram showing the relationship between a memory pool, virtual storage, and permanent storage.

FIG. 15 shows a memory system 1400 with memory pools for SVR4 implementations of a kernel memory allocator in accordance with the present invention. The memory system 1400 comprises a physical memory 1410 containing pages 1 through 6, each x bytes long. Preferably, each of the pages 1 through 6 is 4096 bytes long, but it will be appreciated that the pages 1 through 6 can have other lengths. The physical memory 1410 is coupled to a first, a second, and a third permanent storage 1435, 1440, and 1445, respectively. As shown in FIG. 15, a first file File 1 1420 and a second file File 2 1425 are both stored on the first permanent storage 1435. Furthermore, a fragment 1452 of File 2 1425 has been swapped to a swap device found on a virtual storage 1430.

As illustrated in FIG. 15, File 2 has fragmented portions swapped to the swap device. It will be appreciated that portions of a file can be swapped to a swap device for various reasons when, in accordance with the present invention, the data will be encrypted. For example, file data can be swapped to a swap device when not enough free memory is available to satisfy user requests; when a process has been inactive for a long time; when page tables become too full.

In accordance with the present invention, encryption drivers are integrated into the existing vnode interface structure of the UNIX System 5 Release 3 Through 5 source code. This structure is known as an integral part of its VFS (Virtual File System) group of operations known as VNODE Operations or "vops", for short. Encryption drivers are integrated into the EOS kernel as a self valuable system resource rather than installed as another header file otherwise known as a system file with an h+1 extension. This virtual node operation mechanism is only med internally to the EOS kernel for servicing the migration of pages of data. Although it is internal to the kernel, it can be applied also to service the user application request. In essence, EOS encryption mechanism code becomes a special addition to the existing "VFS interface operations" and together both are designated to perform actions upon all EOS "vnodes". Encryption drivers perform operations on each vnode when data is read into the vnode from secondary storage devices, and performs operations on the vnode data when the data is written back to disk. Once data is read into a vnode, the data is operated on by the EOS kernel in physical memory along the lines of memory pages known as virtual memory pages. Before these virtual memory pages are loaded, the data must be decrypted by the kernel's encryption drivers using one of the designated 2048 bit encryption keys (related to but different from the KMS keys) which shall be known only to the EOS kernel and accessible only by the EOS kernel to encrypt and decrypt data stored on secondary disk drives.

When the kernel manages all the physical memory and allocates this memory between other kernel subsystems and user processes, the kernel must reserve part of the physical memory for its own text and static data structures. In this case, the portion of the physical memory must never be released and hence is unavailable for any other purpose. [Many modern UNIX systems such as AIX, allow part of the kernel to be pageable]. The remainder of the memory is managed dynamically—the kernel allocates portions of this memory to various clients [such as processes and kernel subsystems], which will release it (memory) when they no longer need it.

The kernel divides memory into fixed-size frames or pages. It is these frames or pages that the EOS kernel refers to above in which the EOS kernel shall use each frame or page as a base to apply its encryption drivers. Each page must be based upon a power of two, with 4 kilobytes being a fairly typical value. This is a software-defined page size and need not equal the hardware page size but in some instances, it can. In other instances where it does not, however, it becomes the granularity for protection and address translation imposed by the memory management unit. Because EOS has a virtual memory system based upon SVR5, pages that are logically contiguous in a process address space need not be physically adjacent in memory. The memory management subsystem maintains mappings between the logical, in this case "virtual" pages of a process, and the actual location of the data in physical memory. As a result, the kernel can satisfy a process's request for a block logically contiguous memory by allocating several physically noncontiguous pages. In this case, the EOS encryption subsystem must decrypt each logical page before it is loaded into physical memory, and encrypt it before it is stored or written back to disk. To simplify this procedure of page allocation, content encryption and decryption, the UNIX kernel maintains a linked list of free pages. When a process needs some pages, the kernel removes them from the free list; when the pages are released, the kernel returns them to the free list. Therefore, to encrypt and decrypt contents, the EOS kernel must encrypt before releasing the page, and must decrypt the content upon reading the data into the page.

Figure 16:
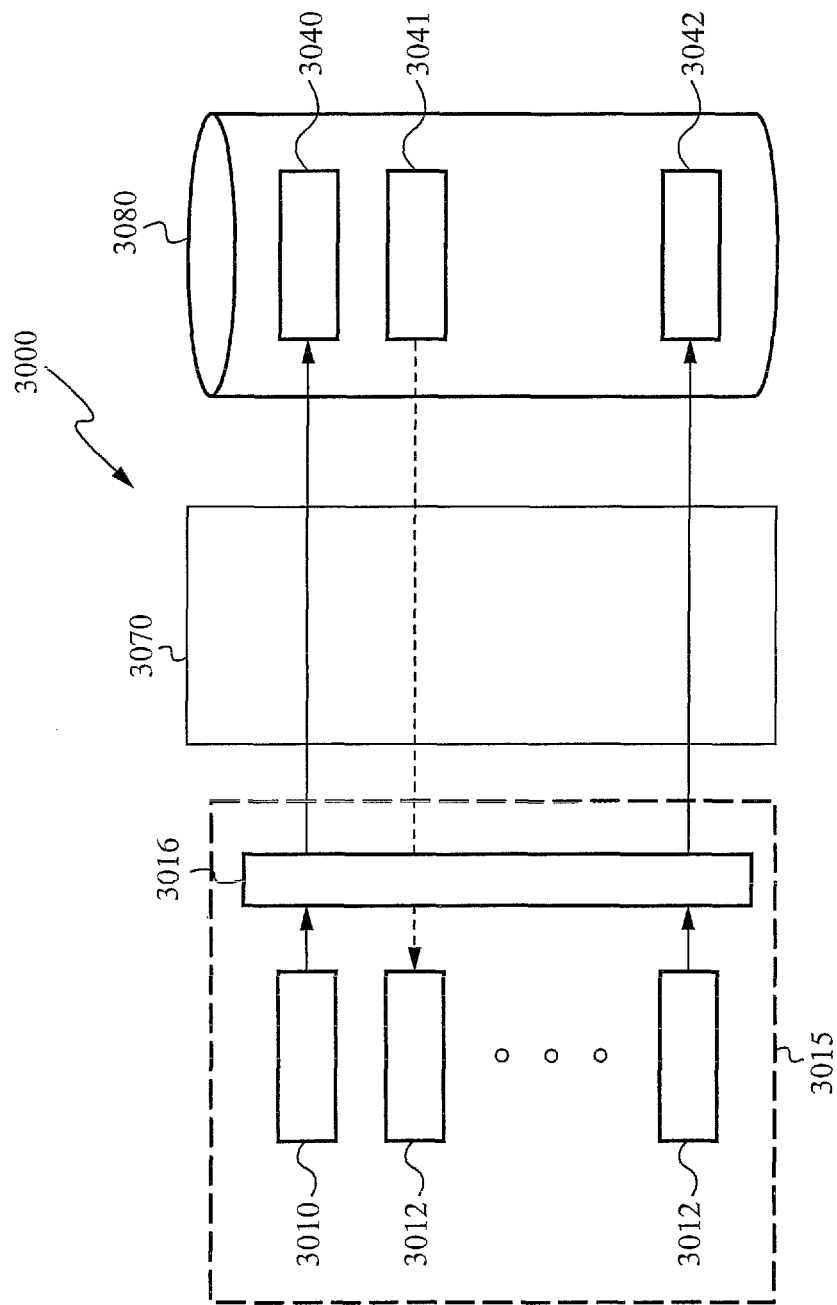
FIG. 16 is a high-level diagram showing encryption and decryption across a network using NFS, in accordance with the present invention.

FIG. 16 is a schematic diagram of a computer system 3000 using an EOS to store and retrieve data in accordance with one embodiment of the present invention. The computer system 3000 comprises a processing device 3015, a network file (NFS) server 3070, and a storage device 3080. The processing device 3015 is coupled to the NFS server 3070, which is coupled to the storage device 3080. The processing device 3015, such as a personal computer or a mid-size server, has an EOS 3016 and processes 3010-3012 executing on it. The storage device 3080 has data blocks 3040, 3041, and 3042 for storing encrypted data in accordance with the present invention. It will be appreciated that the NFS Server 3070 exports a file system contained on the storage device 3030 that mirrors the file system attached to the EOS, thereby becoming an encrypting file system.

In operation, a process 3010 can invoke a write command, which traps to the EOS 3016 to encrypt data and transfer the encrypted data to the NFS server 3070. The process 3010 invokes the write command as a local write command but the NFS Server 3070 translates the write command into a non-local one; in this way, the process 3010 can use the same command for local and non-local writes, thus using the same interface, and leaving it to the NFS Server 3070 to transmit data over a network, writing the encrypted data to the data block 3040. The process 3011 can invoke a read command, which traps to the EOS 3016, which sends the read request to the NFS server 3070. The process 3011 invokes the read command as a local read, but the NFS Server 3070 translates the request into one that takes place over a secured local area network. In this way, the process 3011 uses the same call (interface) to read data locally (from a directly attached device) and non-locally. The NFS Server 3070 then reads the encrypted data from the data block 3040 and sends the encrypted data to the EOS 3016. The EOS 3016 then decrypts the data and stores it in a buffer (not shown) from which the process 3011 can read it. When reading data from the data block 3042, the process 3012 uses a data path similar to that followed by the process 3010. It will be appreciated that whenever a read or write command is executed, the credentials of the user or process are first checked to ensure that the data access is allowed.

As will be described in more detail below, encryption and decryption using the computer system 3000 can occur automatically, transparent to the user. This can occur, for example, when a backing store or swap space is connected to the processing device 3015 across a network using an NFS server.

It will be appreciated that encrypted data can be exchanged between a processing device and a network-attached secondary device in accordance with the present invention using protocols other than NFS, including, but not limited to, Server Message Block (SMB), a network file-sharing protocol, or the Common Internet File System (CIFS).

Furthermore, as described in more detail below, the EOS can be used to encrypt and decrypt data exchanged between a processing device and a directly attached secondary device. For example, the request to the EOS for a file object passes through the virtual file system (VFS) but the EOS will translate this request to a local object through the VFS interface, just as the NSF server does.

Figure 17:
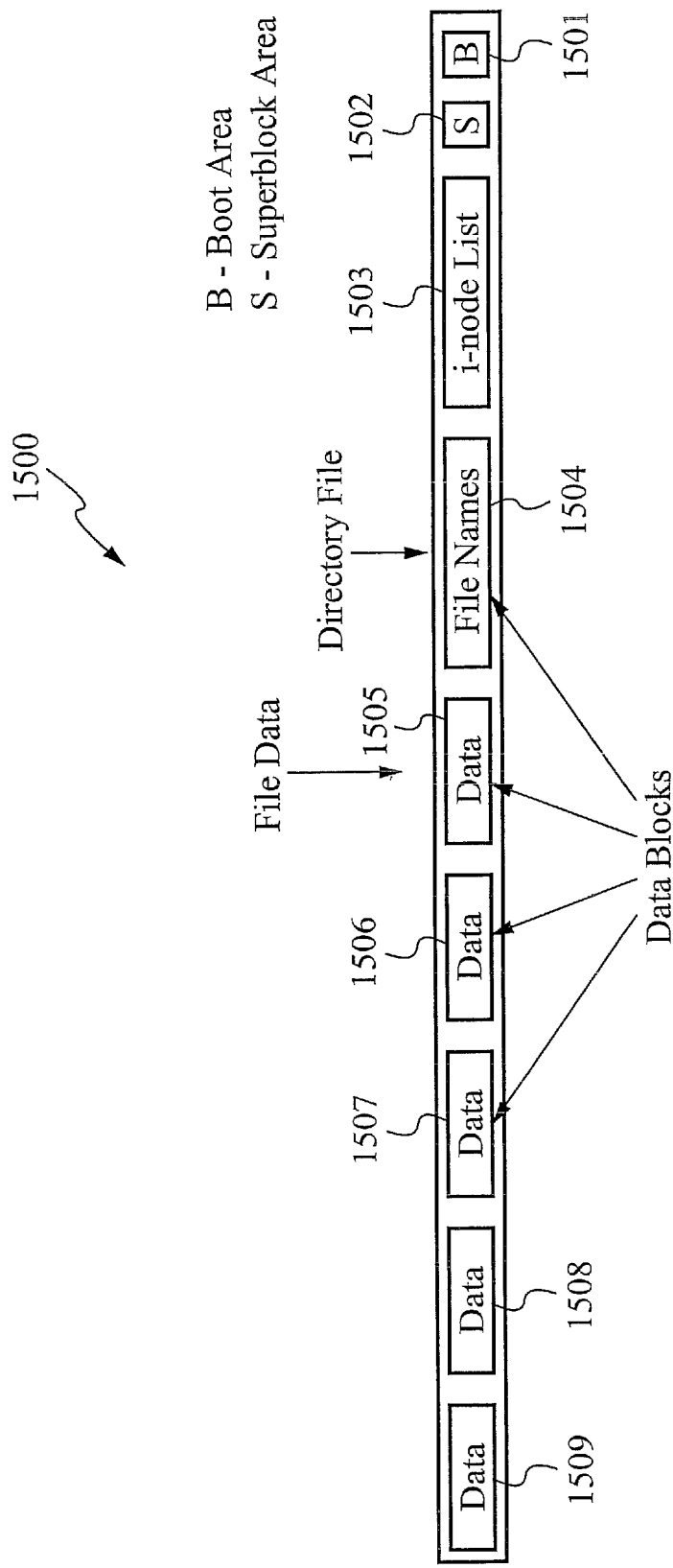
FIG. 17 shows a file system, including an i-node list and the related data blocks.

In a basic UNIX operating system, files are found by traversing a directory file. The directory file contains file names and a corresponding i-node entry. The i-node entry contains the locations of the data blocks that contain the data associated with the file. Once an unauthorized user gained access to the directory, he could access the i-nodes to recover the data associated with the file. The directory, i-nodes, and other data are stored on a file system, as shown for example in FIG. 17. FIG. 17 shows a file system 1500, containing a boot area 1501, a superblock area 1502, a list of i-nodes 1503, a directory file 1504 containing the names of the files on the file system 1500, and data blocks 1505-1509. The boot area 1501 marks the start of the file system 1500 and generally contains bootstrap code that is executed when a computer system is powered up. The superblock 1502 contains information that describes the state of the file system 1500. In accordance with one embodiment of the present invention, one or more encryption keys are stored in the superblock 1502. It will be appreciated, however, that the one or more encryption keys can be stored in other pre-determined locations accessible by the EOS.

It will be appreciated that the i-node list 1503 contains i-nodes that contain direct, single-indirect, double-indirect, and triple-indirect locations for the data blocks. It will also be appreciated that the data blocks associated with a file can only be accessed if one has access to the directory file 1504 and can read its entries. In accordance with one embodiment of the present invention, the directory file is encrypted, thus preventing anyone without a valid encryption key from accessing the file names, their associated i-nodes, and thus the data associated with a file. It will be appreciated that in accordance with an embodiment of the present invention, even if one can access the data blocks, they too are encrypted and cannot be read without the appropriate encryption key(s).

It will be appreciated that a single computer system can have any number of file systems. As described above, Table 1 lists a few of these file systems, such as the network file system (NFS), the UNIX fast file system (UFS), and sockfs, to name a few. In accordance with the present invention, each file system can have one or more unique encryption keys.

Table 2 illustrates a portion of a directory file, after it has been decrypted in accordance with one embodiment of the present invention. In Table 2, this directory file is called an E-Vault. Table 2 shows several columns. In column 1, Table 2 shows a byte offset within the E-Vault (not part of the E-Vault, but shown for ease of reference). In columns 2 and 3, Table 2 shows an i-node number and a corresponding file name. In column 4, Table 2 shows whether the file name is a special file. As shown in Table 2, each file name maps to an i-node number, which is an index into the list of i-nodes (e.g., 1503 FIG. 16). The first entry, starting at byte offset 0 within the E-Vault, contains the entry for the file name "Up V," corresponding to the current directory, which has the i-node number 83. The second entry, starting at byte offset 24, contains the entry for the file named "Current V," corresponding to the parent directory, which has the i-node number 2. The third entry, starting at byte offset 48, contains the entry for the file File 1, which maps to the 18$^{th}$ i-node in the i-node list for the file system. Tracing the i-node entries and the data blocks they point to, the data in File 1 can be recovered. It will be appreciated that the directory data in the E-Vault is protected in that it is encrypted. Similarly, the encrypted data contained in the data blocks, as described herein, are in a D-Vault, as described above, because they are encrypted and thus protected from unauthorized access. Similarly, encrypted keys are in a K-Vault, as described above, because they too are in encrypted and thus protected.

TABLE 2

| Byte offset | I-node number | File name | Special |
|---|---|---|---|
| 0 | 83 | Up V | |
| 24 | 2 | Current V | |
| 48 | 18 | File 1 | 128 |
| 72 | 47 | PatentApp | 250 |

In accordance with the present invention, i-nodes in physical memory (referred to as in-core inodes) correspond to clear data. As used herein, clear data refers to data before it has been encrypted, and cipher data refers to the data after it has been encrypted. There is a one-to-one correspondence between clear data and cipher data. It will be appreciated that i-nodes can be used in secondary memory to retrieve data associated with a file. In accordance with the present invention, i-nodes in secondary memory (referred to as on-disk i-nodes) can refer to encrypted data. This relationship between an on-disk i-node and encrypted data is illustrated, for example, in FIG. 18.

Figure 18:
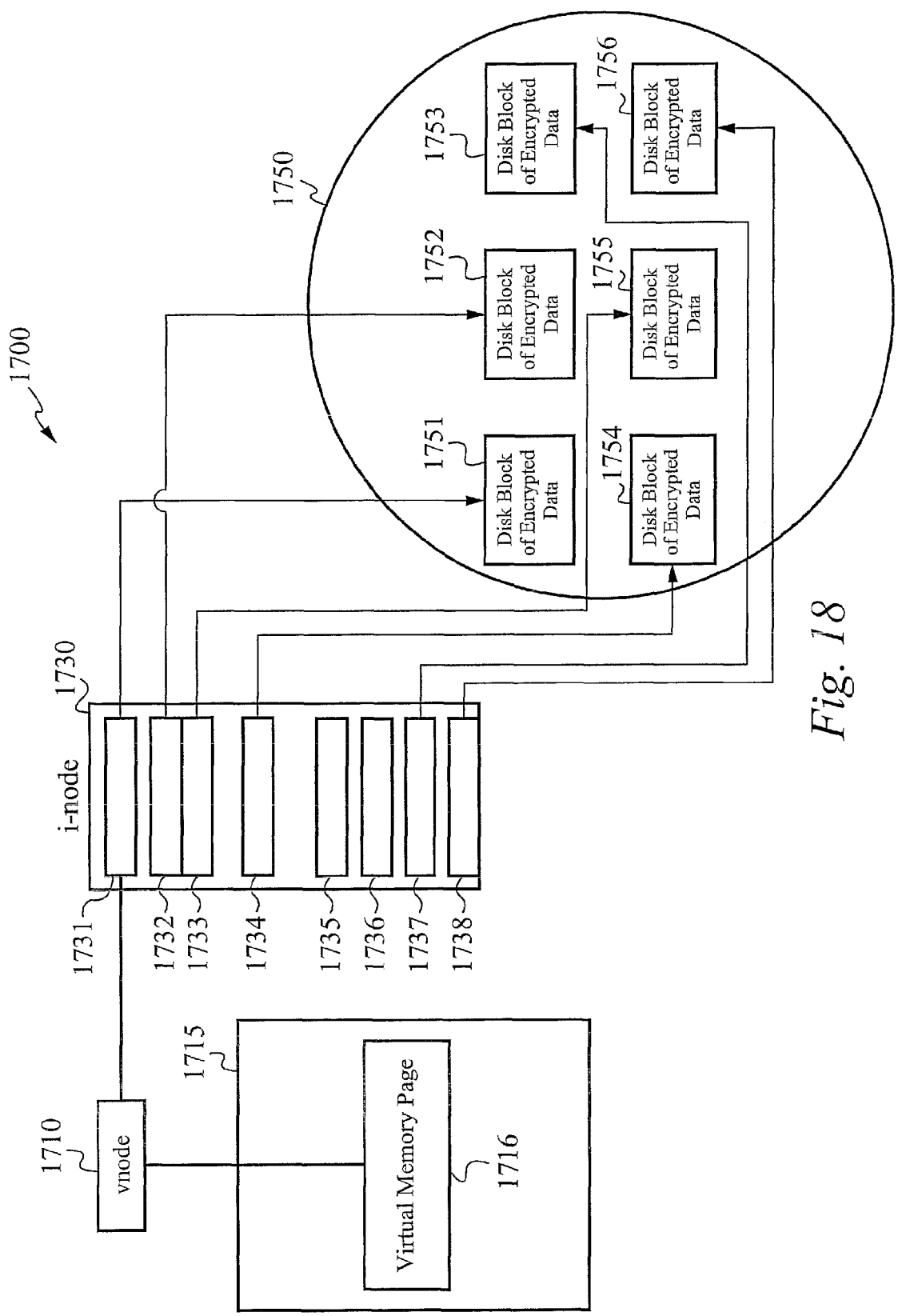
FIG. 18 is a high-level diagram showing virtual memory, on-disk i-nodes, and encrypted data on a disk, in accordance with embodiments of the present invention.

FIG. 18 is a portion of a file system 1700 illustrating the relationship between virtual memory 1715 storing a virtual memory page 1716 and secondary storage 1750 containing encrypted data blocks 1751-1756. As shown in FIG. 18, a vnode interface 1710 is used to access the on-disk i-node 1730 of a file and virtual memory 1715 containing the virtual memory page 1716. The i-node 1730 contains the table of entries storing the direct blocks 1731 through 1738. It will be appreciated that the table of entries can also contain single-indirect, double-indirect, and triple-indirect blocks. The direct block 1731 contains the address of the encrypted block 1751 on the secondary storage 1750; the direct block 1732 contains the address of the encrypted block 1752; the direct block 1733 contains the address of the encrypted block 1753; the direct block 1734 contains the address of the encrypted block 1754; the direct block 1735 contains the address of the encrypted block 1755; and the direct block 1736 contains the address of the encrypted block 1756. The i-node 1730 can thus be used to access data blocks on the secondary storage 1750. The data blocks can then be decrypted using encryption keys, as described above, and stored in virtual memory, where running processes can access the data.

In accordance with one embodiment of the present invention, the EOS provides additional means for securing data. For example, the EOS can use additional permissions than those found on a traditional operating system. When the EOS allows access to both encrypted and unencrypted data, the EOS can provide permissions for encrypted data and permissions for unencrypted data.

Figure 19:
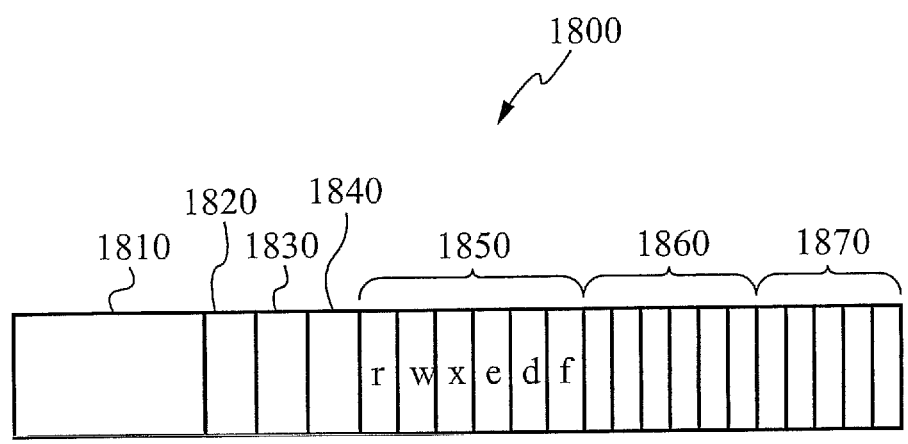
FIG. 19 shows a data structure containing access permissions, in accordance with embodiments of the present invention.

In one embodiment, the EOS uses modified permissions to determine whether a user or process can access an encrypted file and, if so, what functions it can perform on the file. The use of permissions when accessing files is well known to those skilled in the art. The modified permissions are stored in the di_mode element of a structure dinode on the disk and in the structure inode in physical memory. FIG. 19 shows the bit fields in a di_mode element 1800. The di_mode element 1800 contains (1) a type field 1810, a 4-byte element that signifies the file type: regular, directory, block, character, etc.; (2) an suid (set user id) flag 1820, which instructs the kernel to set the user's effective id to be the owner of the file if the file is an executable file; (3) an sgid (set group id) flag 1830, which performs a similar function for the user's group id; (4) a sticky flag 1840, which instructs the kernel to keep an image of the file in the swap space, if the file is an executable file, after the executable program executes; (5) owner permissions 1850, which determine whether an owner has read (r), write (w), execute (x), encrypt (e), decrypt (d), and delete permissions on the file (f); (6) group permissions 1860, which determine whether a group has read, write, execute, encrypt, decrypt, and delete permissions on the file; and (7) other permissions 1870, which determine whether others have read, write, execute, encrypt, decrypt, and delete permissions on the file. As described above, the kernel checks these permissions when accessing the file to determine whether the user or the process can perform the function (encrypt to write, decrypt to read, delete, etc.) on the file. Thus, for example, when the group access permissions for a file are the bit sequence 111010, the group can read, write, execute, and encrypt the file but cannot delete or decrypt the file.

Figure 20:
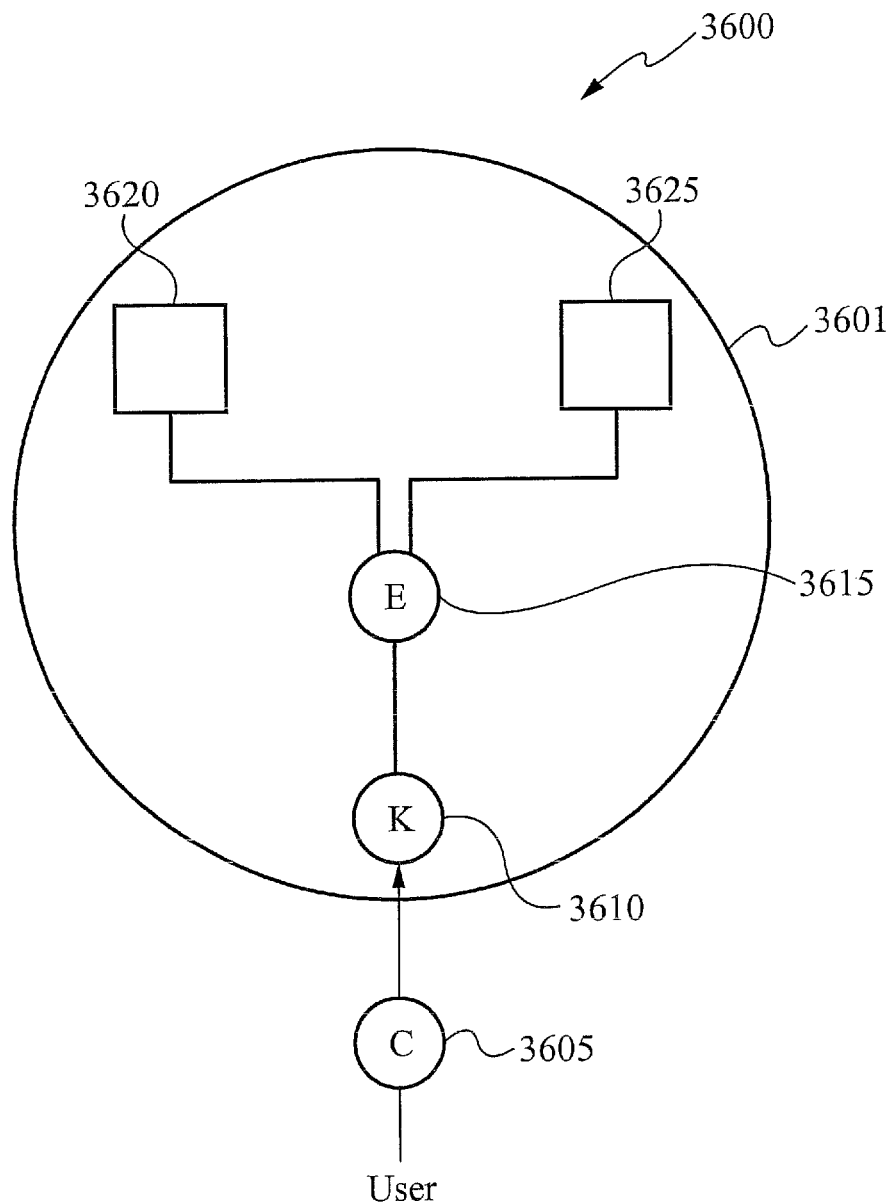
FIG. 20 is a high-level diagram of components of an EOS in accordance with the present invention.

FIG. 20 is a high-level diagram of a user (or process) using a system 3600 in accordance with the present invention. The system 3600 comprises a credentials component 3605 coupled to a key-management component 3610, which is coupled to an encryption/decryption component 3615. The encryption/decryption component 3615 is coupled to a memory 3620 and a secondary device 3625. As described in detail below, in accordance with one embodiment of the present invention, the user inputs data used to generate his credentials for accessing a file. The credentials are used by a key management system 3610 that generates keys used to encrypt and decrypt data using the encryption/decryption component 3615. The encryption/decryption component allows the user or process to encrypt and decrypt data moved between the memory 3620 and the secondary device 3625.

When authenticating a user or process, the EOS extracts from the password file and the shadow password file information that is required to assemble the user key for key management.

The credentials structure uses the members of the group structure in UNIX to identify the user process, the application process, and the user's files within the system as belonging to that user. This procedure is used to authenticate the user's application's processes which operate on file data as having the proper permissions for gaining access to data. Under EOS, UNIX groups are transformed into corporate structures such as departments, business units, owners, etc., to mandate control over data. This control is implemented from the user, the applications, and the commands that operate on data, through the kernel via vnodes when the data is in memory, down to the i-nodes when data is returned to the disk medium. The path of the credentials is present at every point in this change, and the EOS maintains certain control over the separation of all data from the human interface of the system and the data that resides within the system through encrypting the data within the system and forcing authenticated access to it. The EOS modifies the UNIX architecture at the point where the credentials structure interfaces with the kernel using the follow members of the credentials structure: (1) the user id definition, "uid_t" and "cr_uid", the effective users id; (2) the group id definition, "gid_t" and "cr_gid", the effective group id; (3) the user id definition, "id_t", and "cr_ruid", the real user id; (4) the group id definition, "gid_t", and "cr_rgid", the real user id; (5) the saved user id definition, "uid_t", and "cr_suid", the real user id; (6) the saved group id definition, "gid_t", and "cr_sgid", the real user id; (7) the privilege vector definition, "pvec_t", and "cr_savpriv", the saved privilege vector; (8) the privilege vector definition, "pvec_t", and "cr_wkgpriv", the working privilege vector; (9) the privilege vector definition, "pvec_t", and "cr_maxpriv", the maximum privilege vector; (10) the level identifier definition, "lid_t", and "cr_lid", the level identifier (MAC) Medium Access Controller; and (11) the level identifier definition, "lid_t", and the "cr_lid", member for the level identifier (MAC) CMW.

The EOS also used a password and a shadow password file to ensure that only authenticated users and applications can access data. The EOS uses a password entry associated with a user id and other parameters to generate inputs to its key management system (i.e., the expert key management system). The EOS also uses entries in a shadow password file (in which all of the entries within it such as passwords, are encrypted) as inputs into its modifications for the UNIX credentials matrix. The EOS expert key management system uses a matrix of permissions and user identification information to form an authentication vector for each user or application running as a process on the operating system. The vectors replace credential information within the UNIX credential structures thus forming a unique mechanism for authenticating each user, application, or system of appliances running on EOS and requiring access to information stored in the EOS's protected storage.

Figure 21:
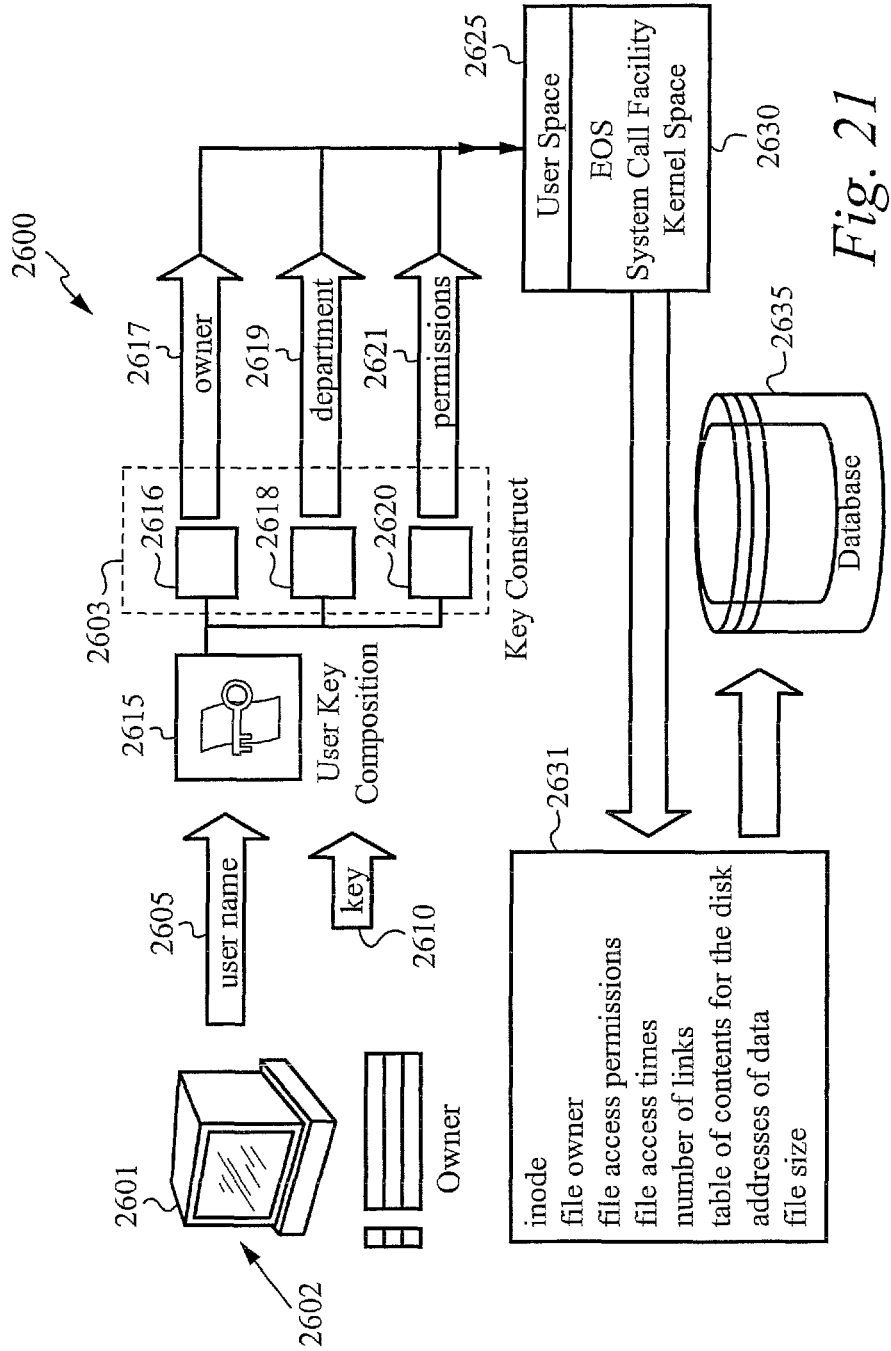
FIG. 21 is a diagram showing the use of credentials and permissions in accordance with the present invention.

FIG. 21 is a high-level schematic diagram showing how a user (or process) can access data in accordance with one embodiment of the present invention. Thus, FIG. 21 shows a system 2600 for encrypting and decrypting data. The system 2600 comprises a computer system 2602 with a process 2601 executing on it, and a database 2635. On the computer system is memory comprising a user space 2625 and an EOS kernel space 2630. In operation, the user name 2605 and a system key 2610 from the EOS are used to generate a user key composition 2615 that is used to generate a key construct 2603 comprising the components 2616, 2618, and 2620. The portion 2616 is used to generate the permissions for the owner of the file 2617, the portion 2618 is used to generate the permissions for a particular department 2619, and the portion 2620 is used to generate the permissions for others 2621. The permissions corresponding to the particular user (owner, department, others) then determine whether the user can access the data in the EOS. If the user or process is allowed to access the data, the EOS System call facility 2630 is used to access the file data 2631, which is used to store or retrieve the encrypted data from, for example, a database 2635. The data can then be encrypted and stored, or retrieved, decrypted and stored in the user space 2625.

Similar steps can be performed when the user or process belongs to a different department or sub-division of a corporation, with permissions corresponding to the department or sub-division being generated.

Figure 22:
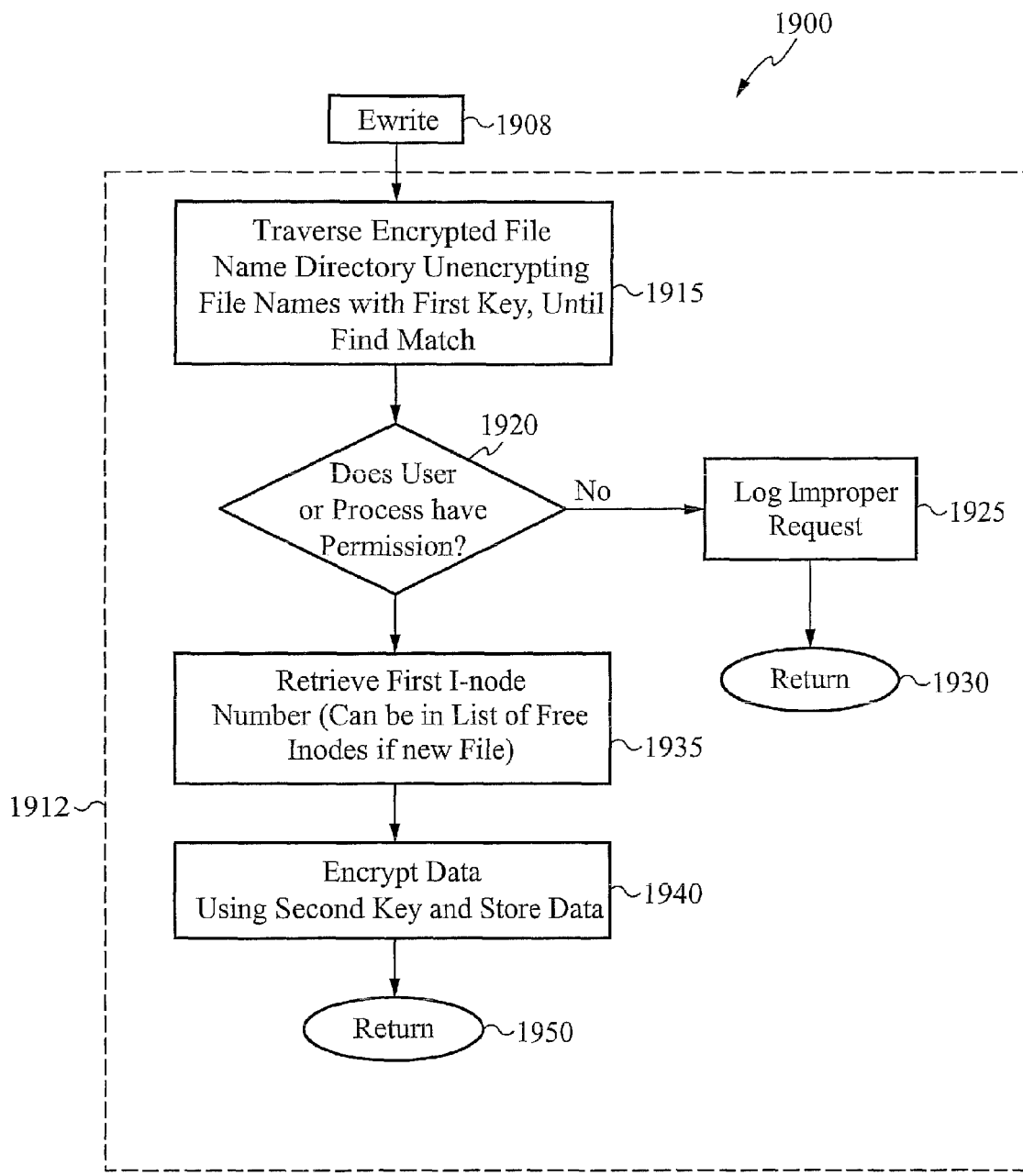
FIG. 22 is a flow chart, showing the steps used to store encrypted data to disk, in accordance with embodiments of the present invention.

FIG. 22 illustrates the use of access permissions when writing a file to disk. As shown in FIG. 22, in the step 1908 a user (such as either a user at a terminal, a process, or a batch file) calls a system function to write a file to disk. The system function can be, for example, the Enode EWRITE. As described above, an Enode is an operation that can be performed on a file in the encrypted file system. The function EWRITE traps to the kernel, which performs the tasks shown within the dashed box 1912. As described above, performing the encryption/decryption tasks within the kernel, the tasks are performed more efficiently, in a protected mode that is transparent to the user or process.

Next, as shown in the step 1915, the kernel traverses the encrypted directory file, decrypting each directory entry and comparing it to the name of the file that is to be written to (the target file name). The kernel decrypts the file names using the same algorithm used to encrypt them, preferably using the Rijndael algorithm. When a process refers to a file by name, the kernel parses the file name one component at a time, checks to find if the process has permission to search the directories in the path by once again using the key to decrypt the directories in the path and eventually retrieves the inode for the file. It will be appreciated, however, that the kernel can encrypt/decrypt the file name using other algorithms such as DES, triple-DES, Blowfish, Skipjack, IDEA, other algorithms, or any combination of these. In one embodiment, the encryption/decryption algorithm uses 1024-bit or 2048-bit keys, but it will be appreciated that the encryption/decryption algorithm can use keys of shorter or longer lengths. Short key lengths can be used when the encryption does not have to be strong or when speed is important. This process continues until an unencrypted directory name matches the target directory name. It will be appreciated that FIG. 19 shows only those steps needed to explain the present invention and does not show other components such as error checks. For example, the encrypted file name may have no corresponding entry in the encrypted directory. In this case, not shown in FIG. 19, an error code may be returned to the calling process or a message such as "FILE NOT FOUND" generated on a user display.

It will also be appreciated that the encrypted directory names can be compared to the target directory name using other steps performed in other sequences. For example, the target directory name can first be encrypted and then compared to the encrypted directory names until a match is found. This alternative method can be used to decrease the number of encryption/decryption steps.

Next, in the step 1920, the kernel checks whether the user or process has permission to write an encrypted file to disk. For example, if the process is the owner of the file, the kernel checks whether the owner's encrypt bit (e) is set. Thus, permissions of 010010 will allow the process to write the file, but permissions of 101101 will not. If the process does not have the correct permissions, the kernel will proceed to the step 1925, in which the improper request is logged, and then to the step 1930, in which the kernel returns an error code to the executing process.

If the process has the correct permissions, the kernel proceeds to the step 1935, in which it retrieves the i-node table from the matching entry in the encrypted directory. It will be appreciated that an i-node can correspond to an absolute pathname, a relative pathname, or a filename. If the encrypted file has no data blocks assigned to it (for example, because it is a new file), the kernel will retrieve i-nodes from a list of free i-nodes. Next, in the step 1940, the kernel uses this i-node entry and the encryption key to encrypt the process data using the second key, generating encrypted data; then the kernel stores the encrypted data in the data blocks addressed by the i-node's direct blocks and any single, double, or triple indirect blocks. After storing the encrypted data, the kernel returns in the step 1950.

Figure 23:
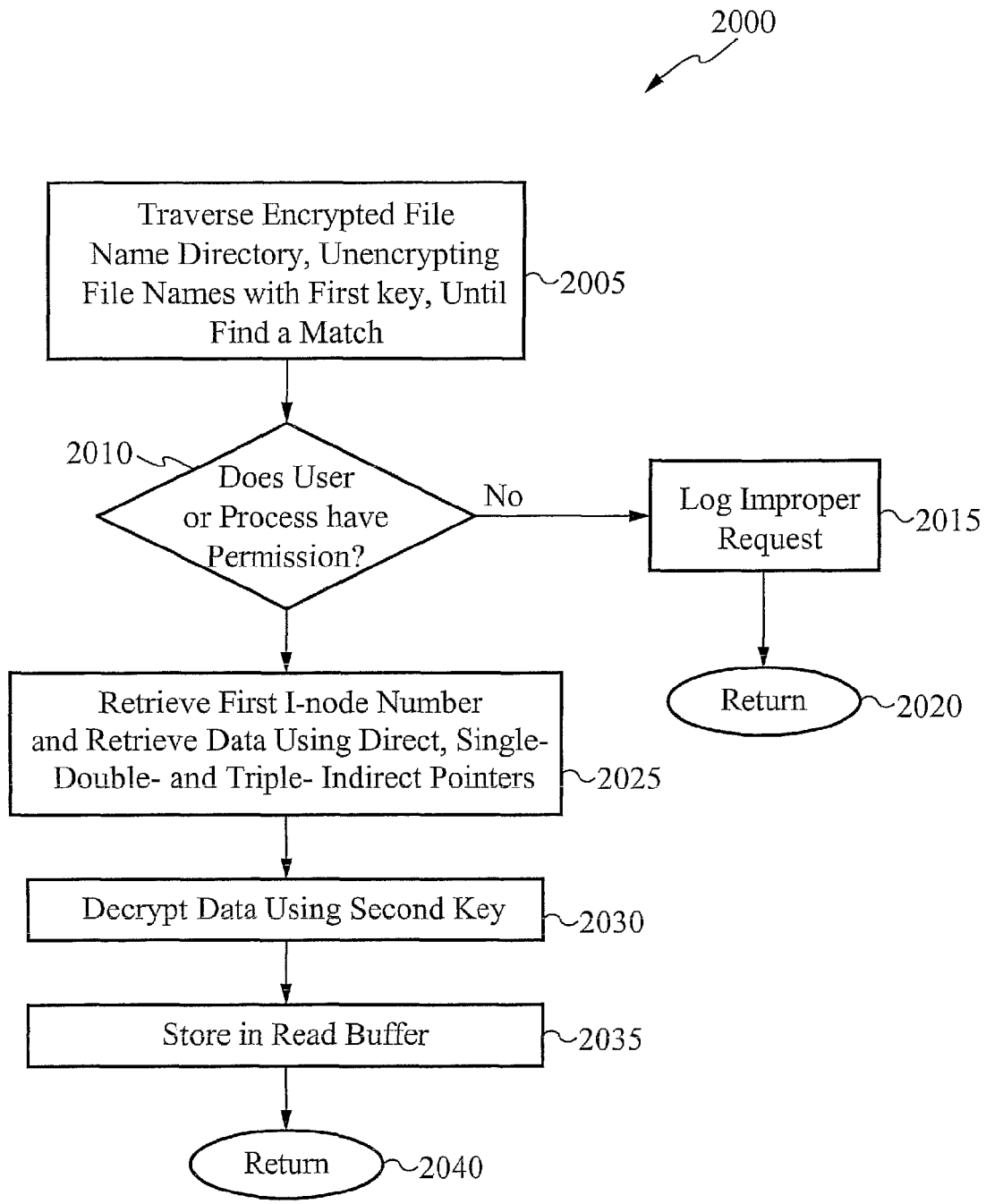
FIG. 23 is a flow chart, showing the steps used to retrieve encrypted data from disk, in accordance with embodiments of the present invention.

Similarly, FIG. 23 shows the steps used to retrieve encrypted data stored on disk in a target file. First, in the step 2005, the kernel traverses the encrypted file name directory, decrypts the file names, and compares them to the target file name until it finds a match. Next, in the step 2010, the kernel process checks the permission bits to determine whether the process has permission to decrypt the file and thus access the file. If the process does not have permission to do so, the kernel logs the improper request in the step 2015 and returns in the step 2020, preferably with an error message. If the process has permission to decrypt the file, the kernel proceeds to the step 2025, in which it retrieves the i-node numbers and thus accesses the data blocks containing the encrypted data. Next, in the step 2030, the kernel decrypts the encrypted data using an encryption key to recover the clear data, stores the clear data in a buffer accessible to the calling process in the step 2035, and then returns in the step 2040.

Figure 24:
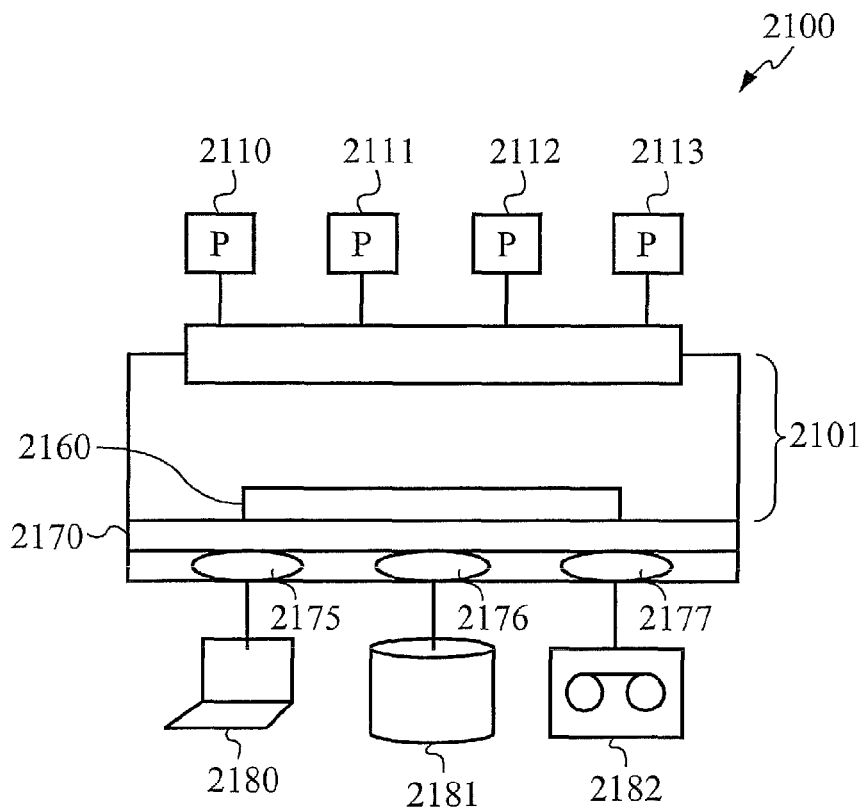
FIG. 24 is a schematic diagram showing the relationship between user processes and device drivers, in accordance with embodiments of the present invention.

It will be appreciated that the EOS can function in many parts of the kernel in accordance with the present invention. For example, in one embodiment of the present invention, a device driver interface is modified to ensure that data is encrypted and decrypted when exchanged between a computer system and attached peripheral devices. FIG. 24 shows a computer system 2100 using an EOS in accordance with the present invention. The computer system 2100 supports processes 2110-2113. Each process 2110-2113 is coupled to a system call interface 2101, which can be invoked by each executing process 2110-2113 to read from and write to the devices tty 2180, disk 2181, and tape 2182, as described below. The system call interface 2101 couples to an I/O subsystem 2160, which in turn couples to a device driver interface 2170. The device driver interface 2170 couples to (1) a tty driver 2175, which couples to a tty; (2) a disk driver 2176, which couples to one or more disks 2181; and (3) a tape driver 2177, which couples to a tape 2182. The system call interface and I/O subsystem 2160 form part of the kernel of an EOS.

When a process (e.g., 2110), wishes to write to a peripheral device (e.g., the disk 2181), the process executes a system call through the system call interface 2150, which traps to the kernel 2101. The kernel 2101 invokes the I/O subsystem 2160. In accordance with one embodiment of the invention, the I/O subsystem 2160 encrypts the data to be written to the disk 2181 to generate encrypted data. The I/O subsystem 2160 then invokes the device driver interface 2170, which calls the hardware-dependent disk driver 2176, which writes the encrypted data to the disk 2181. Data traveling from the disk 2181 to the process 2110 travels the reverse similar path, with the I/O subsystem 2160 decrypting the data before sending it to the process 2110.

It will be appreciated that in accordance with the present invention, other modules within the kernel (and thus between a process and either a device or a device driver) can also be used to encrypt and decrypt data transferred between a process and a device. It will be appreciated that there are several advantages to executing the encryption and decryption in kernel mode, in accordance with the present invention. First, for example, the kernel address space (and thus data) is protected from non-kernel operations. Thus, a non-authorized user could not read clear data processed in the kernel address space. Second, kernel operations generally run in protected mode. Thus, a non-authorized user could not interrupt a kernel process before its completion and thus try to read that portion of the data that the kernel had not yet had a chance to encrypt. Third, kernel processes are more efficient since they do not require the overhead of context switching between a non-kernel process and a kernel process.

Figure 25:
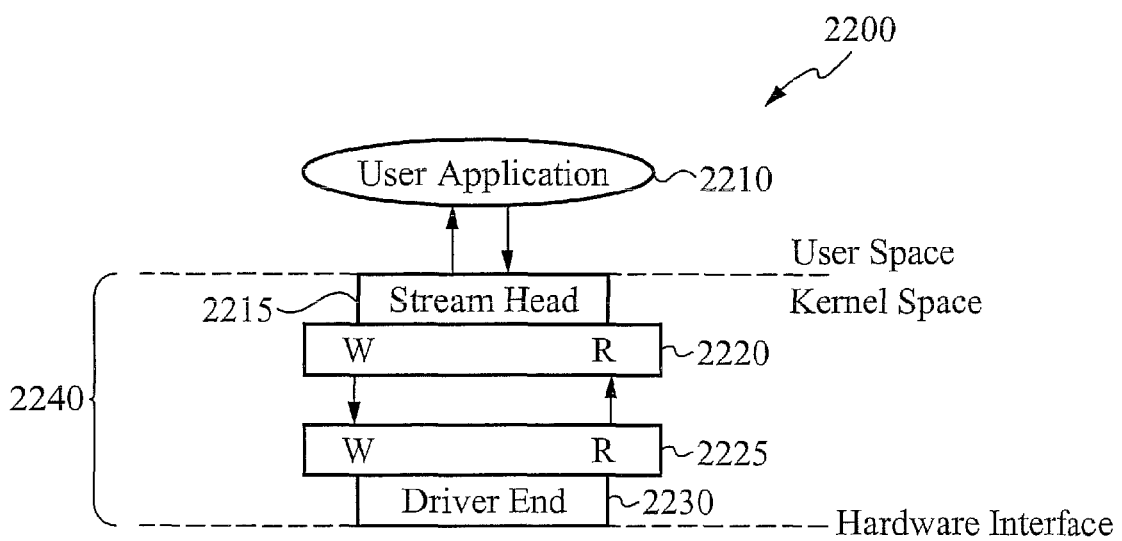
FIG. 25 is a schematic diagram showing a user application and a STREAM, in accordance with embodiments of the present invention.

Other collections of systems calls, such as STREAMS, can also be adapted in accordance with the present invention to encrypt and decrypt data that is transferred between processes and devices. As other encryption/decryption mechanisms in accordance with the present invention, STREAMS resides in kernel space. FIG. 25 shows a communication process 2200 comprising a user application 2210 coupled to a stream 2240. The stream 2240 comprises a stream head 2215 coupled to the user application 2210, a first module 2220 coupled to the stream head 2220, a second module 2225 coupled to the first module 2220, and a driver end 2230 coupled to the second module 2225. It will be appreciated that a stream can have zero or any number of modules such as the two modules 2220 and 2225 shown in FIG. 25.

The stream head 2215 provides an interface to the user application 2210 for accessing the stream 2240. The stream head 2215 also copies user data from the user address space into STREAM messages, discussed below, in the kernel. The first module 2220 and the second module 2225 can be used to process data before sending it to the driver end 2230. For example, the first module 2220 can perform TCP functions and the second module 2225 can perform IP functions, together providing TCP/IP functionality that allows the user application to communicate over a network. The driver end 2230 communicates with a device (not shown), such as a disk, tape drive, network interface card, tty, or any other device. The stream transmits data between modules by storing the data in messages. Thus, for example, in accordance with the present invention, the first module 2220 can be used to encrypt and decrypt data. Each of the modules 2220 and 2225 has a read queue for reading messages and a write queue for writing messages, as described below.

As an example, the user application 2210 may send data to be encrypted to a device (not shown). The user application 2210 accesses the stream head 2215 to handle the request. The stream head 2215 calls the first module 2220, which formats the data into a message and places the request on a write queue. When the first module 2215 is ready to process the data, it takes the message from the write queue and encrypts the data in accordance with the present invention and stores it in another message. Next, the first module invokes the second module 2225, which may also process the data, using the write queue to access the message in a similar manner. The second module 2225 can then invoke the driver end 2230 (such as a device driver) to write the encrypted data to the device. It will be appreciated that if the streams 2240 is used only to encrypt data, the second module 2225 is optional. Data transferred from the device to the user application travels in the opposite direction and may be decrypted by the first module 2220 before being passed to the user application 2210.

Figure 26:
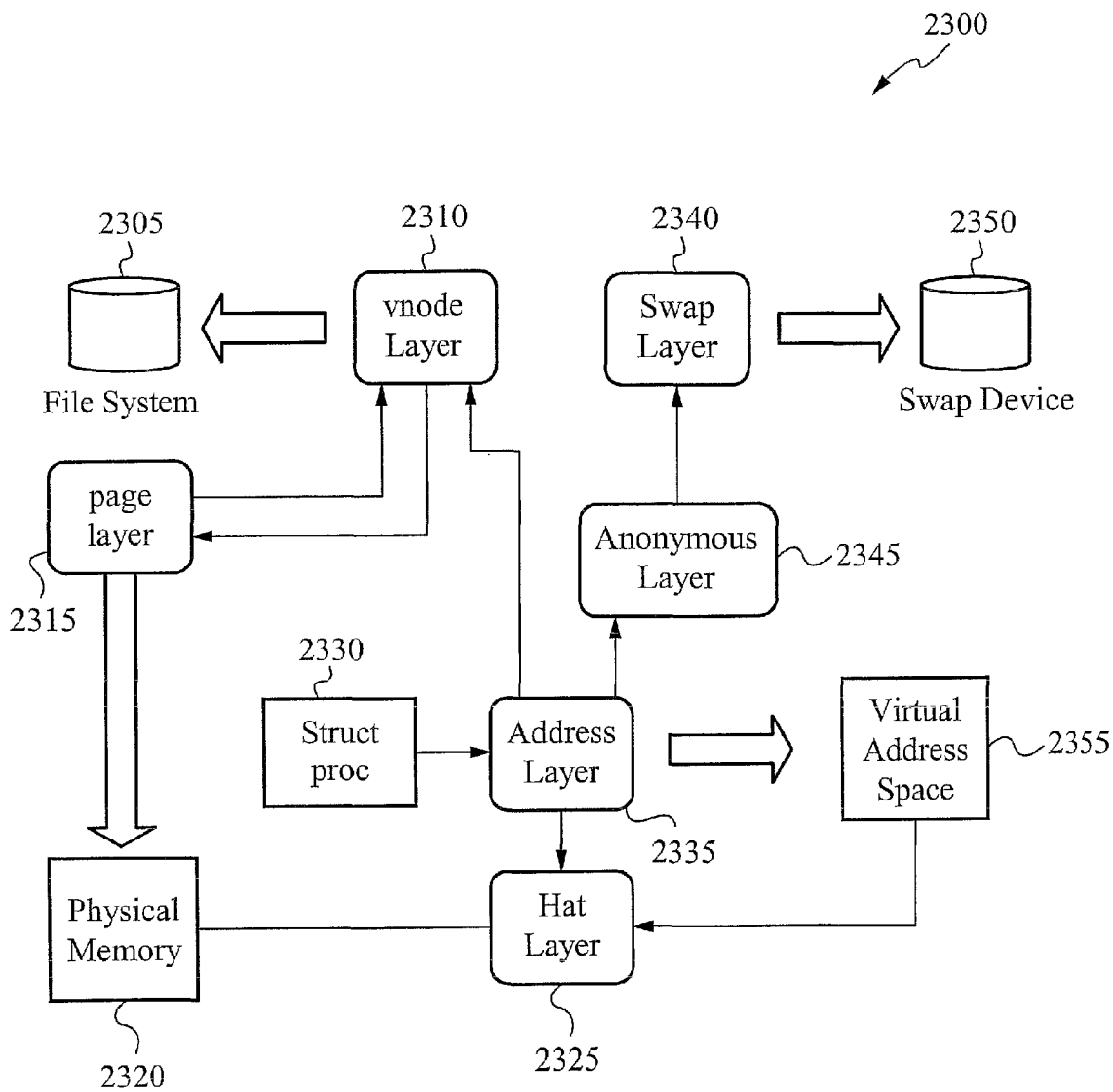
FIG. 26 is a high-level diagram of a file system, a swap device, physical memory, and the structures used to transfer data between them.
Figure 27:
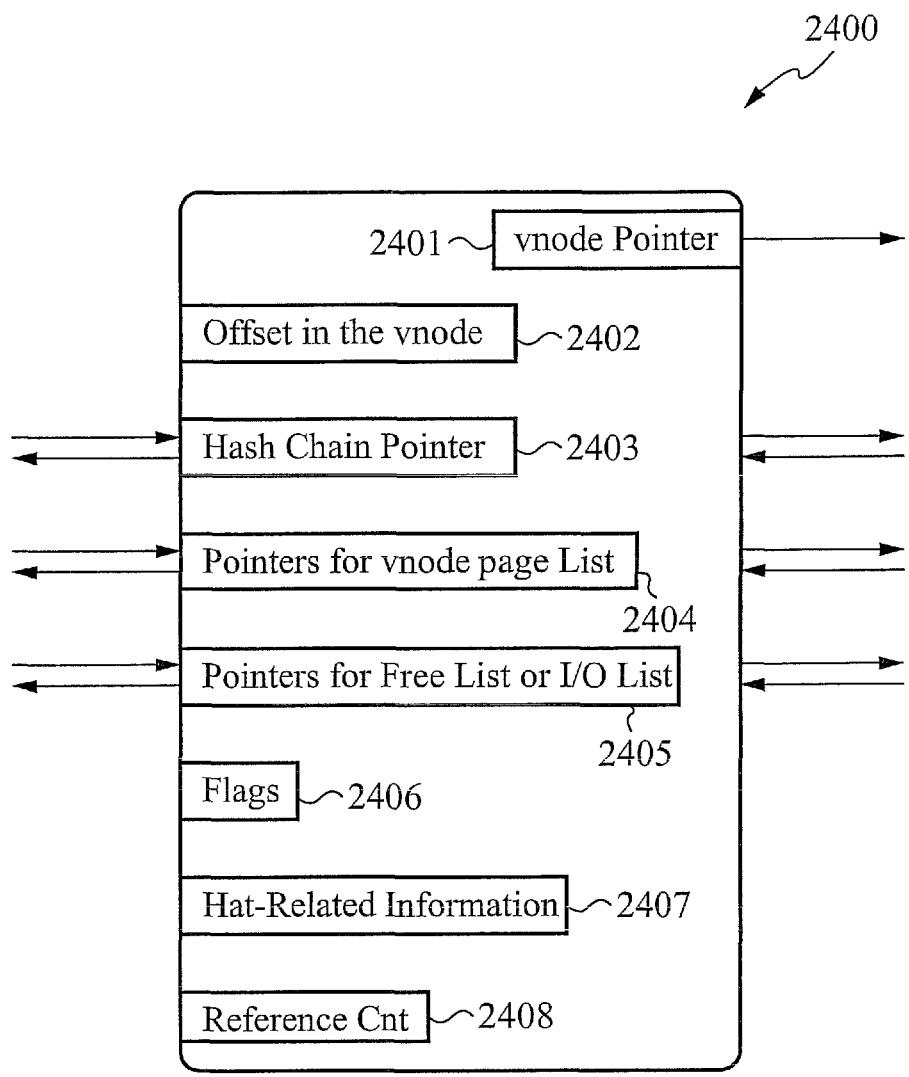
FIG. 27 is a diagram of a page structure, used in a virtual memory system.
Figure 28:
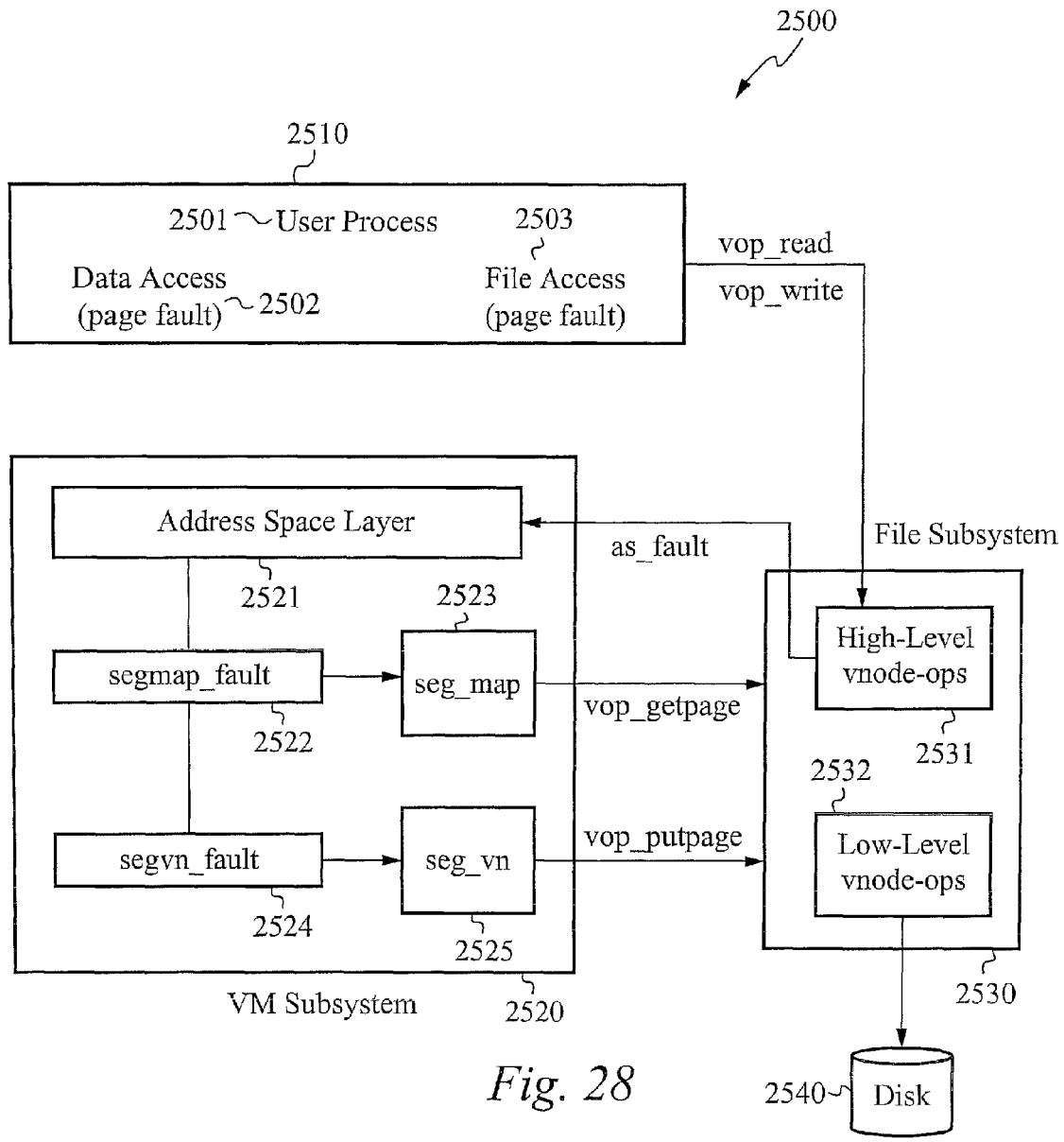
FIG. 28 is a diagram of a user process, a VM subsystem, a file subsystem, and disk.

FIGS. 26-28 are used to show low-level components that can be modified for use in an EOS in accordance with the present invention. FIG. 26 illustrates the fundamental abstractions used by a virtual-memory sub-system 2300. The virtual-memory sub-system comprises a file system 2305 coupled to a vnode layer 2310, which is coupled to both a page layer 2315 and an address space layer 2335. As is known to those skilled in the art, a vnode is a data object that provides functions and data for a particular file. The page layer 2315 is coupled to physical memory 2320, which is coupled to a hardware address translation (HAT) layer 2325. The HAT layer 2325 is the interface between an abstract interface and hardware-dependent functionality. The HAT layer 2325 is coupled to the virtual address space 2355 and the address space layer 2335. The address space layer 2335 is also coupled to the struct proc 2330, the vnode layer 2310, the virtual address space 2355, and an anonymous layer 2345. The anonymous layer 2345 is coupled to a swap layer 2340, which is coupled to a swap device 2350.

The general functioning of the abstractions of the virtual memory subsystem 2300 is known to those skilled in the art. In accordance with one embodiment of the present invention, the vnode layer 2310 is modified to encrypt and decrypt data. Thus, for example, the vnode layer 2310 can be configured to encrypt data before transferring it to the file system 2305 or before transferring data to the anonymous layer 2345, from which it can be transferred to the swap device 2350. In addition, the vnode layer 2310 can be configured to decrypt data after transferring the data from the file system 2305 and before transferring it to the physical memory 2320. It will be appreciated that other components, preferably those executing in the kernel, can be used to encrypt and decrypt data in accordance with the present invention.

FIG. 27 illustrates a page structure 2400, used to access pages. As is known to those skilled in the art, the page structure 2400 comprises a vnode pointer 2401, an offset in the vnode 2402, hash chain pointers 2403, pointers for the vnode page list 2404, pointers for a free list or an I/O list 2405, flags 2406, HAT-related information 2407, and a reference count 2408. It will be appreciated that the page structure can be used in accordance with the present invention. For example, the pointers for the vnode page list 2404 is a list of all the pages in memory used by the current object (e.g., file). Thus, when a file is deleted, the kernel must traverse the pages in this list and invalidate all of the pages in the file.

Physical memory is divided into paged and non-paged regions. The paged region is described by an array of page structures, each describing one logical page. Because physical memory is essentially a cache of memory object pages, the page structure must contain standard cache management information. It also contains information required by the address translation mechanism.

Each page is mapped to some memory object, and each object is represented by a vnode. Hence the name, or identity, of a physical page is defined by a <vnode, offset> tuple, which specifies the offset of the page in the object represented by the vnode. This allows a page to have a unique name even if it is being shared by several processes. The page structure stores the offset and a pointer to the vnode.

Every page is on several doubly linked lists, and the page structure uses three pairs of pointers for this purpose. To find a physical page quickly, pages are hashed based on the vnode and offset, and each page is on one of the hash chains. Each vnode also maintains a list of all pages of the object that are currently in physical memory, using a second pair of pointers in the page structure. This list is used by routines that must operate on all in-memory pages of the file. The final pair of pointers keeps the pages either on a free page list or on a list of pages waiting to be written to disk. The page cannot be on both lists at the same time.

The page structure also maintains a reference count of the number of processes sharing this page using copy-on-write semantics. There are flags for synchronization (locked, wanted, in-transit) and copies of modified and referenced bits (from HAT information). There is also a HAT-dependent field, which is used to locate all translations for this page.

The page structure has a low-level interface comprising routines that find a page given the vnode and offset, move it onto and off the hash queues and free list, and synchronize access to it.

FIG. 28 is a schematic of a file system 2500, showing the relationship between a user process 2510, a VM subsystem 2520, a file subsystem 2530, and disk 2540. The user process 2510 is coupled to the file subsystem 2530, which is coupled to the VM subsystem 2510 and the disk 2540.

The user process 2501 invokes function calls to access data 2502 and files 2503. As is known to those skilled in the art, the user process 2501 thus invokes the kernel to issue vop_read and vop_write system calls executed by the file subsystem 2530. The file subsystem 2530 then invokes high-level vnode operations 2531. When writing data to memory, the high-level vnode ops 2531 then generate an as_fault to the address space layer 2521, generating a segmap_fault 2522. The kernel, processing the segmap_fault 2522 then maps a part of the file into the kernel space using the seg_map driver 2523, faulting the data in, copying it from the user's address space. The seg_map driver 2523 reads data blocks into paged memory. The segvn_fault 2524 and associated seg_vn driver 2525 perform the reverse process when data is to be written to memory.

It will be appreciated that encryption and decryption in accordance with the present invention, can be performed at various steps performed by the kernel. For example, the encryption can occur as the seg_map driver copies data from user memory to kernel memory.

The file system provides the backing store for a large number of VM segments. Therefore, the VM subsystem must constantly interact with the file system to move data between files and memory. Conversely, the file system uses memory mapped access to implement the read and write system calls.

The VM architecture relegates all file system specific details to the vnode layer, accessing file solely through the procedural interface of the vnode. Under SVR4, three operations were designed for the vnode interface: (1) VOP_MAP, which is called from mmap to perform file system dependent initialization and parameter checking; (2) VOP_GETPAGE, which is called whenever the VM must obtain pages from a file; and (3) VOP_PUTPAGE, which is called to flush potentially dirty pages back to the file.

The relationship between the memory and the file system is a symbolic one. The file system provides the backing store for VM segments, and VM provides the implementation of file access. The issuance of a read or write system call causes the kernel to temporarily map part of the file into its own address space using the seg map segment, faults the data in, and then copies it to or from the user's address space.

It will also be appreciated that in accordance with one embodiment of the present invention, data does not always have to be encrypted when transferred from physical memory to disk. For example, files and data that were originally on the file system are already stored on the file system. This includes shared libraries, executable code, and the like. When such unencrypted data must be swapped out, the operating system checks a bit, such as a modified bit, to determine whether the data has changed. If the data has not changed, the page containing it is released rather than stored to the swap space. If the data has changed, it is encrypted and written back to the file system (e.g., to disk). When the process requires the data again, the page containing it can be decrypted and brought back into computer memory. It will also be appreciated that data that did not originate on the file system (i.e., anonymous memory), is not written to disk and must be stored in a swap space.

Figure 29:
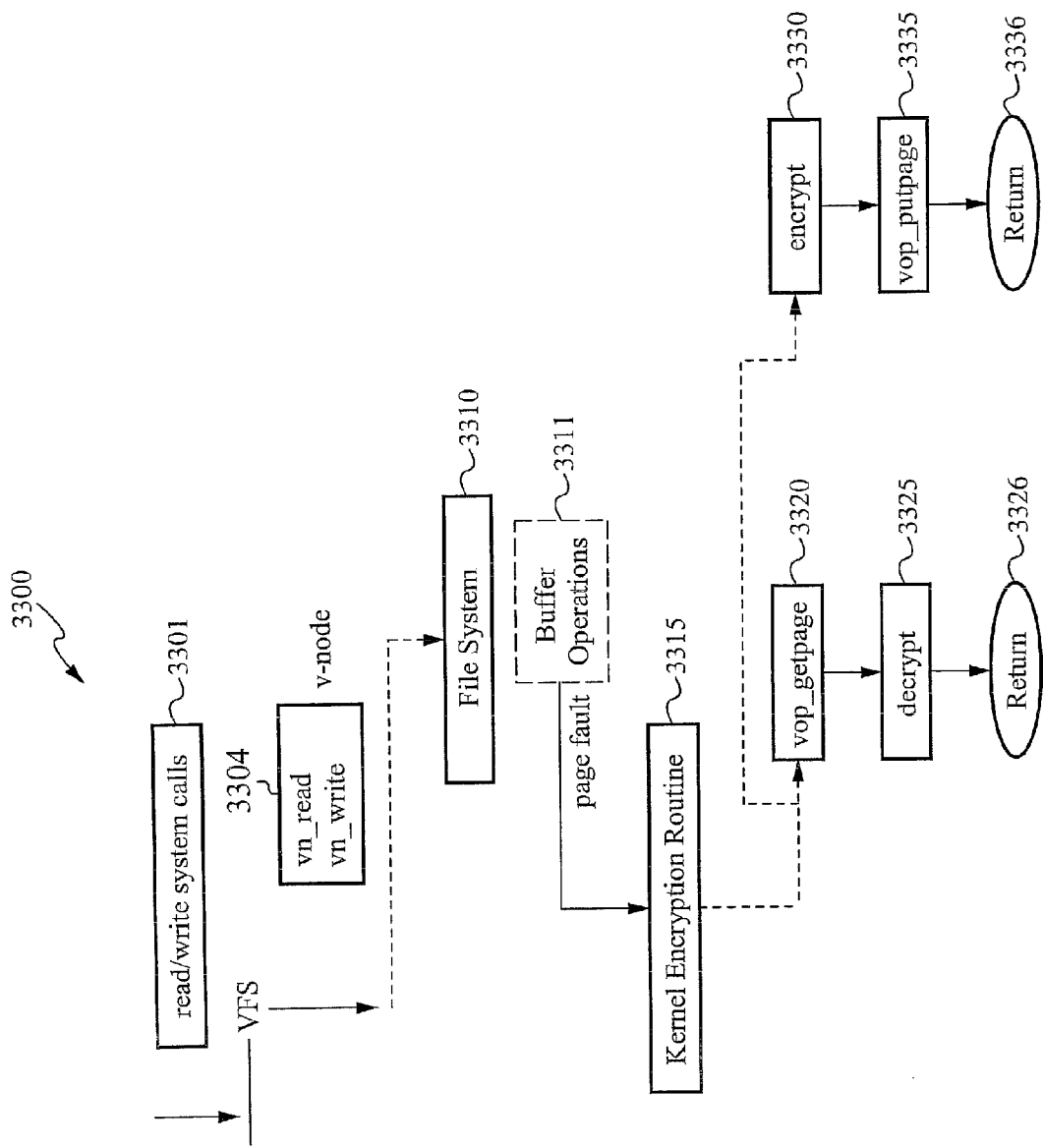
FIG. 29 is a diagram of the steps used to encrypt and decrypt pages in accordance with the present invention.

FIG. 29 shows, in more detail, a process 3300 followed by an encryption driver when encrypting data in accordance with the present invention. The encryption driver is sometimes referred to as a pseudo driver because it is not related to a true device but to a file or other construct that has a file-like interface. In the step 3301, a process or user invokes a read or write system call. Next, in the step 3305 the read or write system call invokes a kernel routine 3304, such as the vh_read call or the vh_write call, respectively, both methods in a v_node object for a particular file in the virtual file system. The respective call is serviced by the corresponding file system interface in the step 3310, which includes buffer operations 3310. The file system interface corresponds to the particular file system mounted, such as NFS, tmpfs, ufs, sockfs, etc. The buffer operations 3310 generally include writing data into kernel (i.e., protected) memory.

When the data must be written to a secondary device, such as backing store, a swap device, etc., a page fault is generated and the kernel encryption routine 3315 in accordance with the present invention is performed. The kernel encryption routine 3315 can call one of several operations. When reading data from the secondary device (e.g., when the user or process invokes a read command), the encryption process 3300 proceeds to the step 3320, in which the kernel invokes the vop_getpage operation on the vnode to get the appropriate encrypted data. Next, in the step 3325, the data is decrypted, and in the step 3326, the kernel returns control to the calling user or process. (It will be appreciated that if the user or process could invoke the READ or WRITE system call without blocking, in which case the user or process would take other steps to receive the data.)

When writing data to a secondary device, after the step 3315, the kernel enters the step 3330, where it encrypts the data. Next, in the step 3335, the kernel invokes the vop_putpage operation on the vnode, and then returns control to the calling user or process in the step 3336.

It will be appreciated that data can be encrypted in accordance with the present invention at times other than when a user or process reads or writes data to a secondary device. For example, the EOS can be used to encrypt dirty pages that must be flushed to memory. Thus, for example, embodiments of the invention can use an interrupt service routine (ISR) to periodically check the dirty bit associated with a page. When the dirty bit is set, the EOS can encrypt the page and flush it to the secondary device, such as a backing store.

Figure 30:
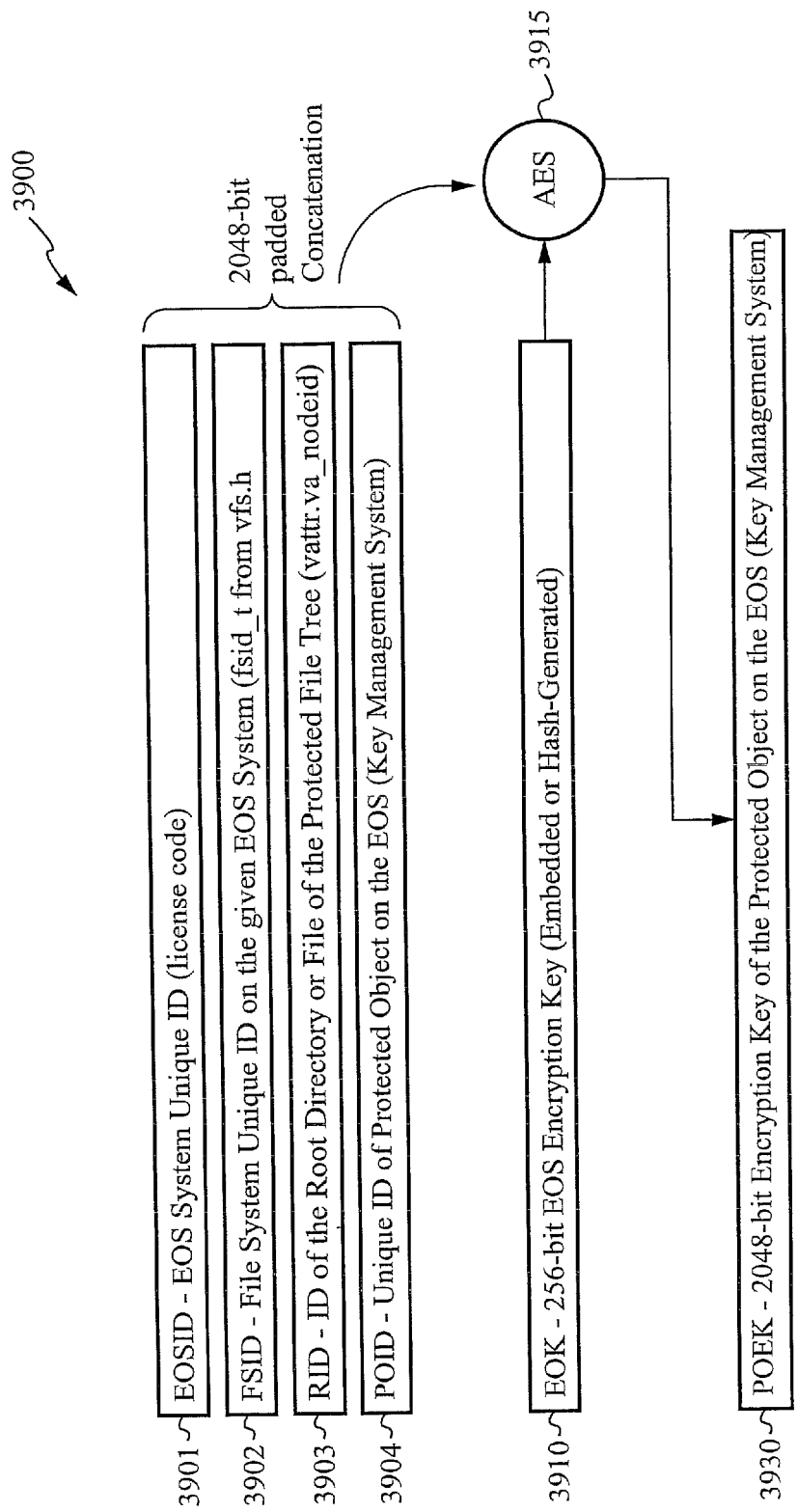
FIG. 30 is a high-level diagram of a data encryption algorithm in accordance with the present invention.

FIG. 30 is a high-level diagram of a data encryption algorithm 3900. The data encryption algorithm 3900 uses the EOS System Unique ID (EOSID) 3901 (such as a license code), a file system unique ID on a given EOS system (FSID) 3902 (e.g., fsid_t from vfs.h), an ID of the root directory or file of the protected tree (RID) 3903 (e.g., vattr.va_nodeid), a unique ID (POID) 3904 of the protected object on the EOS (key management system), and a 256-bit encryption key (EOK) 3910 (either embedded or hash generated), and feeds them to an encryption algorithm 3915, such as AES, to form a 2048-bit encryption key (POEK) 2930 of the protected object (e.g., encrypted file) on the EOS.

In one embodiment, the file encryption and decryption algorithm used to encrypt and decrypt files in accordance with the EOS (hereinafter referred to as the "EOS encryption algorithm") preferably uses a 1024-bit block and a 2048-bit key. It will be appreciated that block sizes and key sizes can be larger or smaller in accordance with the present invention. Smaller block and key sizes can be used when the speed of encrypting and decrypting is a larger concern than security; larger block and key sizes can be used when security is more important than the speed of encryption and decryption. Moreover, any combination of key sizes and block sizes can be used in accordance with the present invention.

In accordance with one embodiment of the present invention, the EOS encryption algorithm is a combination of (1) a standard AES block cipher, (2) a permutation function (16× 64 bits mapped to 16×64 bits), and (3) a file block manipulation technique. A high-level overview of the generation of the 2048-bit key is illustrated in FIG. 30.

Figure 31:
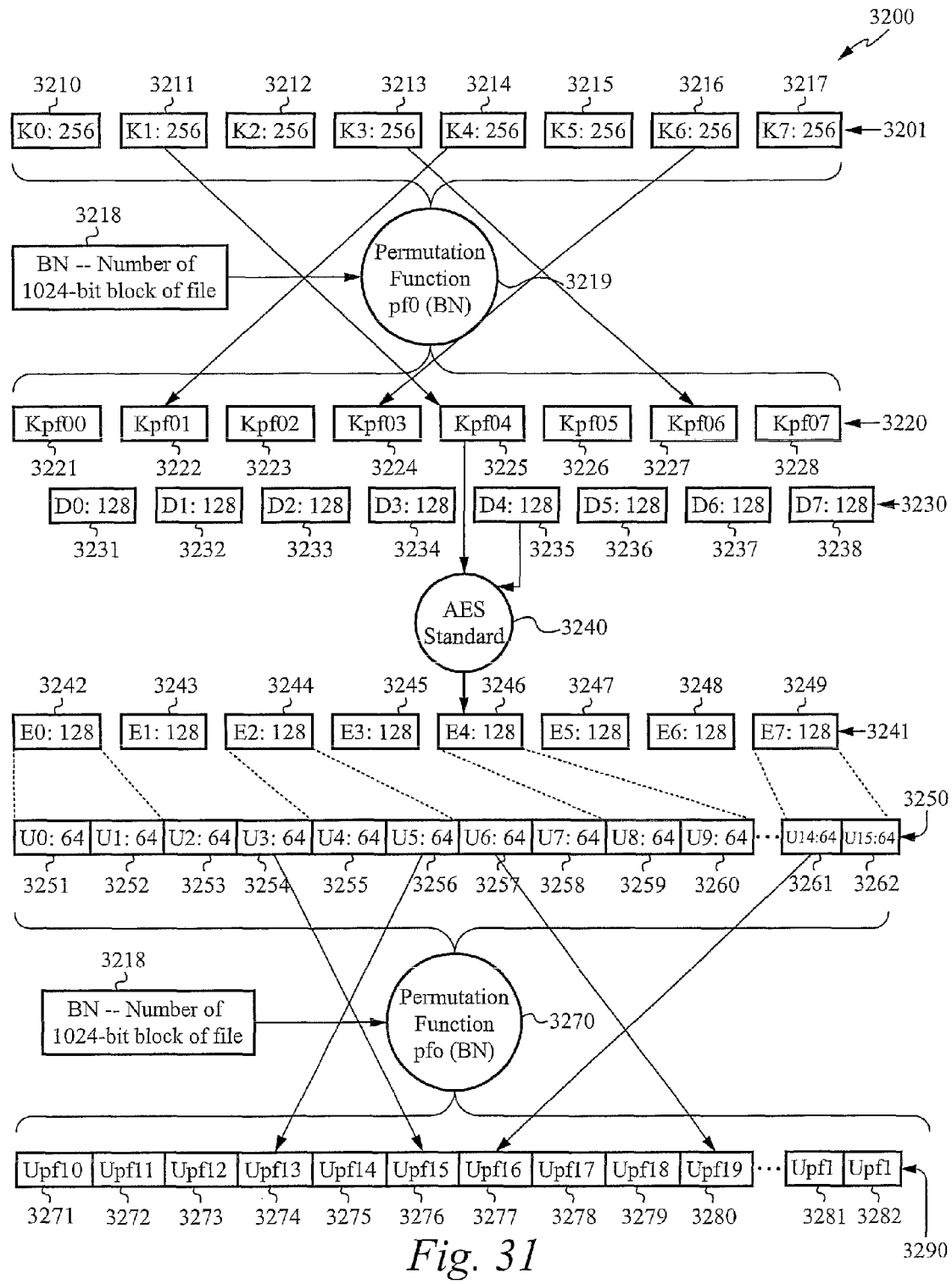
FIG. 31 is a low-level diagram of a data encryption algorithm in accordance with the present invention.

FIG. 31 is a schematic diagram showing a data encryption process 3200 used to encrypt data (e.g., a file, a portion of a file, a data buffer, or any other segment of data) in accordance with the present invention as shown, for example, in the step 1940 in FIG. 22. As shown in FIG. 32, and as described in more detail below, the data encryption process 3200 comprises (1) rearranging the portions of a key 3201 using a permutation function 3219 to form a new key 3220, (2) using the new key 3220 to encrypt data 3230 using an encryption algorithm 3240, such as the AES standard (Rijndael) 3240 to produce encrypted data 3241, and (3) rearranging the encrypted data 3241 using a first permutation function pf0 3270 to generate final encrypted data 3290. In a preferred embodiment, the data is divided into 1024-bit blocks of data, each of which is encrypted with a different key, as described below.

As illustrated in FIG. 31, in a preferred embodiment, the key 3201 is divided into eight 256-bit sub-keys K0-K7, labeled 3210-3217, respectively. The file or data portion to be encrypted is given a number, which is input to the permutation function 3219 to produce the new key 3220. Thus, for example, if the file to be encrypted is divided into 1024-bit blocks, a first key for encrypting the first block is generated by inputting the number "1" (the block number) and the eight 256-bit sub-keys K0-K7 3210-3217 into the permutation function 3219 to generate the new key 3220, comprising eight 256-bit subkeys Kpf00-Kpf07, labeled 3221-3228, respectively. It will be appreciated that the first permutation function 3219 can be any permutation function known to those skilled in the art.

The new key 3220 is now used to encrypt the data. It will be appreciated that the first 1024-bit block of data is encrypted using a first key, here labeled 3220. It will be appreciated that the above steps will be used to generate a second key as the one labeled 3220 to encrypt a second 1024-bit data block, etc.

The new 1024-bit data block 3230 that forms a portion of the file to be encrypted is divided into 128-bit sub-blocks D0-D7, labeled 3231-3238, respectively. It will be appreciated that if a final data block does not contain 128 bits, the remainder of the block can be padded with zeros to form a 128-bit data block. The new key 3220 and the 128-bit sub-blocks 3230 are input into the AES algorithm 3240 to produce intermediary encrypted data 3241. The intermediary encrypted data 3241 is divided into 128-bit blocks 3242-3249, labeled E0 through E7, respectively. Next, the 128-bit blocks 3242-3249 are each divided into 64-bit blocks 3251-3262, thus forming the sixteen 64-bit blocks U0 through U15, 3251-3262, respectively, together labeled 3250. Next, the number of the 1024-bit block 3218 (as described above) and the block 3250 are input into a second permutation function pf1 3270 to produce a final encrypted data 3290, comprising 64-bit blocks Upf10 through Upf14, labeled 3271 through 3282, respectively. It will be appreciated that the second permutation function 3270 can be any permutation function known in the art; preferably, the second permutation function pf1 3270 is a different permutation function than the first permutation function 3219. Also, preferably, the second permutation function 3270 is dependent on the first permutation function 3219 in a manner that ensures a randomness among the data blocks, and thus strong encryption.

Thus, for example, still referring to FIG. 31, data written to a backing store in accordance with the present invention is divided into portions corresponding to the data 3230. The encrypted data written to the backing store corresponds to the final encrypted data 3290. It will be appreciated that the data portions that comprise the data to be stored are each input into the data encryption process 3200 and, based on the block number of the data block, is encrypted using an encryption key corresponding to the data block. It will also be appreciated that a process for decrypting an encrypted data block follows the reverse of the steps shown in FIG. 31.

While the present invention has been described in terms of specific embodiments incorporating details to facilitate the understanding of the principles of construction and operation of the invention, such references herein to specific embodiments and details thereof are not intended to limit the scope of the claims appended hereto. It will be apparent to those skilled in the art that modifications may be made in the embodiments chosen for illustration without departing from the spirit and scope of the invention as defined by the appended claims.

We claim:

1. A computer system comprising a memory portion containing an encrypted data file and an operating system comprising a kernel to use a unique hardware address to verify a user to control access to the encrypted data file, wherein the kernel comprises a virtual node (a) to decrypt an encrypted directory entry to determine a location of the encrypted data file and (b) to decrypt the encrypted data file to access data file contents contained therein.

2. The computer system of claim 1, wherein the kernel comprises an encryption engine to encrypt clear data files to generate cipher data files, the encryption engine also to decrypt the cipher data files to generate the clear data files.

3. The computer system of claim 2, wherein the memory portion is coupled to the encryption engine to store the cipher data files.

4. The computer system of claim 3, wherein the memory portion comprises a first logical protected memory to store encrypted data files and a second logical protected memory to store encrypted key data.

5. The computer system of claim 4, further comprising an encryption key management system, the encryption key management system to control access to the encrypted data files and the encrypted key data.

6. The computer system of claim 5, wherein the encryption key management system is to store an encrypted data file name, wherein the data file name is associated with encrypted file contents.

7. The computer system of claim 6, wherein the encryption key management system is also to grant access to a data file if a corresponding access permission of the data file is a predetermined value.

8. The computer system of claim 6, wherein the encryption key management system is also to encrypt a pathname to the encrypted data file, and to decrypt the pathname to the encrypted data file when retrieving the encrypted data file contents.

9. The computer system of claim 2, wherein the encryption engine is to encrypt the clear data files and decrypt the cipher data files according to a symmetric key encryption algorithm.

10. The computer system of claim 9, wherein the symmetric key encryption algorithm is based on a block cipher.

11. The computer system of claim 10, wherein the symmetric key encryption algorithm comprises Rijndael algorithm.

12. The computer system of claim 11, wherein the symmetric key encryption algorithm uses a block size of 128 bits, 192 bits, 256 bits, 512 bits, 1024 bits, or 2048 bits.

13. The computer system of claim 11, wherein the symmetric key encryption algorithm uses a key length of 128 bits, 192 bits, 256 bits, 512 bits, 1024 bits, or 2048 bits.

14. The computer system of claim 10, wherein the symmetric key encryption algorithm comprises a DES algorithm.

15. The computer system of claim 10, wherein the symmetric key encryption algorithm comprises a Triple-DES algorithm.

16. The computer system of claim 10, wherein the symmetric key encryption algorithm comprises an algorithm selected from the group consisting of IDEA, Blowfish, Twofish, and CAST-128.

17. The computer system of claim 1, wherein the kernel comprises a UNIX operating system.

18. The computer system of claim 17, wherein the UNIX operating system is a System V-Revision.

19. The computer system of claim 1, further comprising a secondary device coupled to the memory, wherein the secondary device stores the encrypted data file and is accessed using a file abstraction.

20. The computer system of claim 19, wherein the secondary device is a backing store.

21. The computer system of claim 19, wherein the secondary device is a swap device.

22. The computer system of claim 19, wherein the secondary device comprises an interface port comprising a socket connection.

23. The computer system of claim 22, wherein the socket connection comprises a computer network.

24. The computer system of claim 23, wherein the computer network comprises the Internet.

25. A computer system comprising:
  a. a first device having an operating system kernel to encrypt clear data using an encryption key to generate cipher data, and to decrypt the cipher data using the encryption key to generate the clear data;
  b. a key generator to generate one or more encryption keys usable for encrypting and decrypting data on the computer system, wherein at least one of the keys is generated by a method comprising dividing an initial key into sub-keys each corresponding to a different block of the clear data, modifying each of the sub-keys in a manner unique to its corresponding block to produce modified sub-keys, and combining the modified sub-keys; and
  c. a second device coupled to the first device to exchange cipher data with the first device.

26. The computer system of claim 25, wherein the operating system kernel is to encrypt the clear data and decrypt the cipher data using a symmetric algorithm.

27. The computer system of claim 26, wherein the symmetric algorithm comprises a block cipher.

28. The computer system of claim 27, wherein the block cipher comprises a Rijndael algorithm.

29. The computer system of claim 28, wherein the encryption key comprises at least 1024 bits.

30. The computer system of claim 25, wherein the second device comprises a backing store.

31. The computer system of claim 25, wherein the second device comprises a swap device.

32. The computer system of claim 25, wherein the second device forms part of a communications channel.

33. The computer system of claim 32, wherein the communications channel comprises a network.

34. The computer system of claim 33, wherein the network comprises the Internet.

35. A method comprising:
  decrypting a user data file in a kernel of an operating system in response to user read commands with a key that is usable only on a computer on which the user data file was encrypted.

36. The method of claim 35, wherein the key is generated from a first identifier of the computer unique across computer systems.

37. The method of claim 36, wherein the first identifier is a medium access controller address.

38. The method of claim 36, wherein the key is further generated from a second identifier unique to encrypted data on the computer.

39. The method of claim 38, wherein the second identifier comprises an identifier of a file system containing the encrypted data, an identifier of a root directory containing the encrypted data, and an identifier of the encrypted data.

* * * * *